United States Patent [19]
Fantuzzi

[11] Patent Number: 5,951,226
[45] Date of Patent: Sep. 14, 1999

[54] FREIGHT HANDLING PLANT IN DEPOTS AND RELATED DEPOTS

[75] Inventor: Luciano Fantuzzi, Brescello, Italy

[73] Assignee: Reggiane S.p.A., Reggio Emilia, Italy

[21] Appl. No.: 08/809,482

[22] PCT Filed: Sep. 15, 1995

[86] PCT No.: PCT/EP95/03642

§ 371 Date: Mar. 17, 1997

§ 102(e) Date: Mar. 17, 1997

[87] PCT Pub. No.: WO96/09242

PCT Pub. Date: Mar. 28, 1996

[30] Foreign Application Priority Data

Sep. 20, 1994 [IT] Italy ................................. MO94A0131
Oct. 31, 1994 [IT] Italy ................................. MO94A0147
Sep. 12, 1995 [IT] Italy ................................. MO95A0124

[51] Int. Cl.$^6$ ............................ B66C 19/00; B65G 63/00
[52] U.S. Cl. .................................. 414/141.3; 414/139.9; 414/140.1; 414/140.3; 212/316; 212/325; 212/326
[58] Field of Search .............................. 414/139.9, 140.1, 414/140.3, 141.3; 212/316, 325, 326

[56] References Cited

U.S. PATENT DOCUMENTS

| | | | |
|---|---|---|---|
| 756,932 | 4/1904 | Browning | 212/316 |
| 3,543,952 | 12/1970 | Young | 414/140.3 |
| 3,727,776 | 4/1973 | Meeusen | 414/140.3 |
| 3,812,987 | 5/1974 | Watatani . | |
| 3,952,891 | 4/1976 | Terayama et al. | 414/139.9 |
| 4,065,006 | 12/1977 | Barry . | |
| 4,106,639 | 8/1978 | Montgomery et al. | 414/141.3 |
| 4,172,685 | 10/1979 | Hitachi . | |
| 4,973,219 | 11/1990 | Brickner et al. | 414/140.3 |
| 4,990,046 | 2/1991 | Tax et al. | 414/141.3 |
| 5,089,972 | 2/1992 | Nachman . | |
| 5,456,560 | 10/1995 | Rudolf, III et al. | 414/140.3 |
| 5,505,585 | 4/1996 | Hubbard | 414/140.3 |
| 5,511,923 | 4/1996 | Dunstan | 414/140.3 |
| 5,515,982 | 5/1996 | Hasegawa et al. | 414/140.3 |
| 5,618,148 | 4/1997 | Iversen et al. | 414/140.1 |
| 5,718,550 | 2/1998 | Lanigan, Sr. et al. | 414/140.3 |

FOREIGN PATENT DOCUMENTS

| | | | |
|---|---|---|---|
| 963819 | 3/1975 | Canada | 414/140.3 |
| 0167235 | 1/1986 | European Pat. Off. . | |
| 0194858 | 9/1986 | European Pat. Off. . | |
| 303884 | 2/1989 | European Pat. Off. | 414/141.3 |
| A-0303884 | 2/1989 | European Pat. Off. . | |
| A-1179983 | 5/1959 | France . | |
| 394992 | 12/1923 | Germany | 212/316 |
| 801706 | 1/1951 | Germany | 414/140.3 |

(List continued on next page.)

Primary Examiner—Dean Kramer
Assistant Examiner—Douglas Hess
Attorney, Agent, or Firm—Guido Modiano; Albert Josif

[57] ABSTRACT

The plant is mainly designed to increase the productivity of freight handling operations—for instance containers, in any kind of depot—to simplify the engineering works supporting the mobile crane (1) having a transversal boom (2), to eliminate stressing working conditions for the operator of the mobile crane (1) and to make essentially automatic the freight handling operations; the mobile crane (1) runs on a track (11) placed at the top of a fixed longitudinal frame (10) having stanchions (20) which transmit the loads to the ground at fixed positions constituted advantageously by foundation plinths (21) on piles (22); the cabin (12) is independent of the upper trolley (3) of the mobile crane (1); an intermediate trolley (13) receives the containers (7) from a shuttle trolley running longitudinally on a shelf (9) of the frame (10) and transfers them onto lorries (16) and trolleys (17, 162) of a conveyor ring (18, 154) of the depot assisted by bridge cranes; in maritime depots, the hold covers of ships may be stored on supporting elements (24) of the frame (10); the plant may be installed in newly builded or existing maritime, lake side, riverside, railway or terrestrial depots.

43 Claims, 48 Drawing Sheets

5,951,226
Page 2

FOREIGN PATENT DOCUMENTS

| | | |
|---|---|---|
| A-2622698 | 11/1977 | Germany . |
| A-3421418 | 1/1986 | Germany . |
| A-4120922 | 1/1993 | Germany . |
| 0261372 | 1/1928 | United Kingdom . |
| 0956160 | 4/1964 | United Kingdom . |
| 1099150 | 1/1968 | United Kingdom . |
| 1124458 | 8/1968 | United Kingdom . |
| 1233827 | 6/1971 | United Kingdom . |
| 1269201 | 4/1972 | United Kingdom . |
| 1394974 | 5/1975 | United Kingdom . |
| 1466503 | 3/1977 | United Kingdom . |
| 1557640 | 12/1979 | United Kingdom . |
| 2029374 | 3/1980 | United Kingdom . |
| 1574296 | 9/1980 | United Kingdom . |
| 2065076 | 6/1981 | United Kingdom . |
| A-9411287 | 5/1994 | WIPO . |

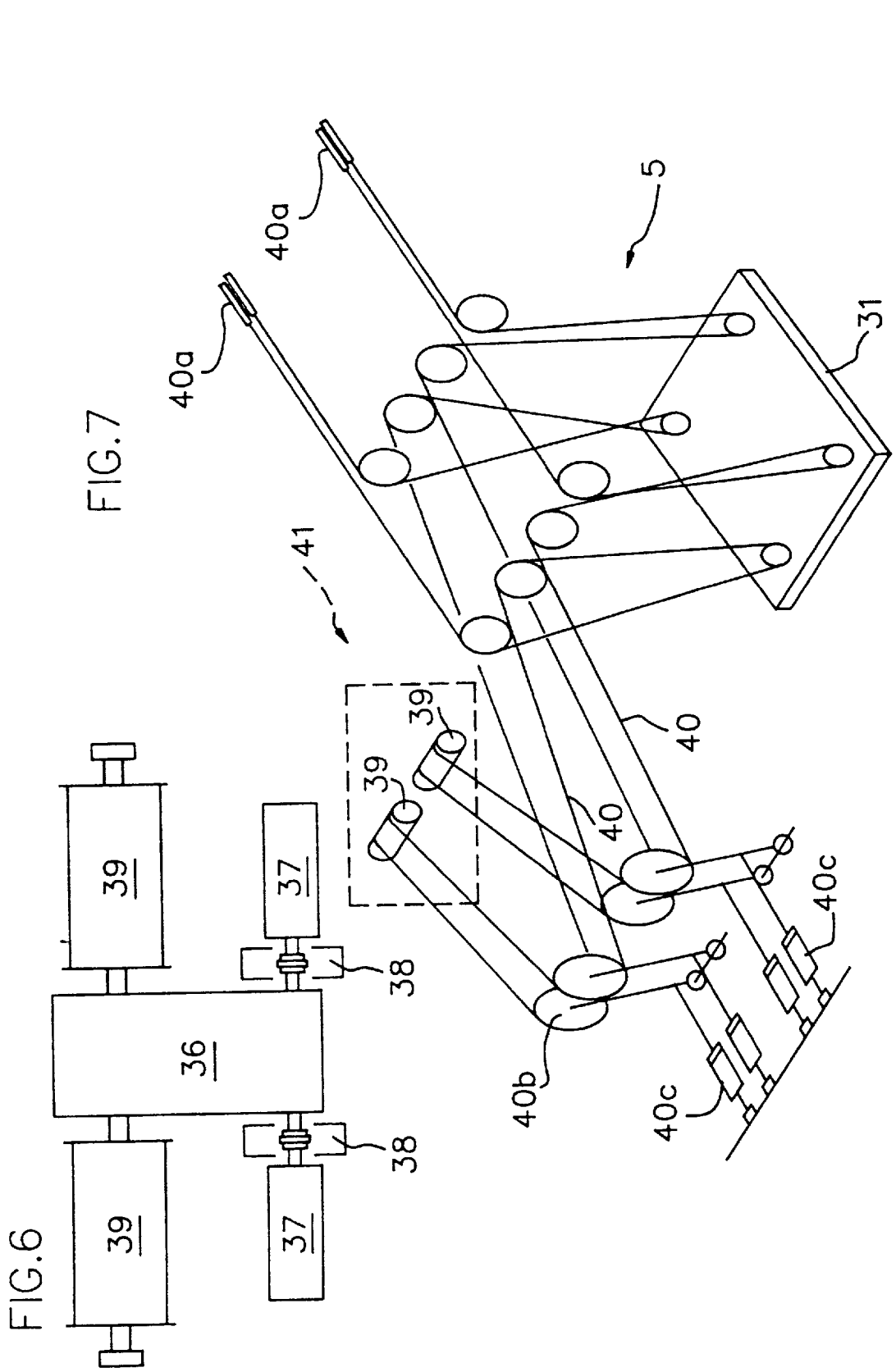

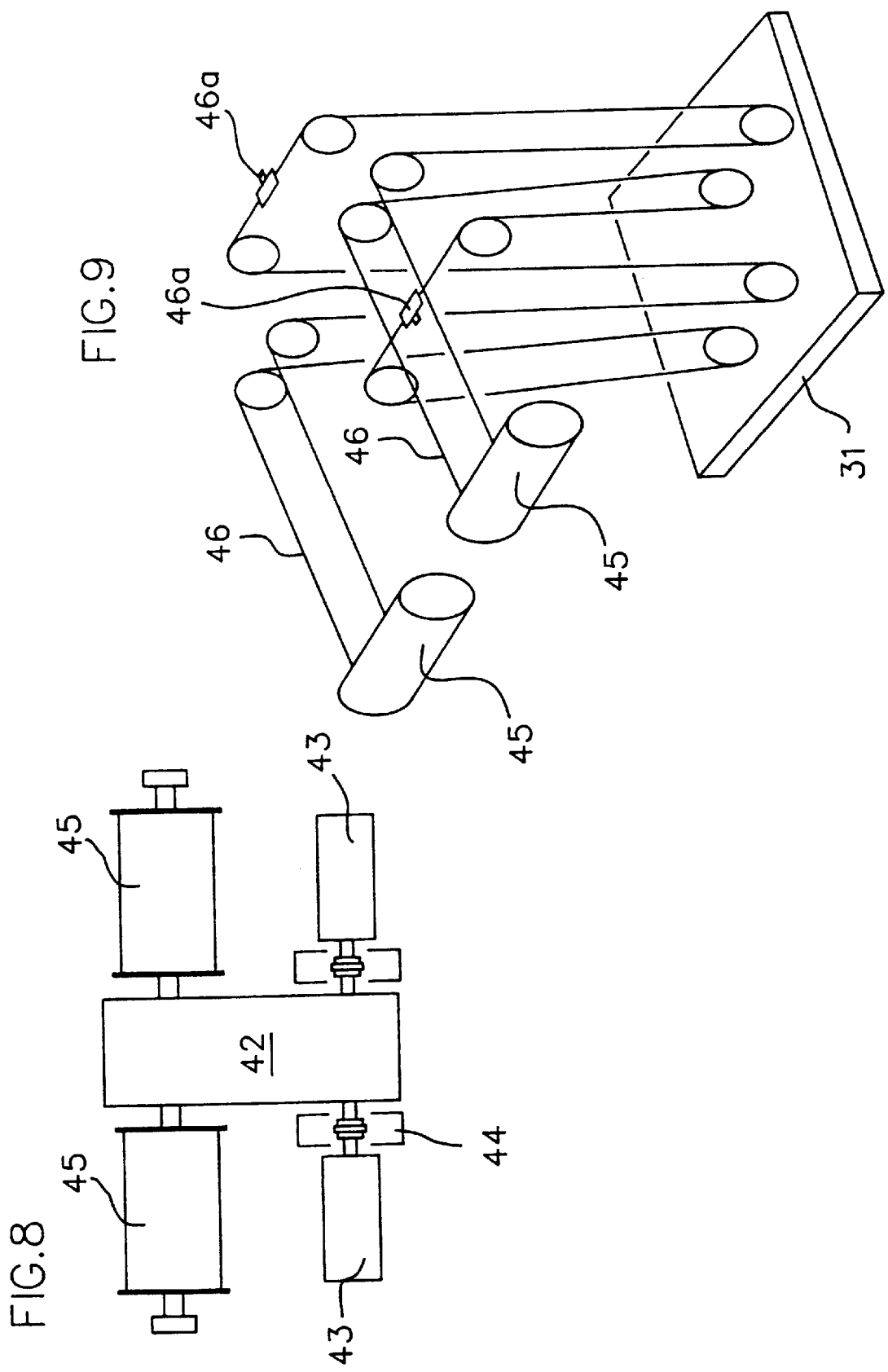

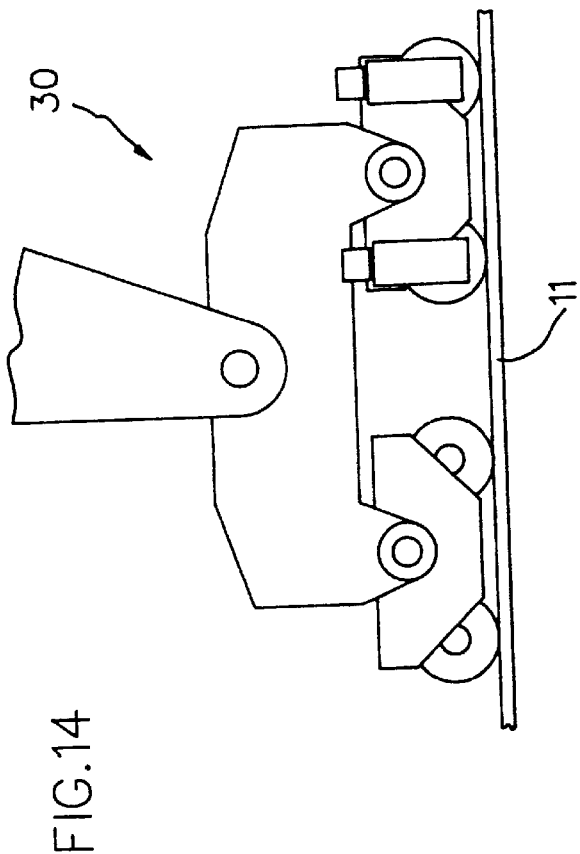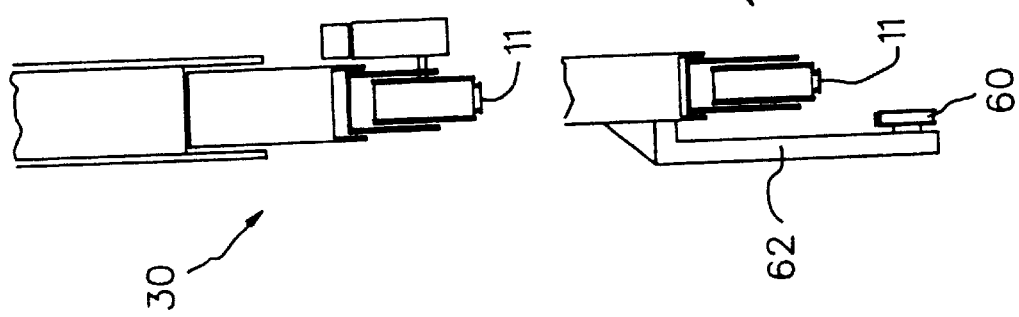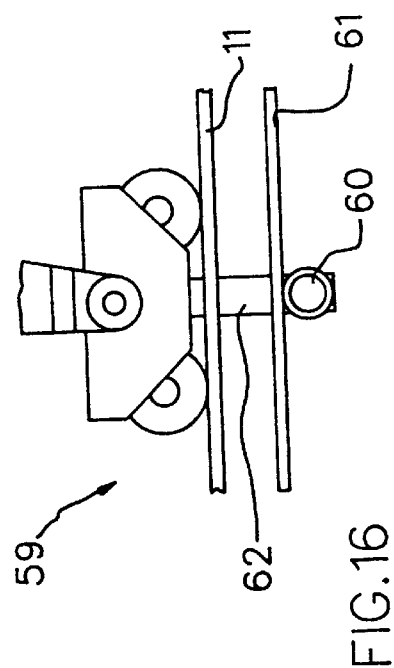

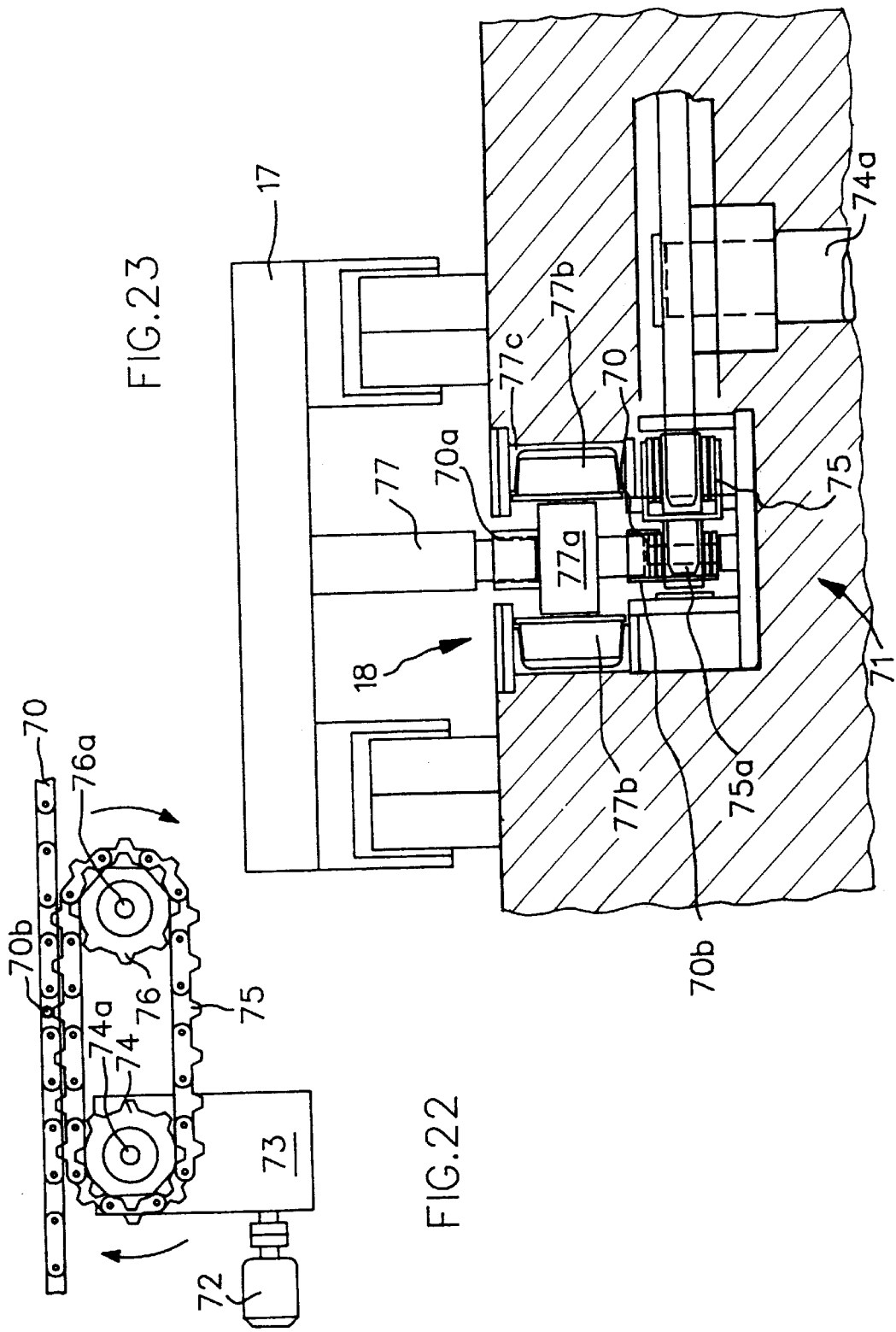

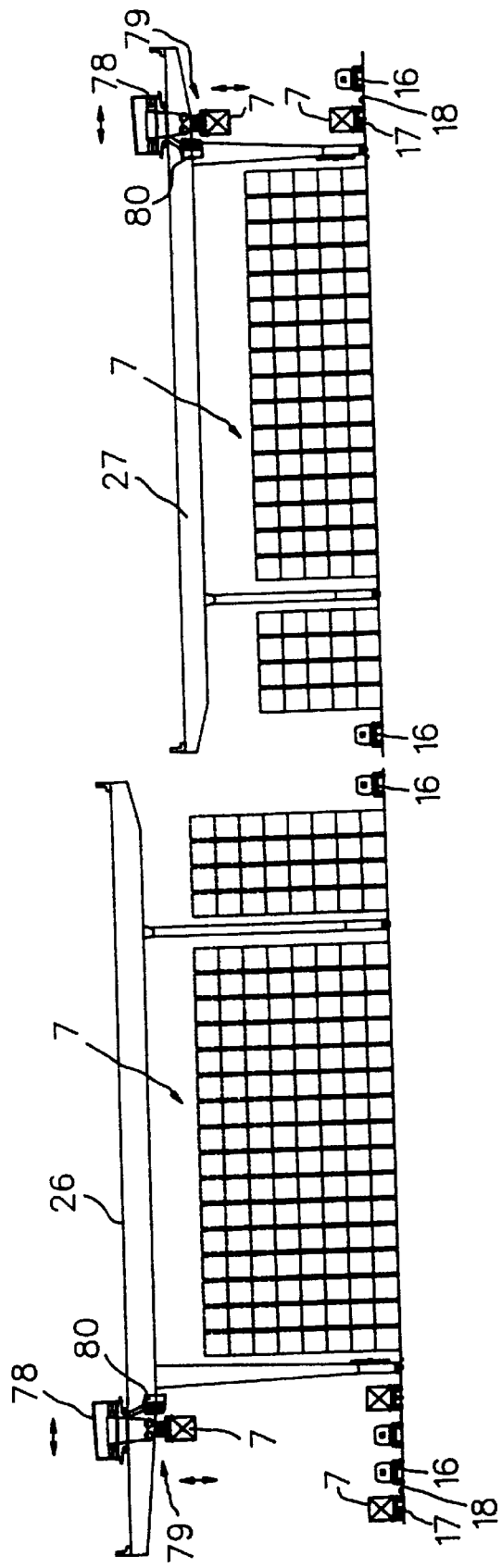

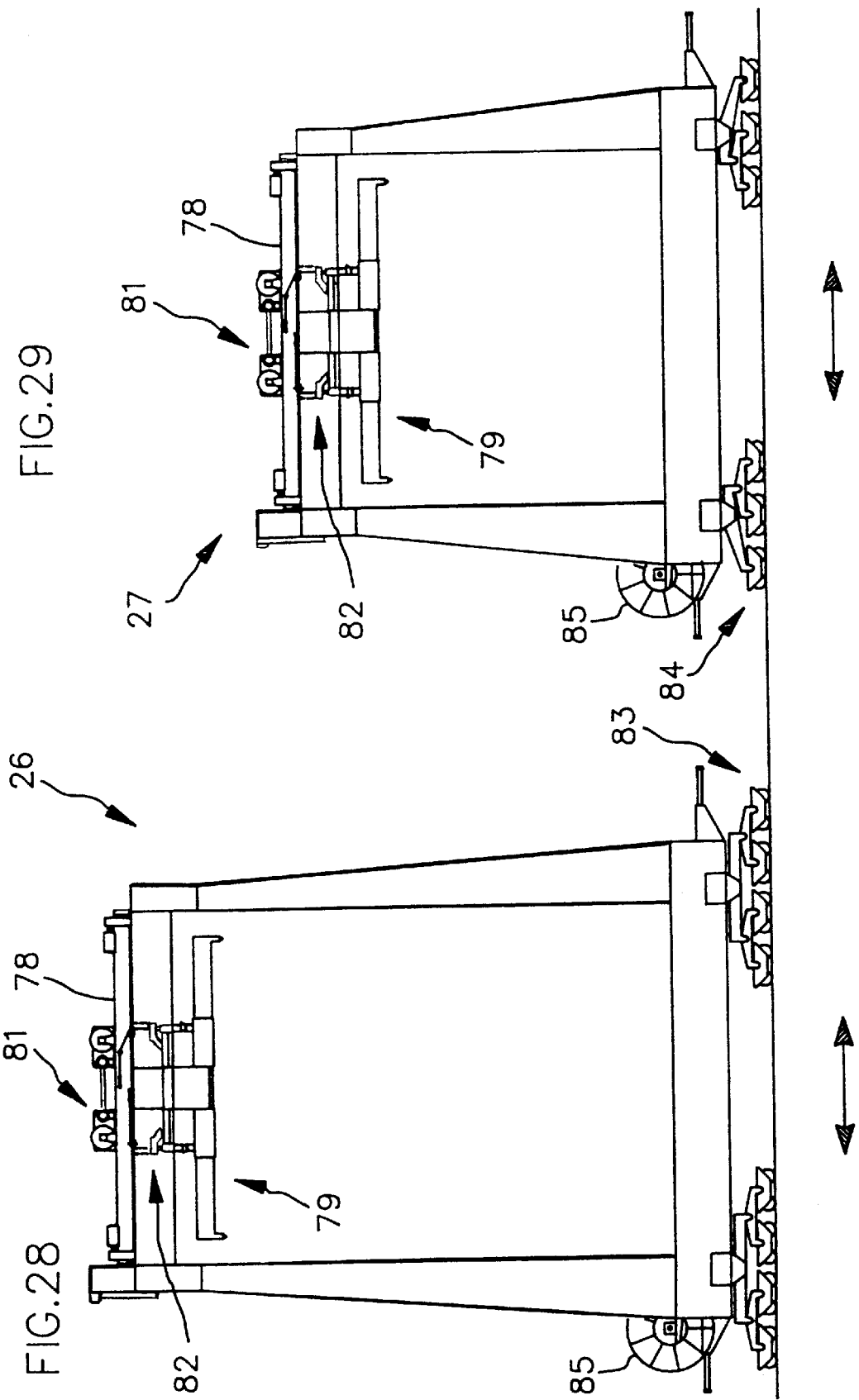

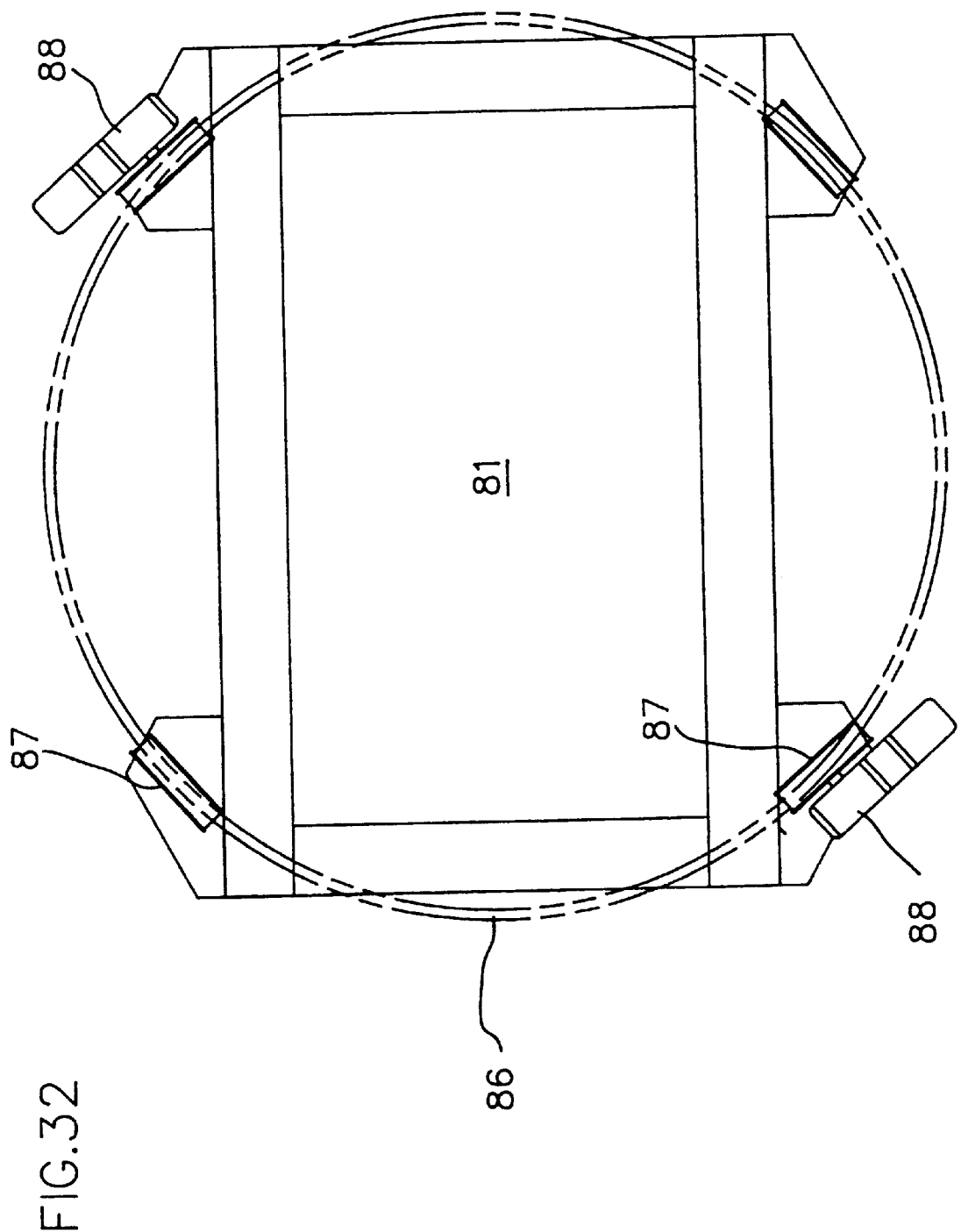

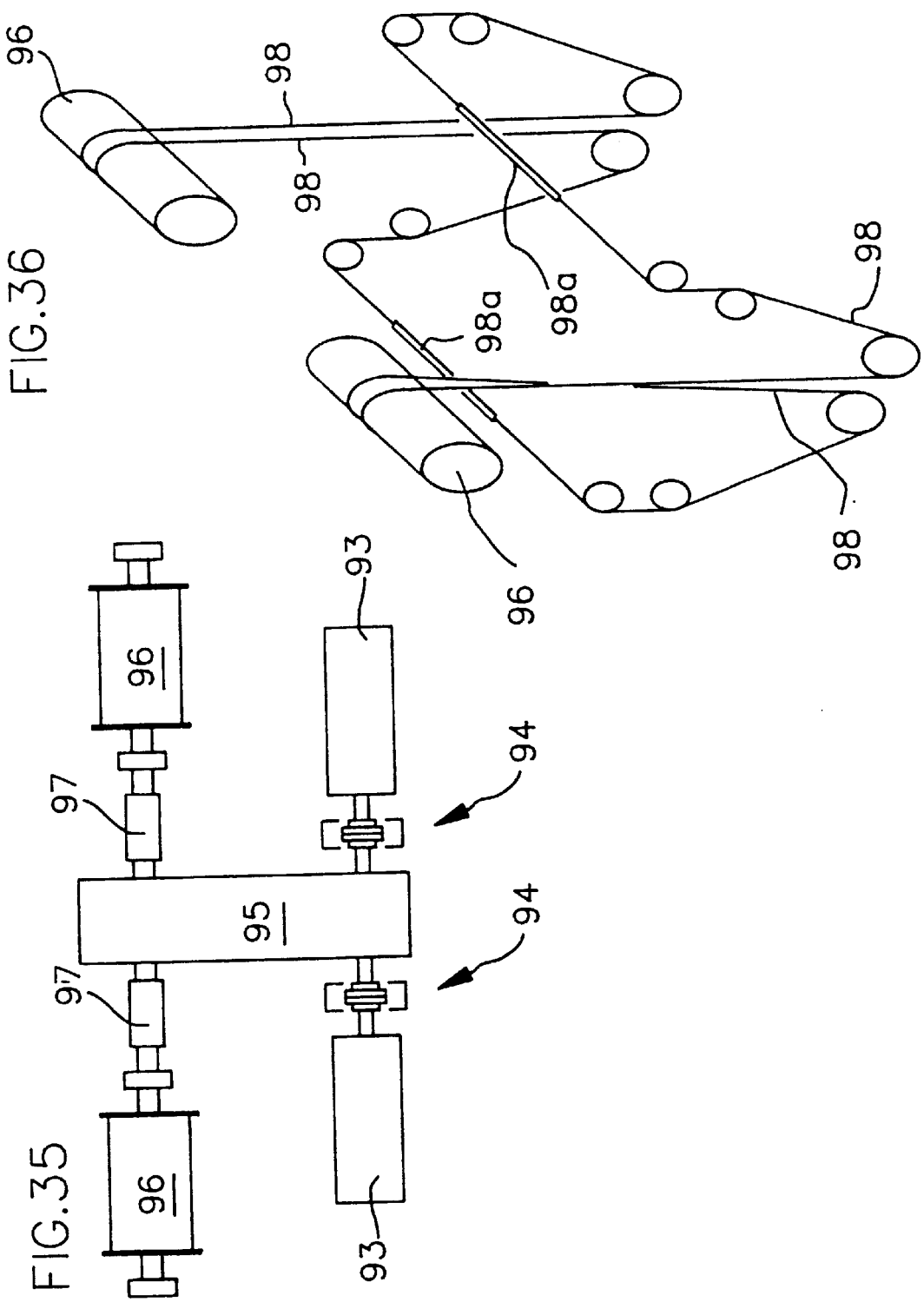

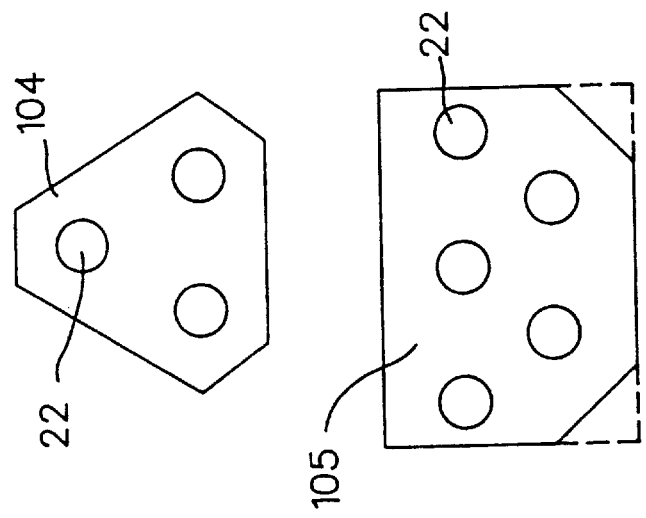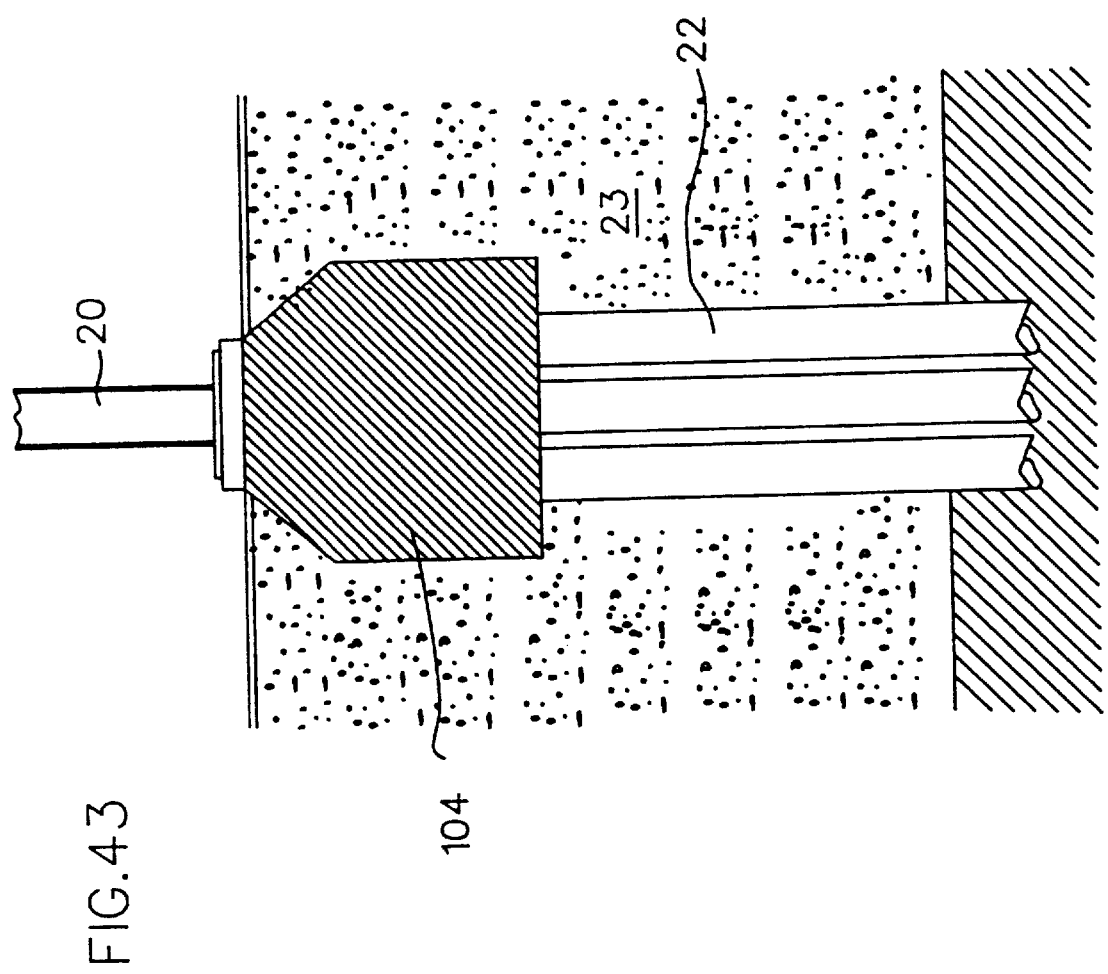

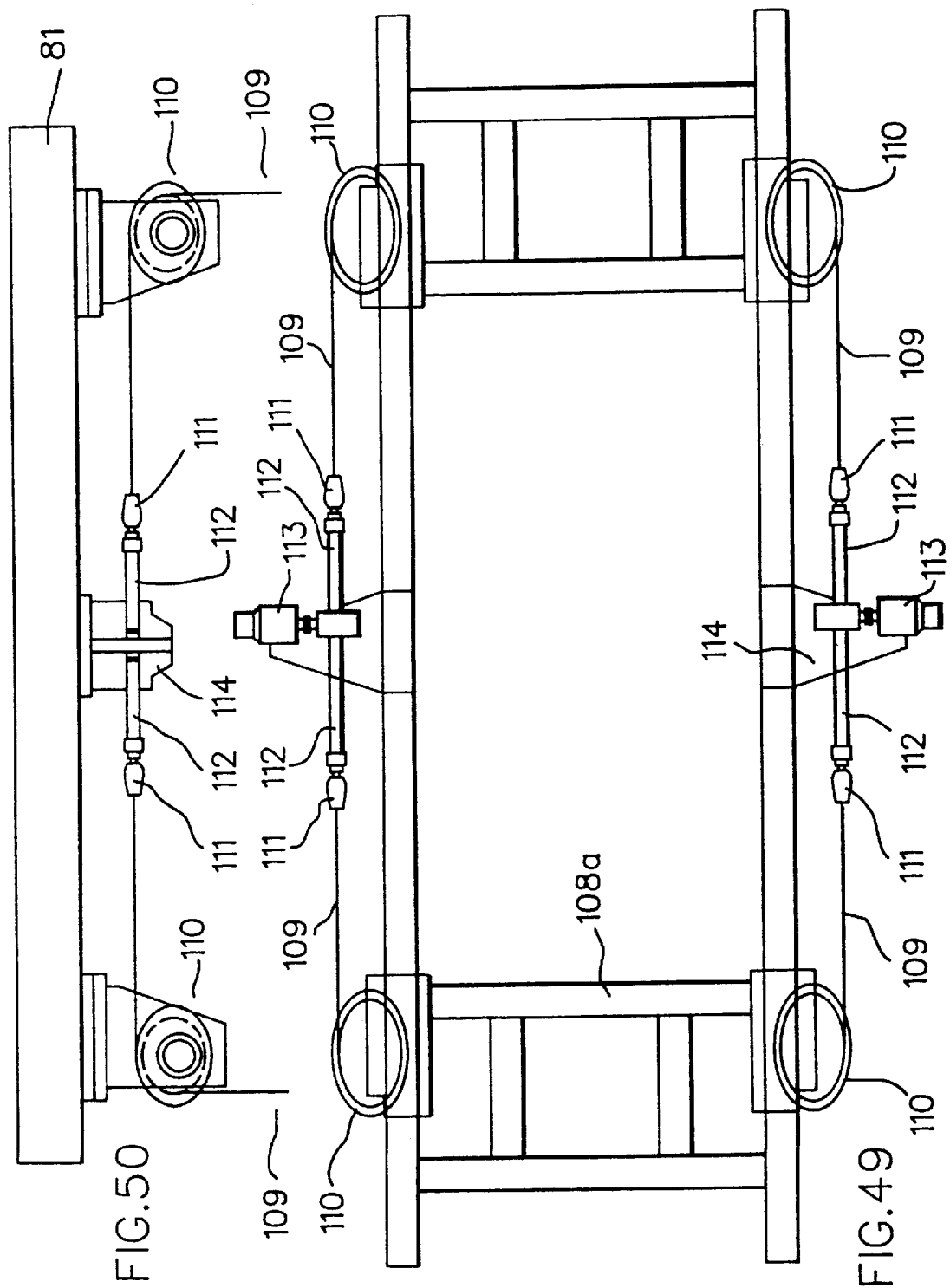

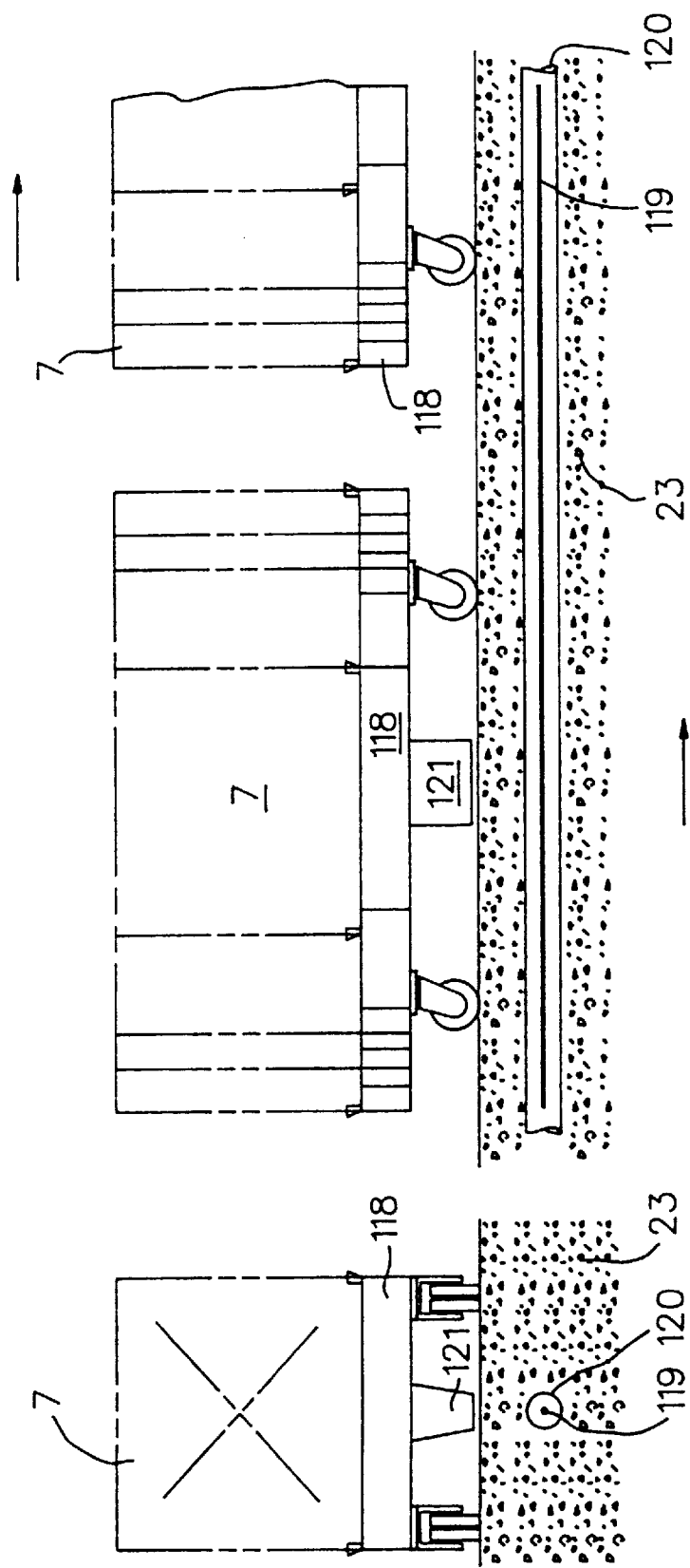

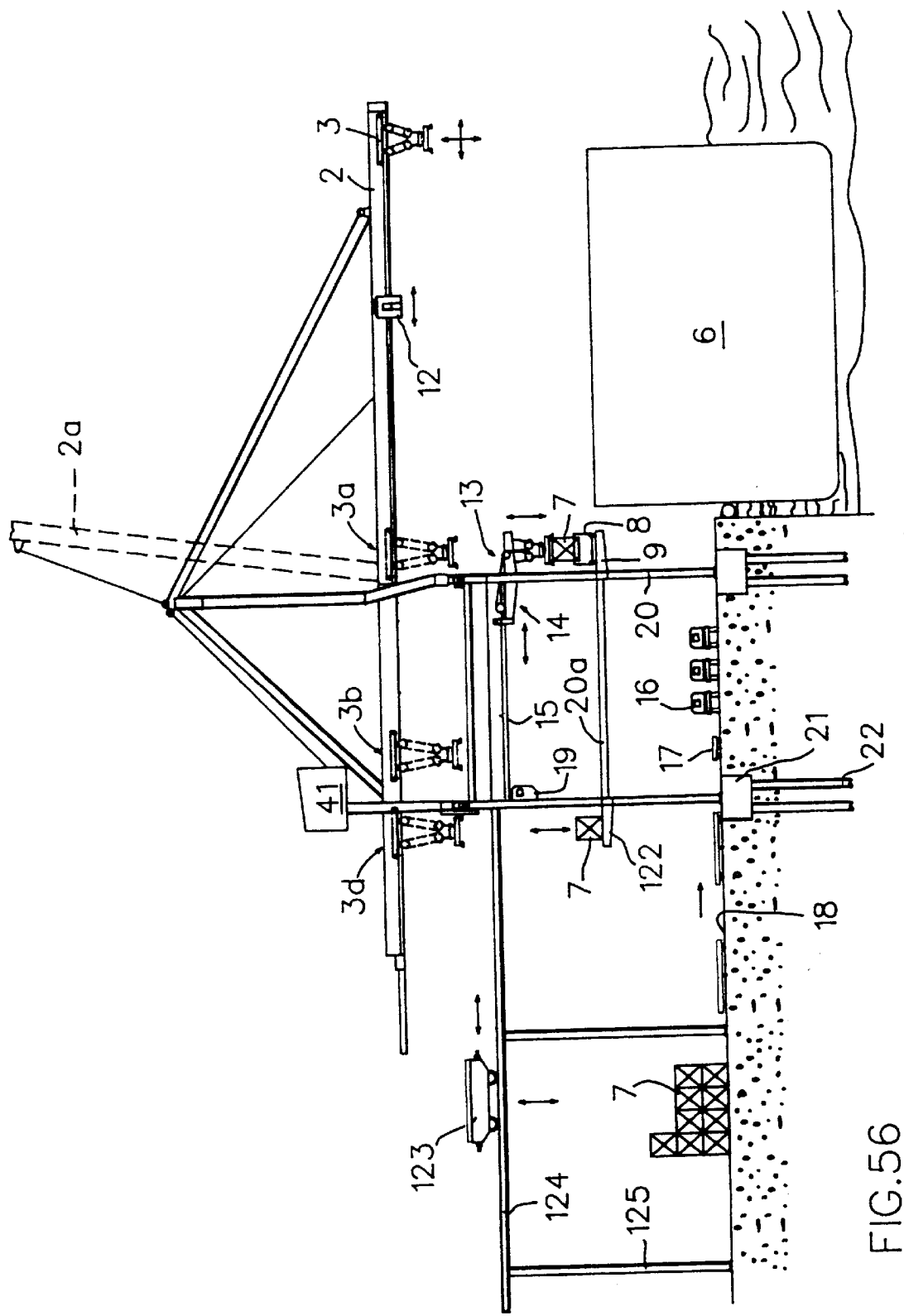

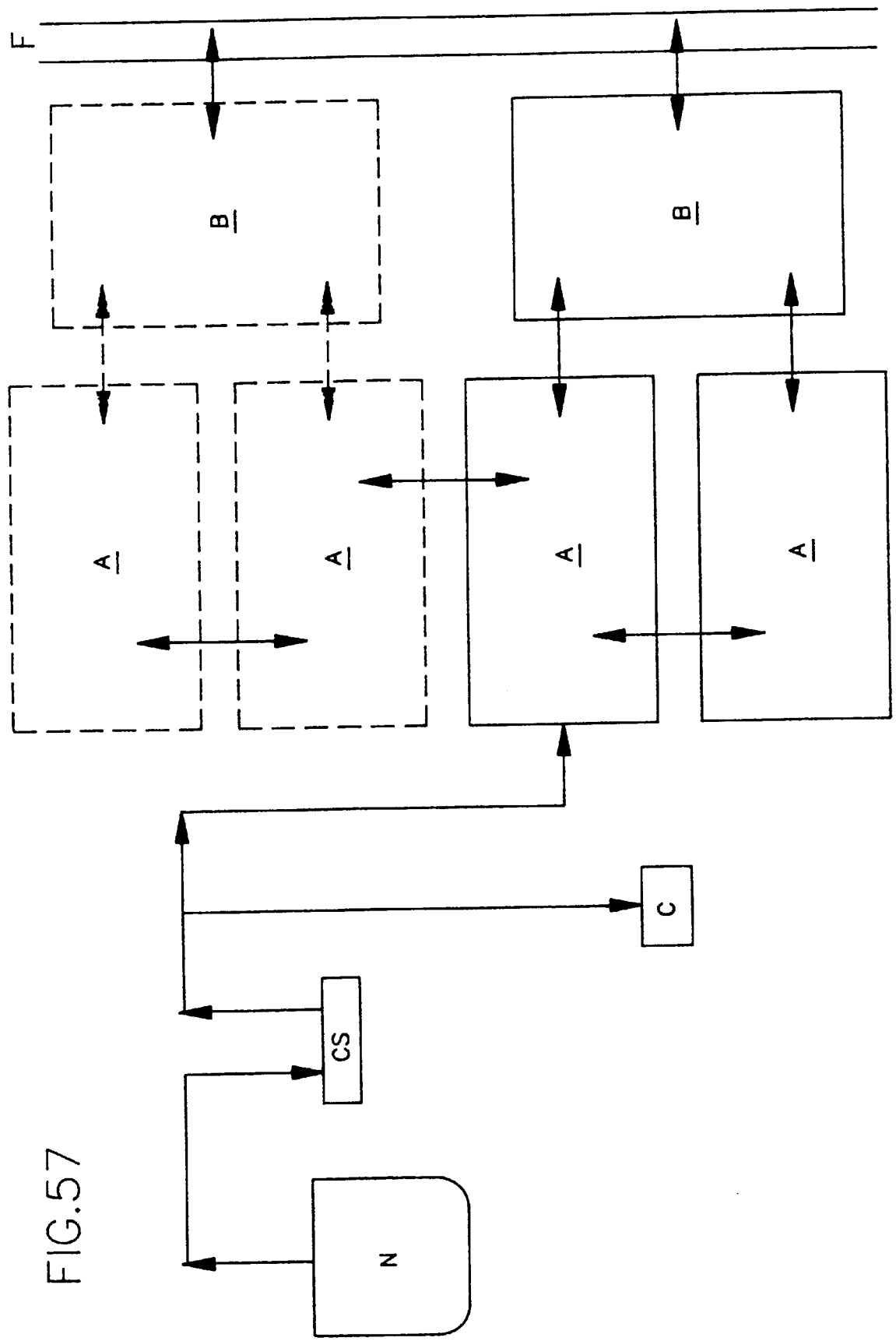

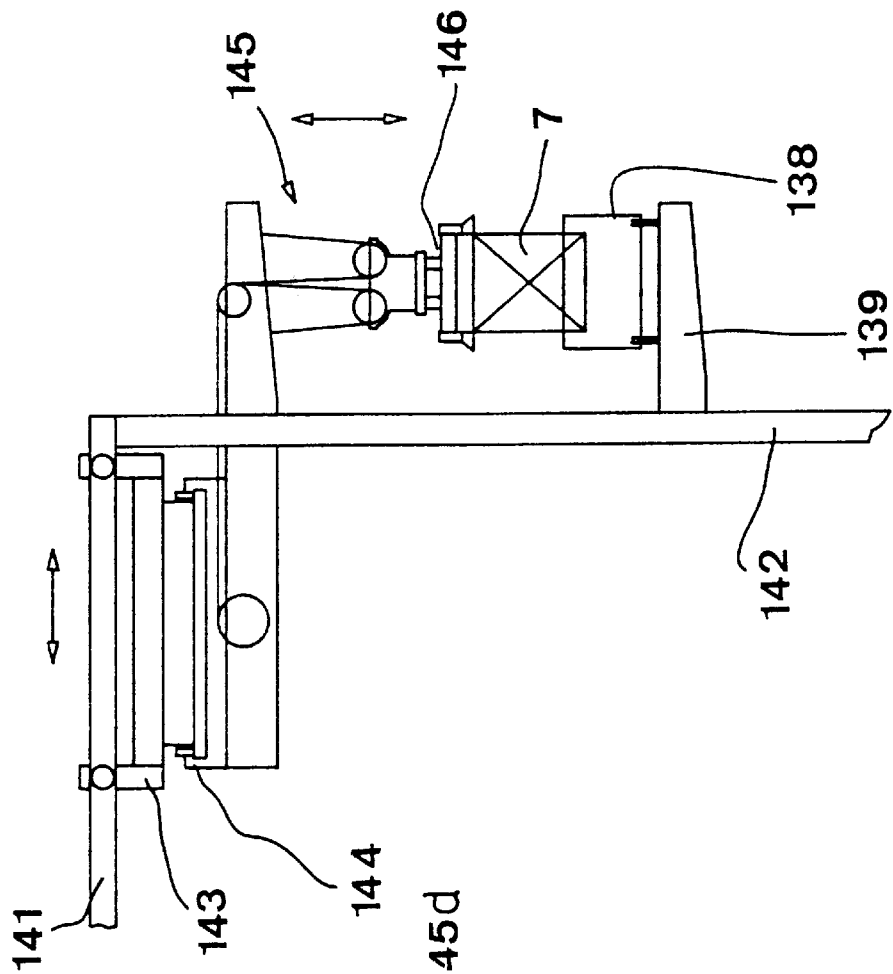
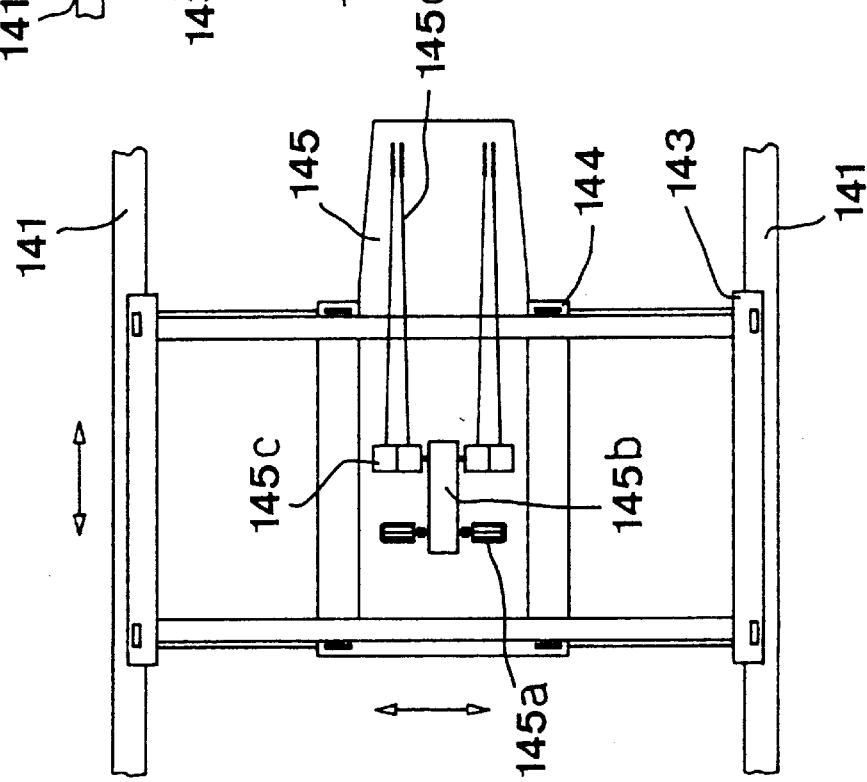

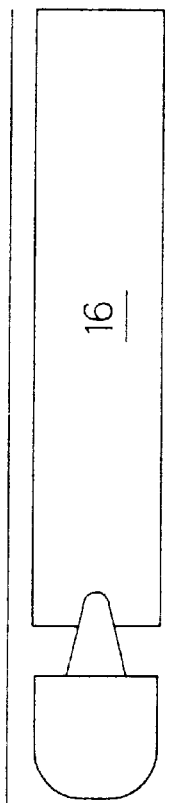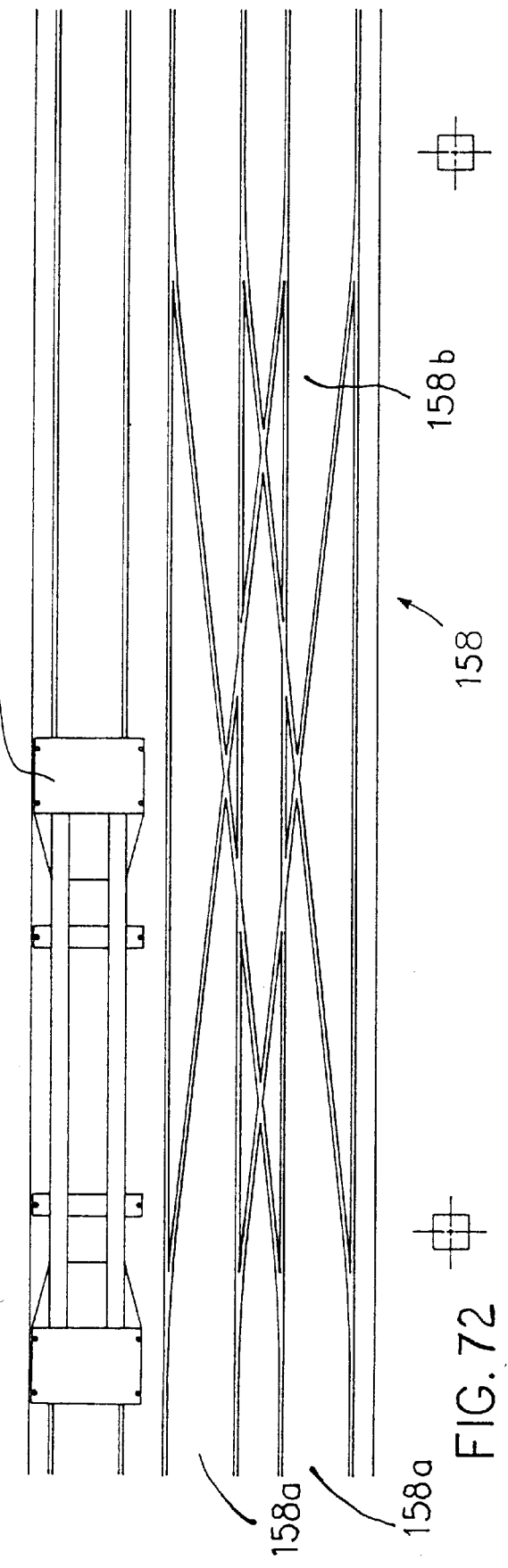
FIG. 71
FIG. 72

FREIGHT HANDLING PLANT IN DEPOTS AND RELATED DEPOTS

The invention concerns a freight handling plant in depots and related depots, that is, a coordinated arrangement of devices, machines and structures that carry out the loading, unloading, transfer and parking of freight, for example containers, of even 40 tons or more, in maritime, lake and riverside docks, railway goods stations and terrestrial depots in general, both merchant and military; the entire engineering works of the depot that includes the plant also being included in the application for patent rights.

The state of the art, as regards maritime docks which represent the most imposing and exacting of freight handling plants, includes colossal, complex and enormously expensive structures entailing, principally, the construction of breakwaters to protect the docked ships from wave motion and the construction of the mooring wharf, with extremely long construction times and huge investments.

The construction of the said wharf in particular is extremely onerous as well as the thrust of the backfill of the embankment of the dock area—increased by the weight of the stored containers and the weight of the handling machinery, it has to take the dynamic loading caused by the movements of each crane (for example between 700 and 1200 ton or more), loading which can reach 50 ton/m or more, thereby severely stressing the structure of the wharf, considering also that the crane rail has to pass just a few metres from the edge of the wharf itself.

As a result the construction times and costs are extremely onerous, further worsened by the necessity of filling in areas originally occupied by the sea, areas subsequently used for dock services, by transporting backfill from sites in the hinterland: this sometimes requires mountainous terrain to be levelled and, in any case, requires very long works times and entails very high costs, with, furthermore, intolerable delays and danger for traffic.

Furthermore, the management of a container handling plant, wherever it is situated, entails a rather limited productivity because of a series of difficulties associated with traditional structures and plant and their operational cycles.

For example, in maritime docks, the average level of productivity in loading and unloading ships is of between 43 and 54 containers per hour depending on the type of plant, with the movement of the containers by mobile crane being in a direction contained in a vertical plane that passes essentially through the centre line of the boom of the crane itself.

The level of productivity is limited in particular by the transfer logistics currently employed that depends on the type and use of a crane that has boom support stanchions as high as 60 m, moving along the wharf, on a ground level rail track, to each row of containers stowed in the ship, causing very high dynamic loads on the wharf even when crane speeds are rather low.

Furthermore the operator, positioned in a cabin fixed to the upper trolley of the spreader, is made to follow each stressful movement of the trolley itself, from the vertical lifting of each container in the hold to its transfer onto a land based means of transport, the shifts for such an operator being necessarily limited to a few hours.

Furthermore, the use of a mobile crane on a ground level rail track does not permit the precise positioning of the awaiting transport means and constitutes a danger for persons, vehicles and structures on the wharf.

Furthermore, a simultaneous use of lorries and railway carriages, or trolleys, that move on predetermined tracks, to transfer freights to storage areas involves a danger of collision between the lorries and railway carriages or trolleys and causes slowing down in transferring the freights, due to the need of stopping lorries, railway carriages and trolleys in order to avoid collisions.

Such prior art may be subject to considerable improvements with a view to eliminating, or even considerably reducing, the said limitations and drawbacks.

From the foregoing emerges the need to resolve the technical problem of improving handling plants for containers and for freight in general, wherever they are situated, particularly as regards the associated transfer logistics.

Further aspects of the technical problem are:
to simplify the engineering works supporting the plant;
to increase the productivity of the plant;
to guarantee maximum safety for persons and vehicles circulating in the freight handling area and for the structures;
to improve the working conditions of the workers;
to make the freight handling essentially automatic in order to achieve constant and shorter handling times;
to permit automatic control of the goods in stock also operating in conjunction with other parts of the plant and with devices to distribute and transport the goods to and from outside the depot;
to make the traffic of the transport means more flexible in the storage areas;
to increase the exchange points between the transport means and the storage areas.

In the most general sense the invention resolves the said technical problem by adopting a freight handling plant in which the track along which at least one mobile crane moves is supported on an intermediate structure, for example, a fixed longitudinal frame which transmits the loads to which it is subjected to the ground at predefined fixed positions, said positions being independent of the position of said at least one mobile crane.

This enables the supporting structure to be drastically reduced and simplified, due to the reduction in the dynamic loads, for example to 1/10 or more, and eliminates the danger of collisions with persons and vehicles circulating at ground level and with other structures on the wharf.

In a further embodiment of the invention, the path taken by each item, in passing from a first carrier to a second carrier, can shift away from the said vertical plane essentially passing through the centreline of the boom of the crane.

Deriving from this the advantage of being able to transfer the items from a first to a second carrier, or positions, that are not vertically aligned without having to move the crane.

The transverse spacing of the stanchions of the said fixed longitudinal frame is such as to allow the passage between them of one or more ground level handling devices, including possibly automatic handling devices for the stockyard.

Each mobile crane can advantageously be provided with a cabin for the operator that is made to move independently of the upper trolley, for example along a track parallel to that of the upper trolley that has, for example, devices for gripping the containers called "spreaders".

The working conditions thereby obtained for the operator in the cabin are not stressful with consequently easier manoeuvering conditions, fewer errors and the possibility of adopting normal shifts.

Having separated the cabin from the upper trolley enables the cabin to be independent of upper trolley movements and to employ the operator in an area of the crane other than that in which the upper trolley is operating to carry out every possible and additional task.

The said upper trolley also being able to serve directly the container handling devices at ground level and to transfer the hold covers from the holds to a support positioned between an intermediate trolley and the top of the fixed longitudinal frame above it, or even on the ground in an area opposite the wharf.

The said fixed longitudinal frame has, on the loading and unloading side of the mobile crane at a first intermediate elevation, an intermediate longitudinal track for cargo transfer devices having variable stroke, for example, at least a shuttle trolley or a motorized roller conveyor or a belt conveyor, that operate in conjunction with the spreader of the upper trolley or that of the intermediate trolley that can move in a transverse direction for loading and unloading containers on and from ground level handling devices: the said intermediate trolley being positioned at a second intermediate elevation, advantageously higher than the first.

In a further embodiment, advantageous in the case of pre-existent plants, the mobile crane runs on ground level tracks shifting the loads away from a vertical plane central to the boom using an auxiliary trolley than can also move in a longitudinal direction.

This affording the further advantage of making the position of the overhead boom of the mobile crane independent of the position of the cargo handling devices on the ground: the said position can be predetermined, thereby further improving safety and productivity, given that, in this way, the ground level handling devices will wait in a predetermined location, thereby minimizing movements.

All this making it possible to carry out continuous automatic loading and unloading cycles, during which the operator intervenes at most to position the spreader of the upper trolley only on the first container of a row, in the absence of automatic positioning devices equipped with optical and/or electronic homing and positioning means that enable the whole cycle to be made automatic.

In a further embodiment of the invention said at least one mobile crane is equipped with an upper auxiliary trolley movable along the same track as the upper trolley.

This affords the advantage of increasing the productivity of the mobile crane in transferring loads from and to said first carrier.

In a still further embodiment of the invention, the plant comprises at least one overhead travelling-crane cooperating with the mobile crane, said overhead travelling-crane running on overhead tracks supported by a supporting frame, said supporting frame being equipped with a longitudinal shelf protruding from the side of the supporting frame facing the mobile crane.

This making possible to transfer loads from a first carrier, for instance a ship to the overhead travelling-crane on said first longitudinal shelf, by means of the load lifting devices of the upper trolley of the mobile crane without being obliged to transfer the loads at ground level.

In addition, an accurate positioning of the mobile crane with respect to the overhead travelling-crane is not required.

In a further embodiment of the invention the overhead travelling-crane cooperates with a load transfer device, for instance a shuttle trolley, running longitudinally on said first longitudinal shelf.

This affords the advantage of allowing a more rapid transfer of loads from the mobile crane to the overhead travelling-crane, because the overhead travelling-crane may be kept in a stationary position with respect to the longitudinal shelf, the longitudinal displacement of loads during the transfer from the mobile crane to the overhead travelling-crane being obtained by means of said load transfer device.

In a further embodiment of the invention, said overhead travelling-crane comprises an overhead trolley running on said overhead tracks in a direction perpendicular to said longitudinal shelf and an auxiliary trolley slidably supported to said overhead trolley, said auxiliary trolley being slidable in a direction parallel to said lonfgitudinal shelf and being equipped with a load lifting device.

In a further embodiment of the invention, the mobile crane is equipped with a longitudinal shelf protruding from a side of the load bearing structure of the crane facing towards said first carrier, for instance a ship, said longitudinal shelf cooperating with a load transfer device suitable for taking loads from the longitudinal shelf of the crane and transferring them to the longitudinal shelf protruding from the frame of the overhead travelling crane, or to ground level handling devices.

This affords the advantage of speeding the transfer of loads from the mobile crane to the overhead travelling-crane or to ground level handling devices by shortening the stroke of the upper trolley and/or the load lifting device of the mobile crane.

In a further embodiment of the invention, said load transfer device comprises a first trolley running on first tranversal tracks supported to the load bearing structure of the crane at an intermediate height between the boom of the mobile crane and said longitudinal shelf, said first trolley supporting second transversal tracks, parallel to said first transversal tracks, on which a second trolley runs, which is equipped with a load lifting device.

This affords the advantage of speeding and making easier the transfer of loads from said second longitudinal shelf to said first longitudinal shelf.

The plant can comprise at least one automatic freight distribution and collection ring, or conveyor ring, for example for distributing and collecting containers to and from corresponding islands contained within the area of the ring, positioned on the opposite side to that served by the said mobile crane: each ring, which has a continuous motorized chain of lower trolleys, on wheels or rail, designed to carry one or more items, having one side that passes under the said fixed longitudinal frame by at least one of the said intermediate trolleys that loads and unloads the containers on and from the said ring at a predetermined point.

Alternatively, each lower trolley, self-propelled, can be part of a ring using guiding devices with electronic or retroreflector control systems, or driven by a linear motor.

In a further embodiment of the invention the plant comprises a plurality of conveyor rings having a substantially rectangular shape and exhibiting at least one side parallel to the corresponding side of an adjacent conveyor ring, or in common with said adjacent conveyor ring; in addition, each ring exhibits a pair of opposite sides aligned with the corresponding sides of the adjacent ring or rings.

This affords the advantage of making possible to serve a plurality of storage areas enclosed in and encircled by said conveyor rings, independently from each other.

The area of each ring, is served by a bridge crane on rails, of even various heights, to transfer freight to the stockyard area and between adjacent rings.

To enable a more rapid circulation and advantageous positioning of lorries and other means of transport between the storage islands of the depot, as an alternative to and/or integrated with the automatic handling devices, there are suitable tracks or carriageways served by bridge cranes.

Said at least one conveyor ring can be associated, for transferring the loads, with lines of transport, even railways, with corresponding bridge cranes for loading and unloading freight.

In a further embodiment of the invention, said at least one conveyor ring may be an overhead conveyor ring placed at such a distance from the earth that said second carrier is able to pass under the conveyor ring.

This affords the advantage of allowing a substantial reduction of the number of loads that are handled at ground level, thus improving substantially the safety conditions for persons working at ground level; in addition, it will be possible to use different transport means for transporting loads at ground level and on said conveyor rings, without danger of interference between the paths of said different transport means.

In a still further embodiment of the invention, a load supporting platform, substantially coplanar with said at least one overhead conveyor ring, is provided.

This affords the advantage of shortening the vertical path of freights during transport towards the storage areas and keeping the storage areas served by conveyor rings and the storage areas served by transport means at ground level separated from each other.

In a further embodiment of the invention said at least one overhead conveyor ring has a side passing through said intermediate structure in a direction parallel to the track of said at least one mobile crane.

This affords the advantage of shortening the time involved in transferring loads from said at least one mobile crane to the second carrier on said at least overhead conveyor ring.

In a further embodiment of the invention said load supporting platform is equipped with at least one opening allowing passage of loads transferred by said at least one mobile crane or by lifting means to and from ground level.

This affords the advantage of speeding the transfer of loads to and from transport means at ground level.

In a further embodiment of the invention, said side passing through said intermediate structure is equipped with a plurality of parallel lanes for said second carrier, said lanes being interconnected with each other by junctions.

This affords the advantage of speeding the transfer of loads to said second carrier.

In a further embodiment of the invention, said second carrier, in the rectilinear portions of said at least one conveyor ring, is movable along a mechanical supporting and leading element.

This affords the advantage of allowing high speeds of said second carrier on said rectilinear portions, thus speeding the transfer of frights.

In a further embodiment of the invention, said second carrier, in the rectilinear portions of said at least one conveyor ring, is guided by means of magnetic, inductive or optical paths or tracks.

In a further embodiment of the invention, said second carrier, in the curved portions of said at least one conveyor ring connecting the rectilinear portions with each other and in the junctions connecting parallel lanes of the ring with each other is guided by means of magnetic, inductive or optical paths or tracks.

This afford the advantage of making possible to drive said second carrier in a simple and reliable way along said curved portions and exchange portions, without the need of making use of complex and expensive structures.

Storing the containers in the depot can also be achieved by transferring them making use of the fixed longitudinal frame operating in conjunction with an overhead travelling crane on aerial carriageways.

In the case of dock installations, particularly if maritime, both the area supporting the fixed longitudinal frame and, possibly, that of the depot and those supplementary to the entire installation, can advantageously be supported on a reinforced cement slab supported, possibly, on beams interconnecting steel or reinforced concrete columns constituting the foundation piles: the said piles being located in positions corresponding to the predetermined fixed points for the connection, on the corresponding plinth, of the stanchions of the said fixed longitudinal frame.

Again in maritime port installations, the fixed longitudinal frame can have—on its top side—supporting elements for hold covers.

This enabling the transfer path of the said covers to be shortened with respect to their being transferred to ground level.

Further advantages of the present invention are:
- as regards productivity, levels can reach, for example, even 60–70 containers per hour;
- reduced overall longitudinal dimensions of the wheel carriages of the mobile cranes, with consequently the possibility of positioning them closer together, enabling, for example, simultaneous loading and unloading of containers in alternate rows in holds which are close to each other.

Some embodiments of the invention are illustrated, by way of example in the fourty-eight tables of drawings attached, in which:

FIG. 6 is the plan view of the lifting winch for the upper trolley;

FIG. 7 is the cable layout diagram for the winch in FIG. 6;

FIG. 8 is the plan view of the lifting winch for the intermediate trolley;

FIG. 9 is the cable layout diagram for the winch in FIG. 8;

FIG. 14 is the side view of the wheel carriage of the mobile crane on the sea side;

FIG. 15 is the view from the left of FIG. 14;

FIG. 16 is a view as in FIG. 14, but of the wheel carriage on the land side;

FIG. 17 is the view from the left of FIG. 16;

Figure 1:
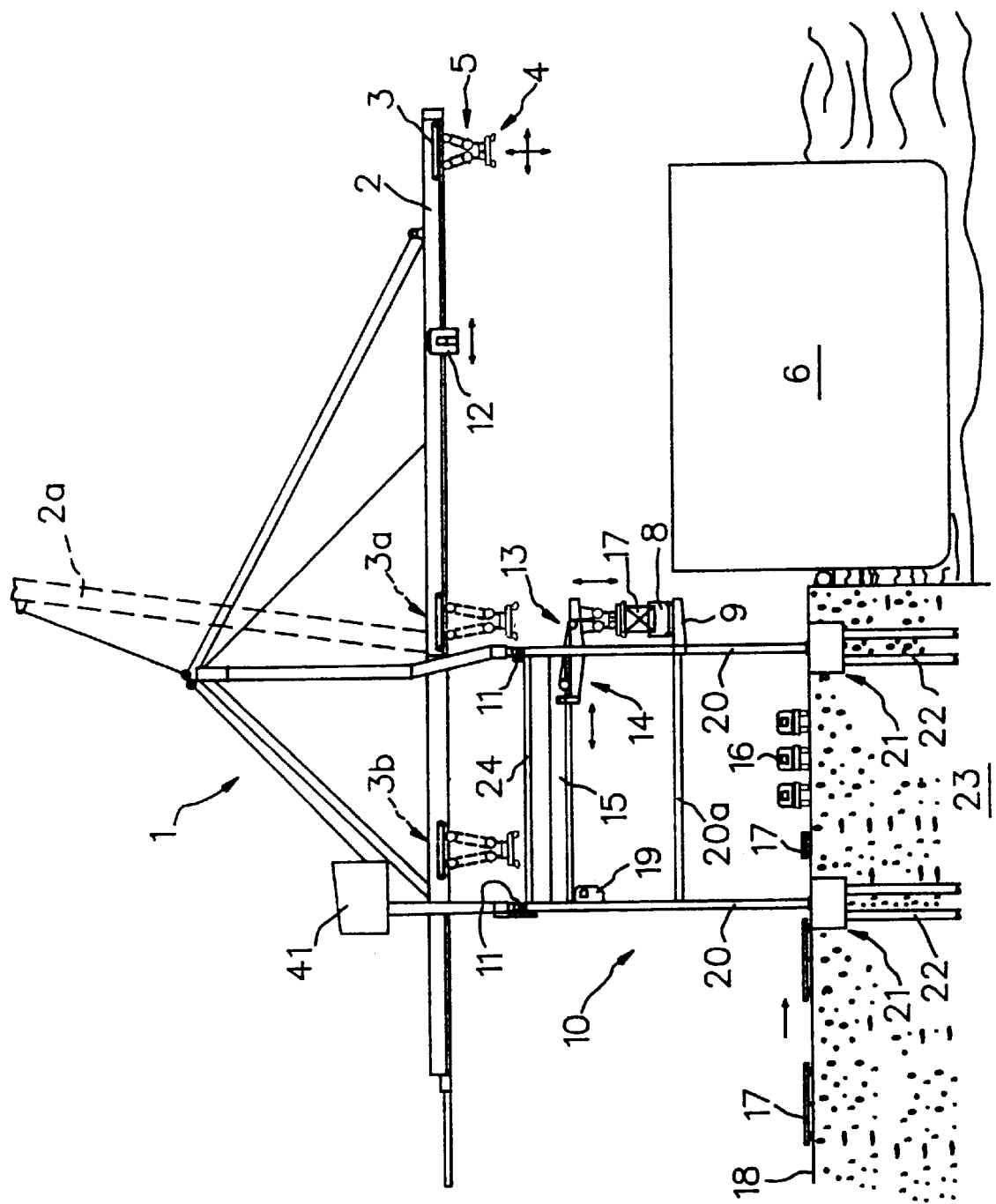
FIG. 1 is a schematic transverse section of a dock installation for loading and unloading containers of up to 40 feet or more in length with foundations on the ground, showing the positions of the upper trolley vertically above the shuttle trolley and above an automatic handling device at ground level.
Figure 20:
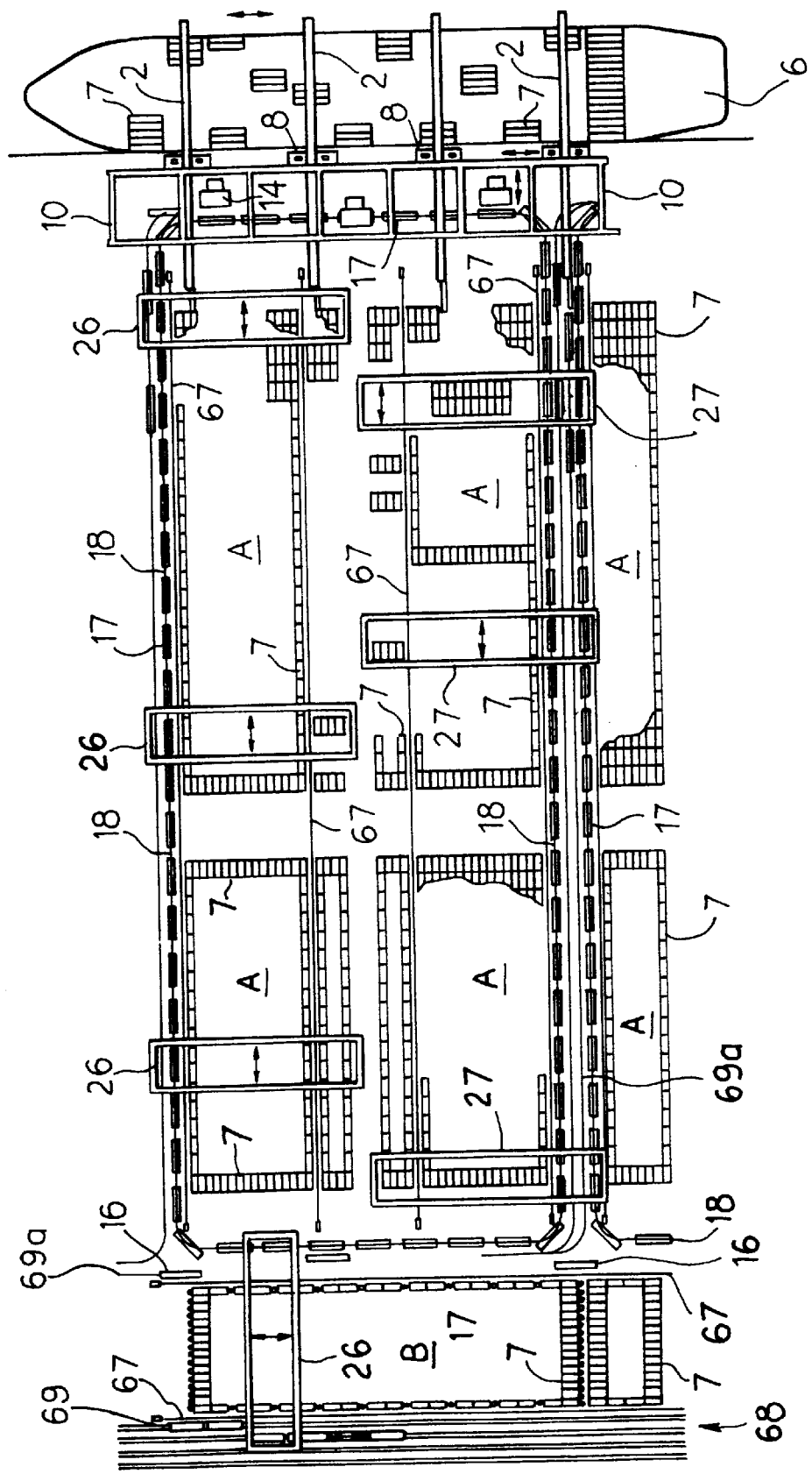
Figure 21:
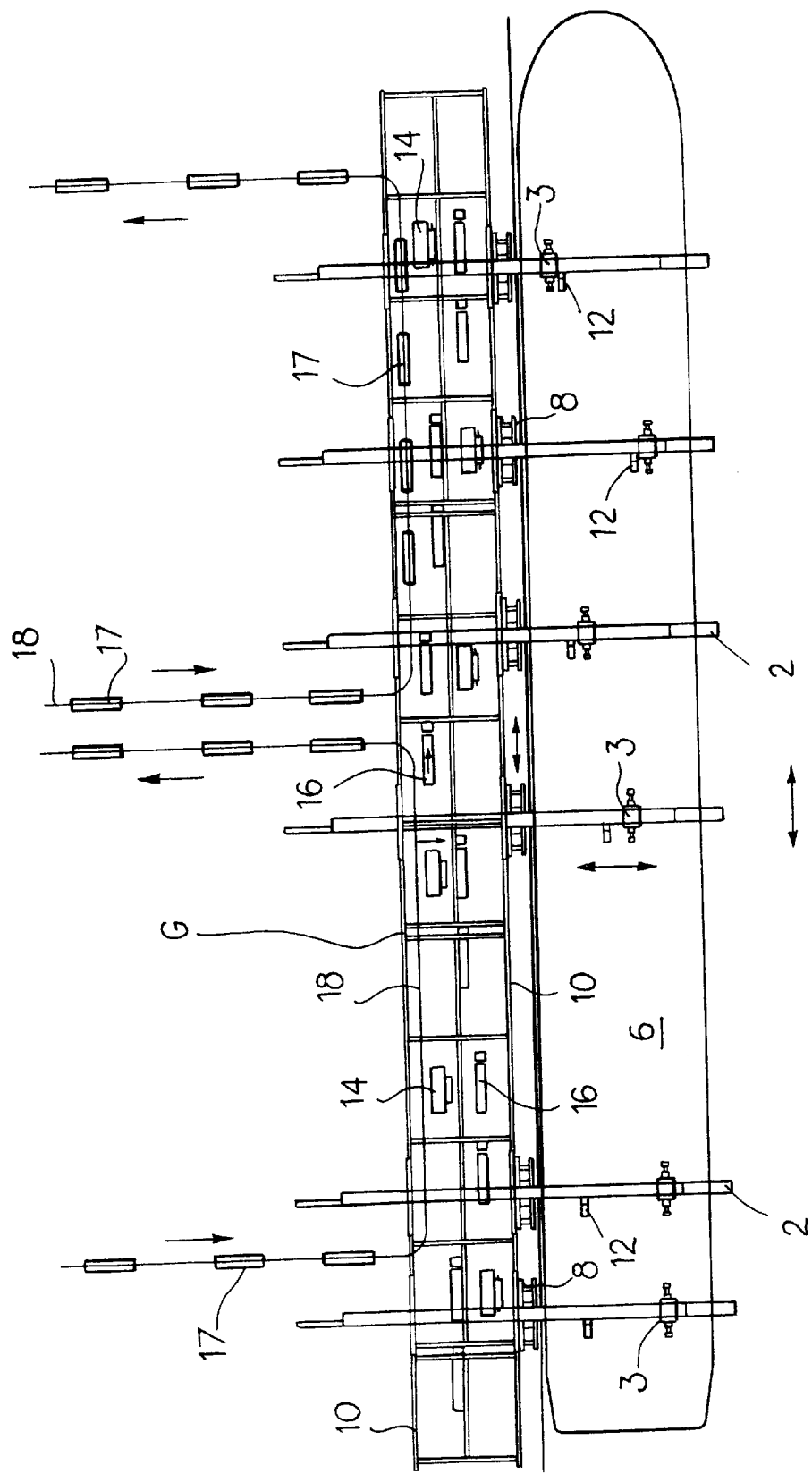
Figure 24:
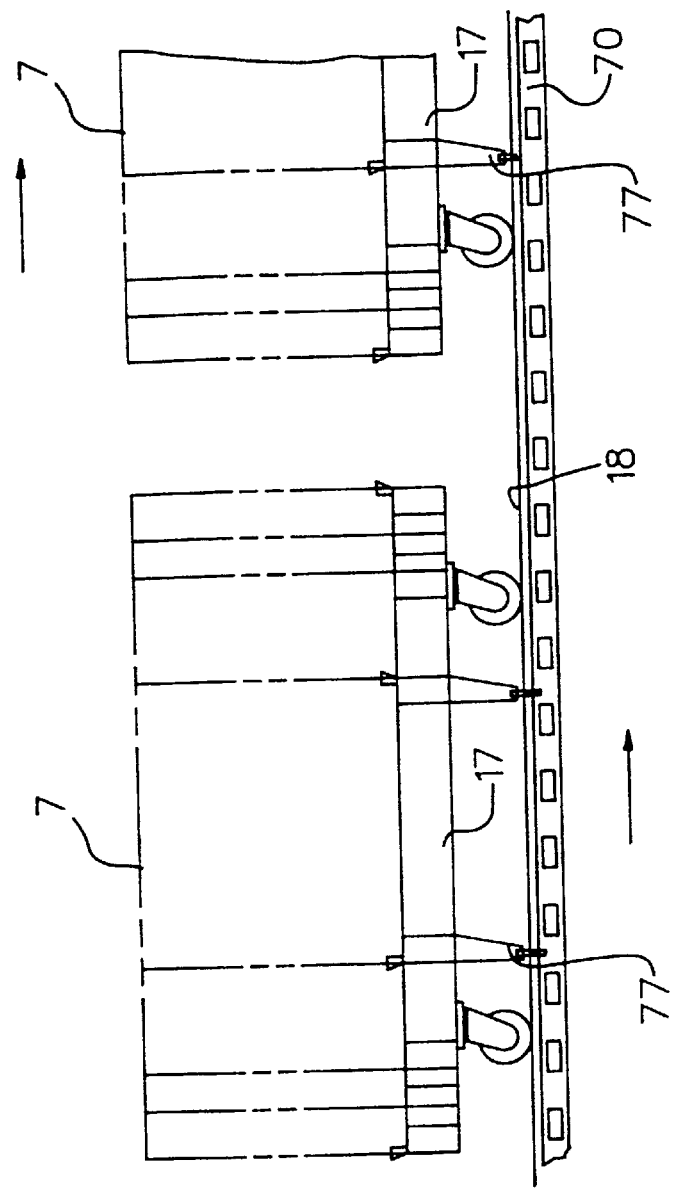
Figure 25:
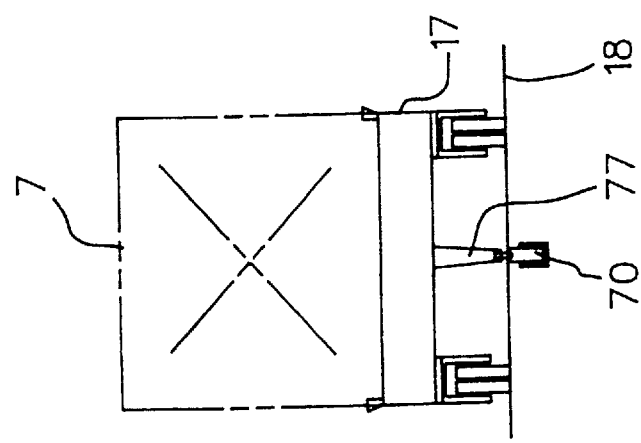
Figure 30:
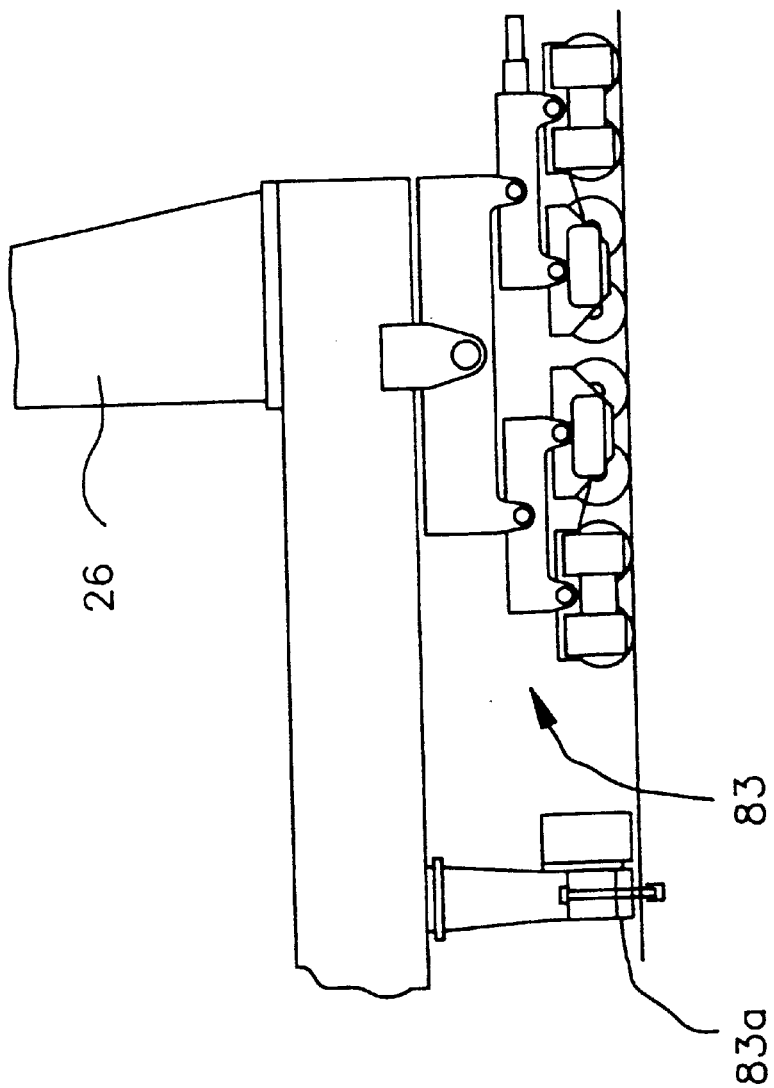
Figure 31:
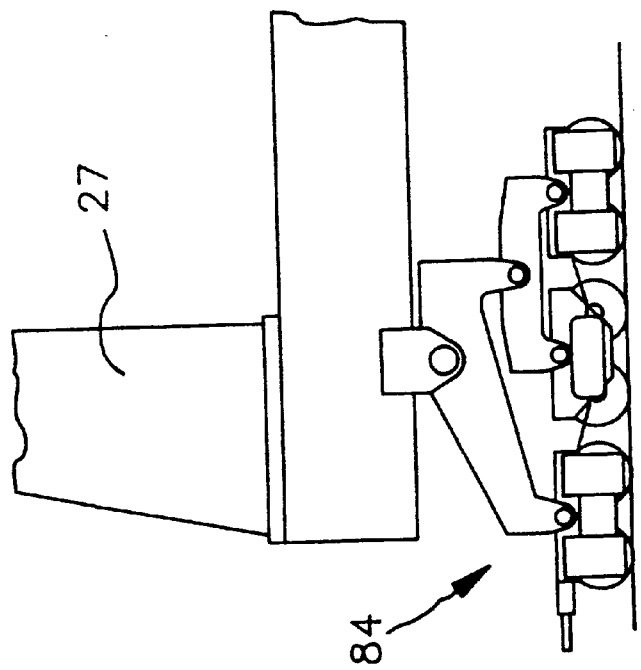
Figure 34:
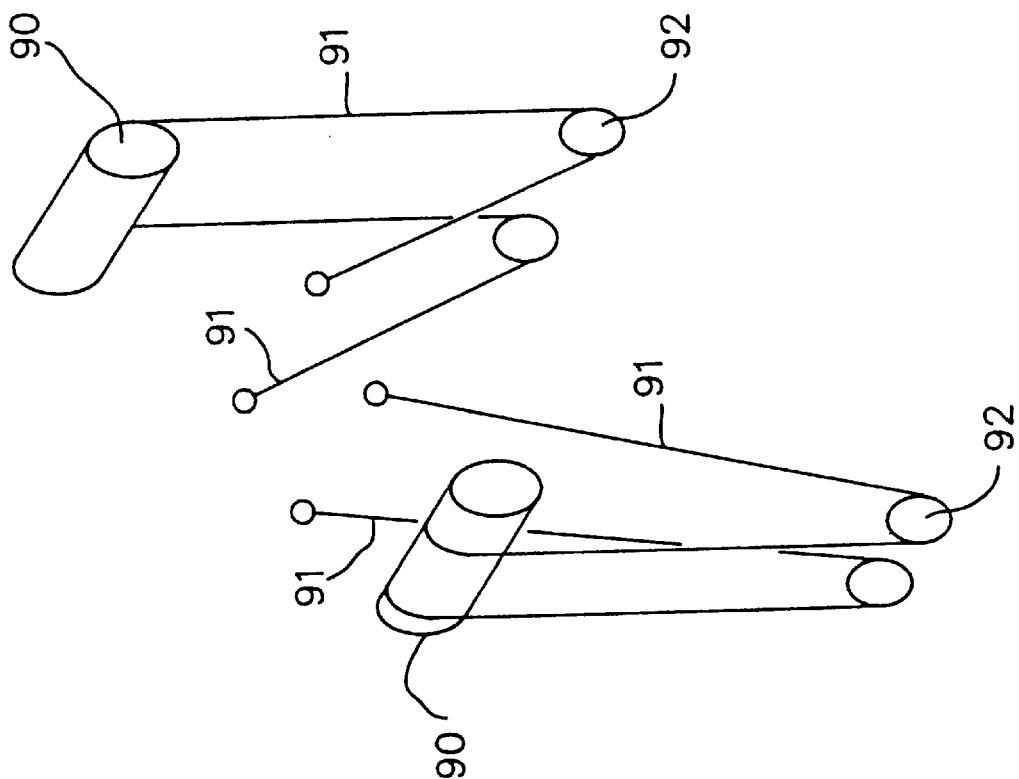
Figure 33:
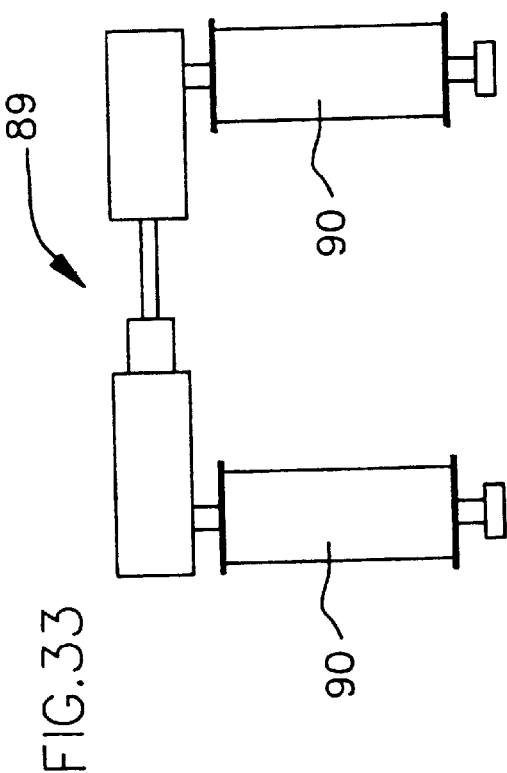
Figure 37:
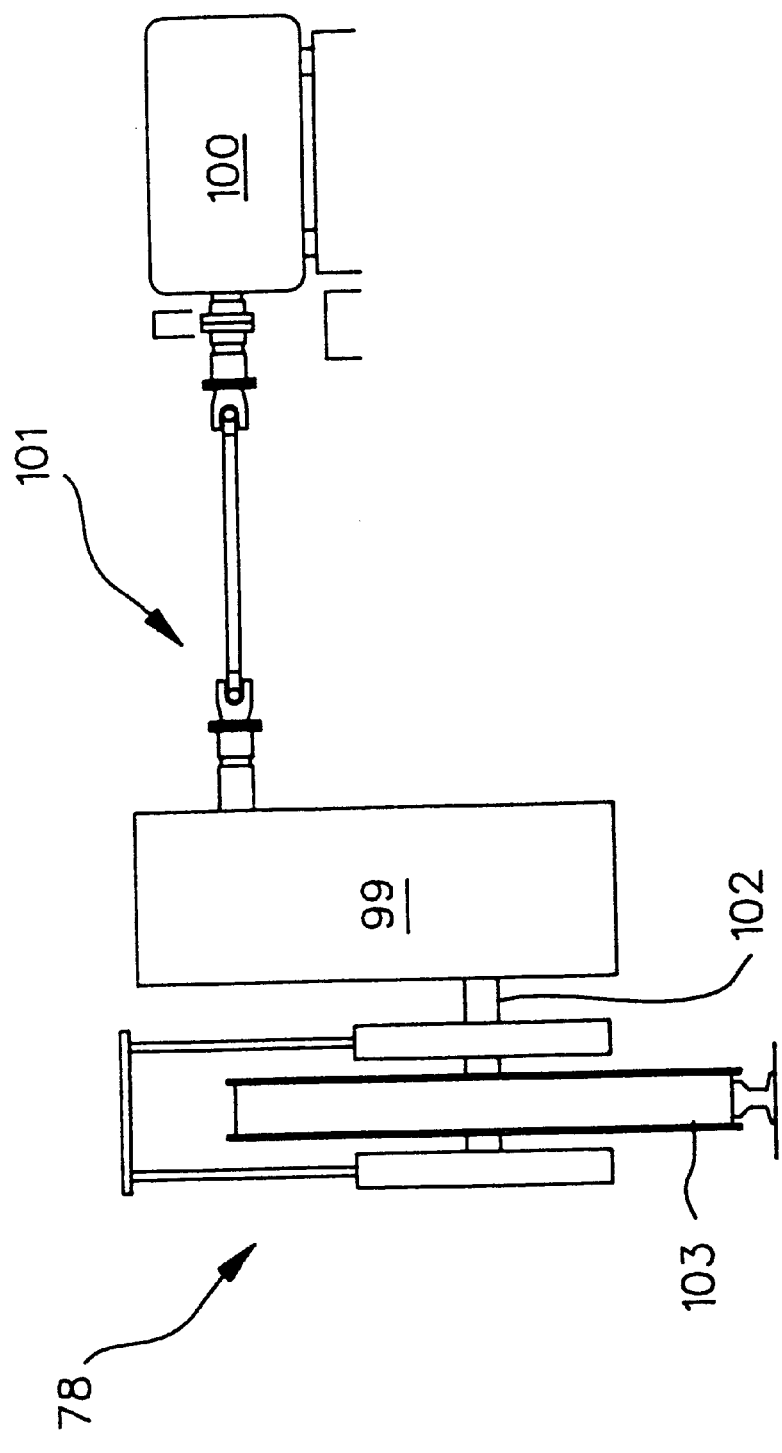
Figures 38, 39:
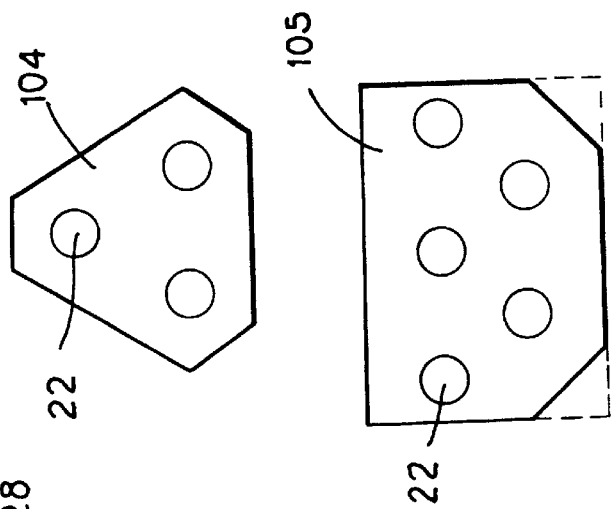
Figure 40:
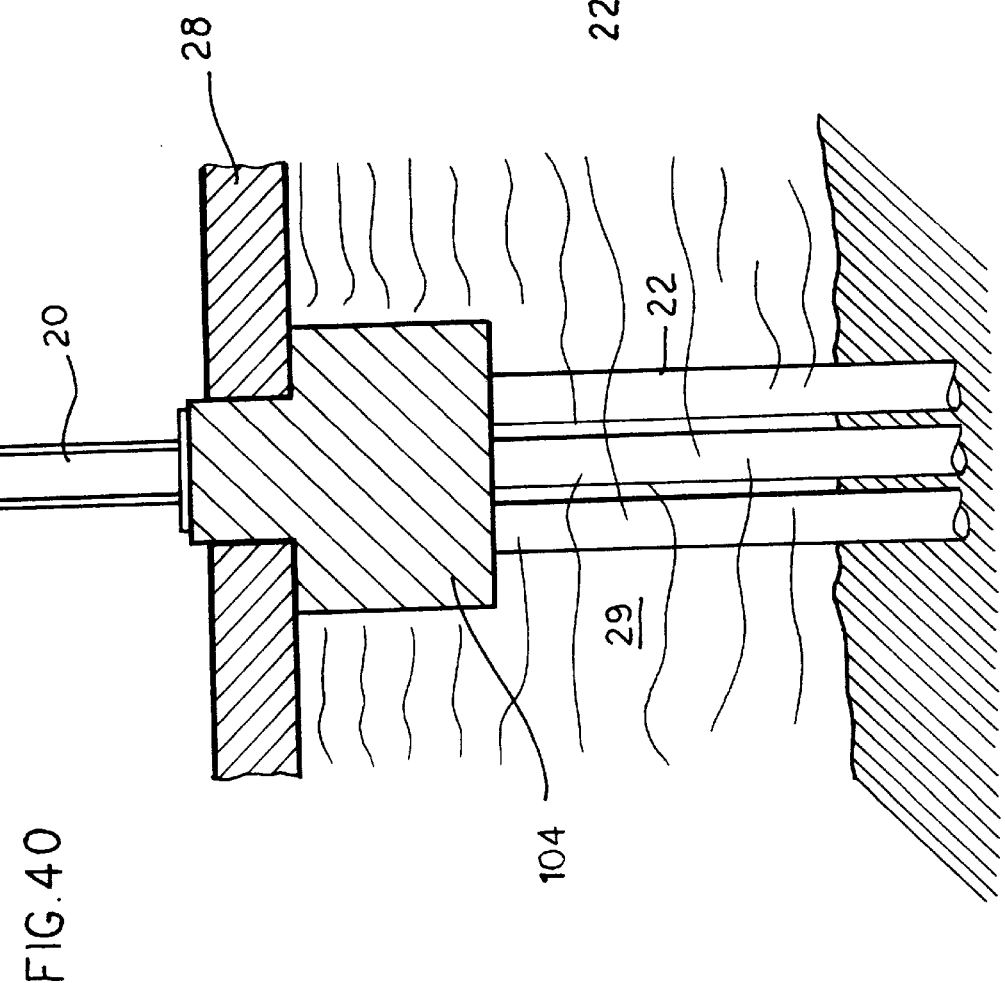
Figure 44:
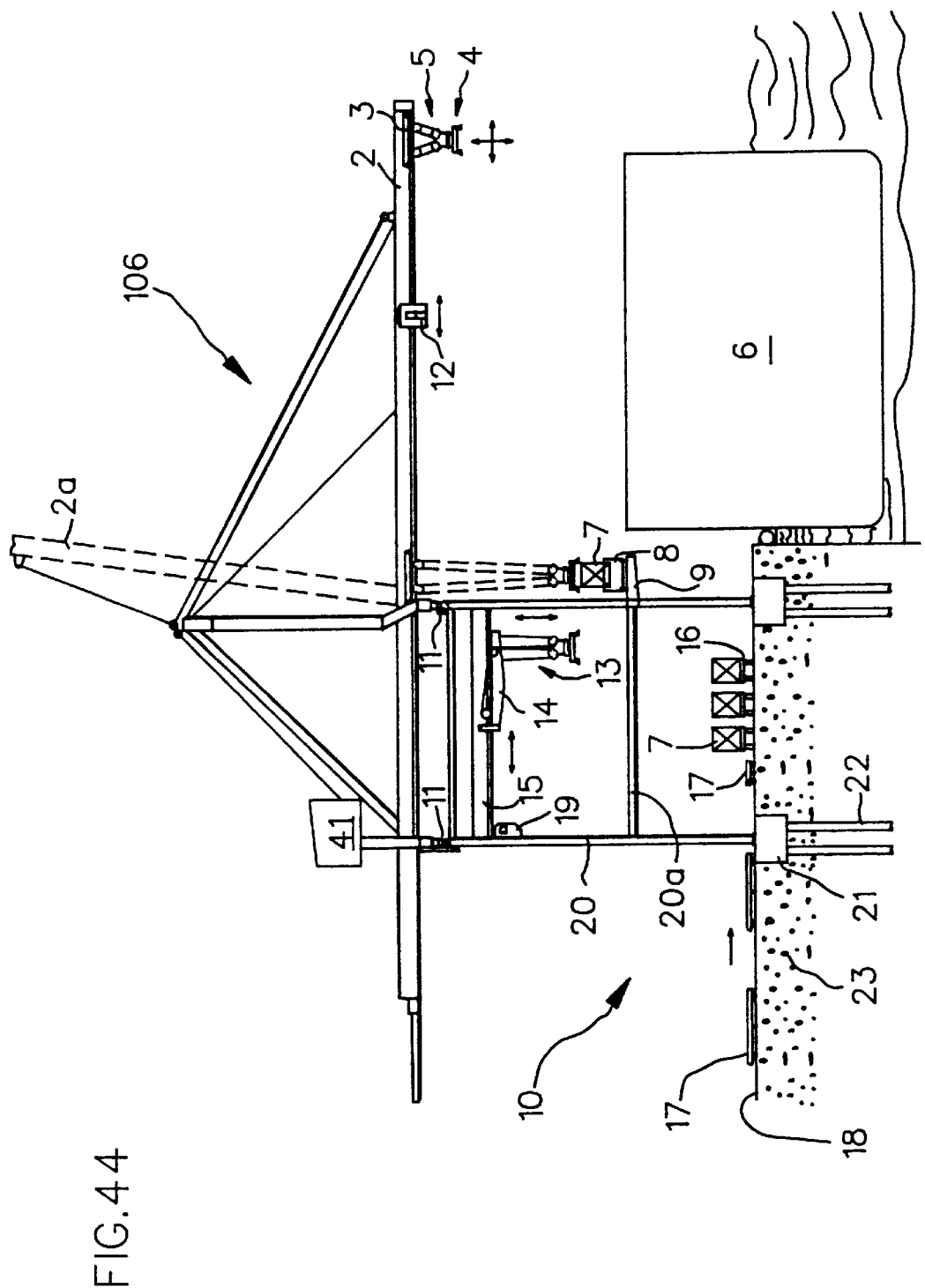
Figure 45:
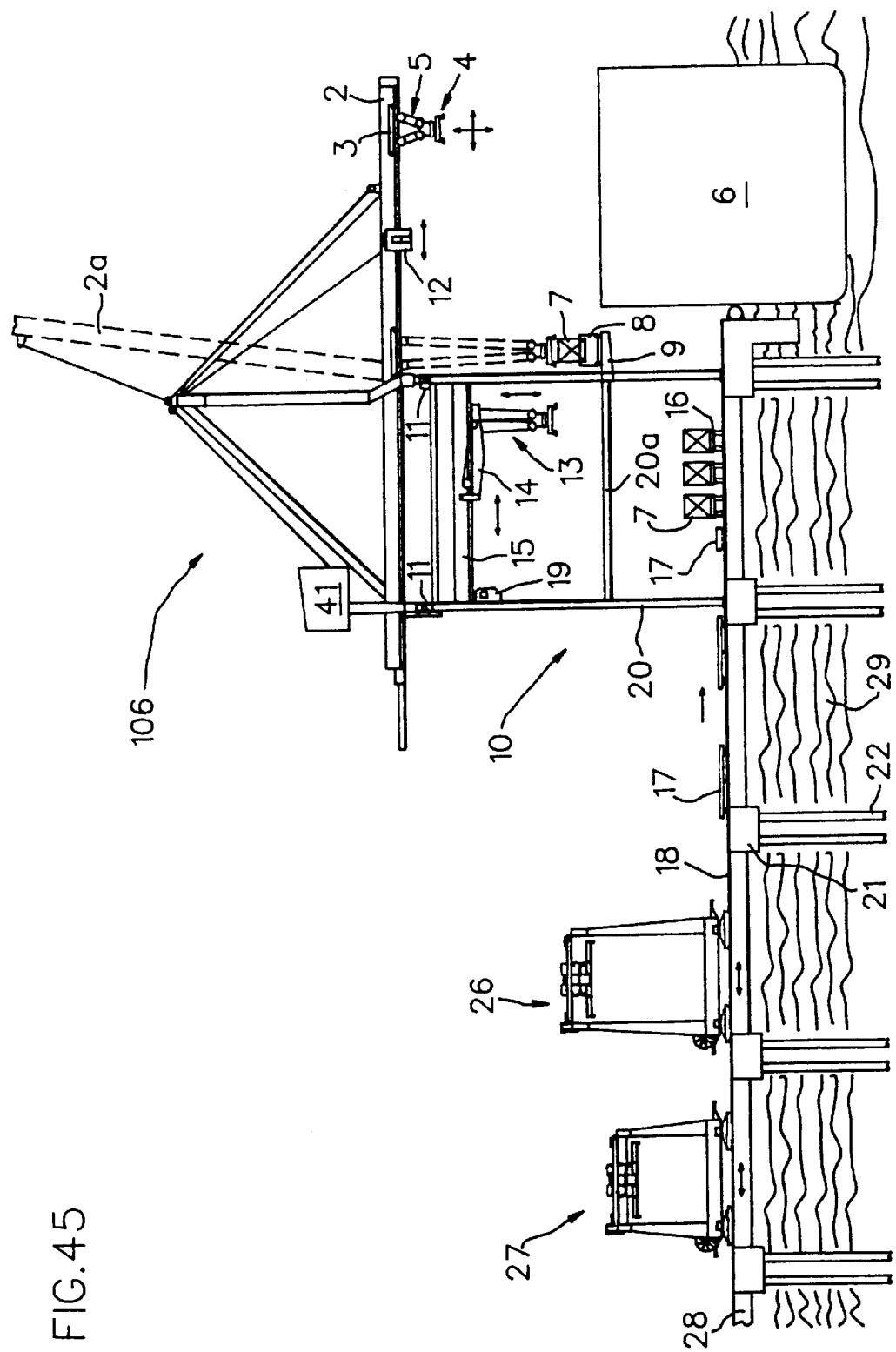
Figure 46:
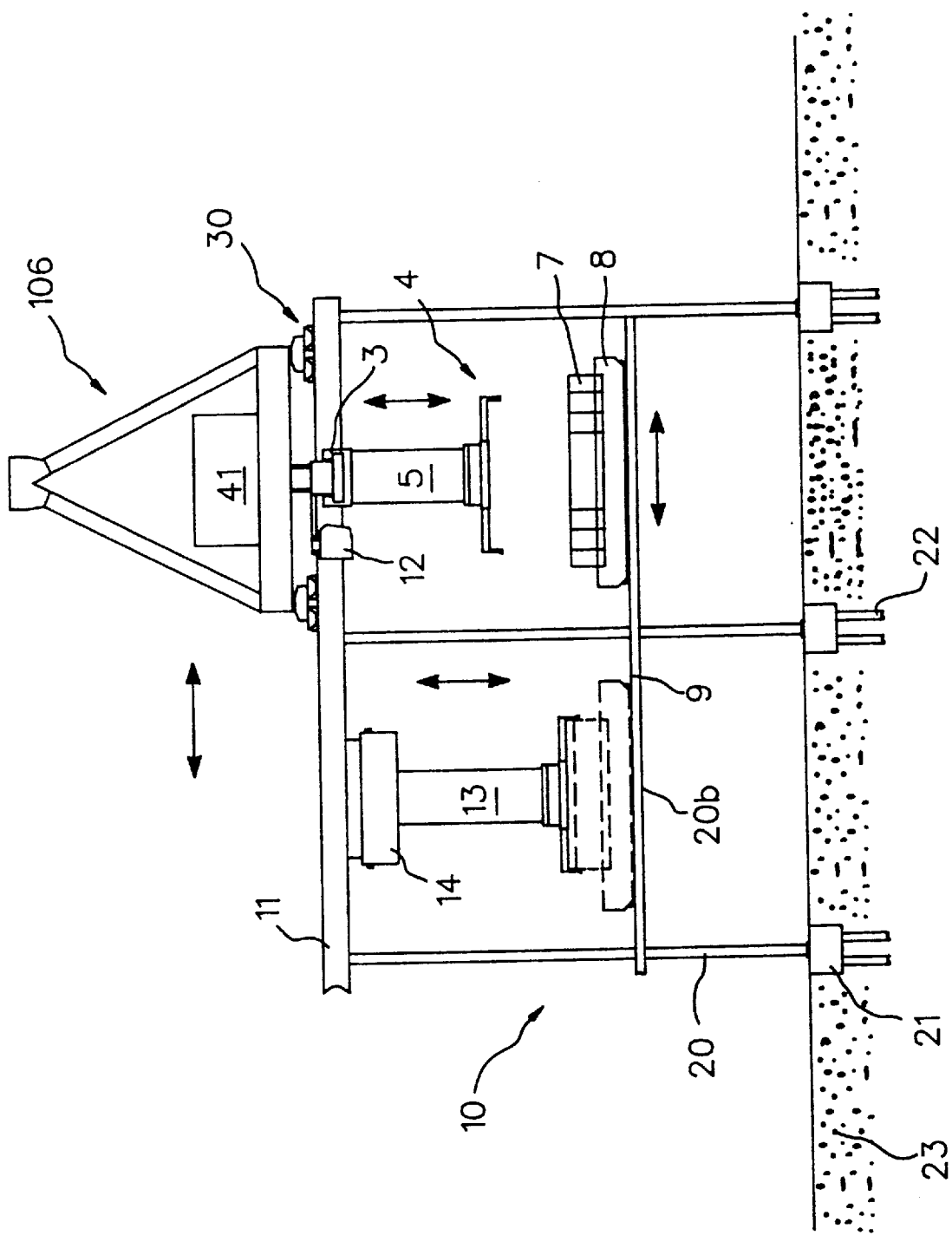
Figure 47:
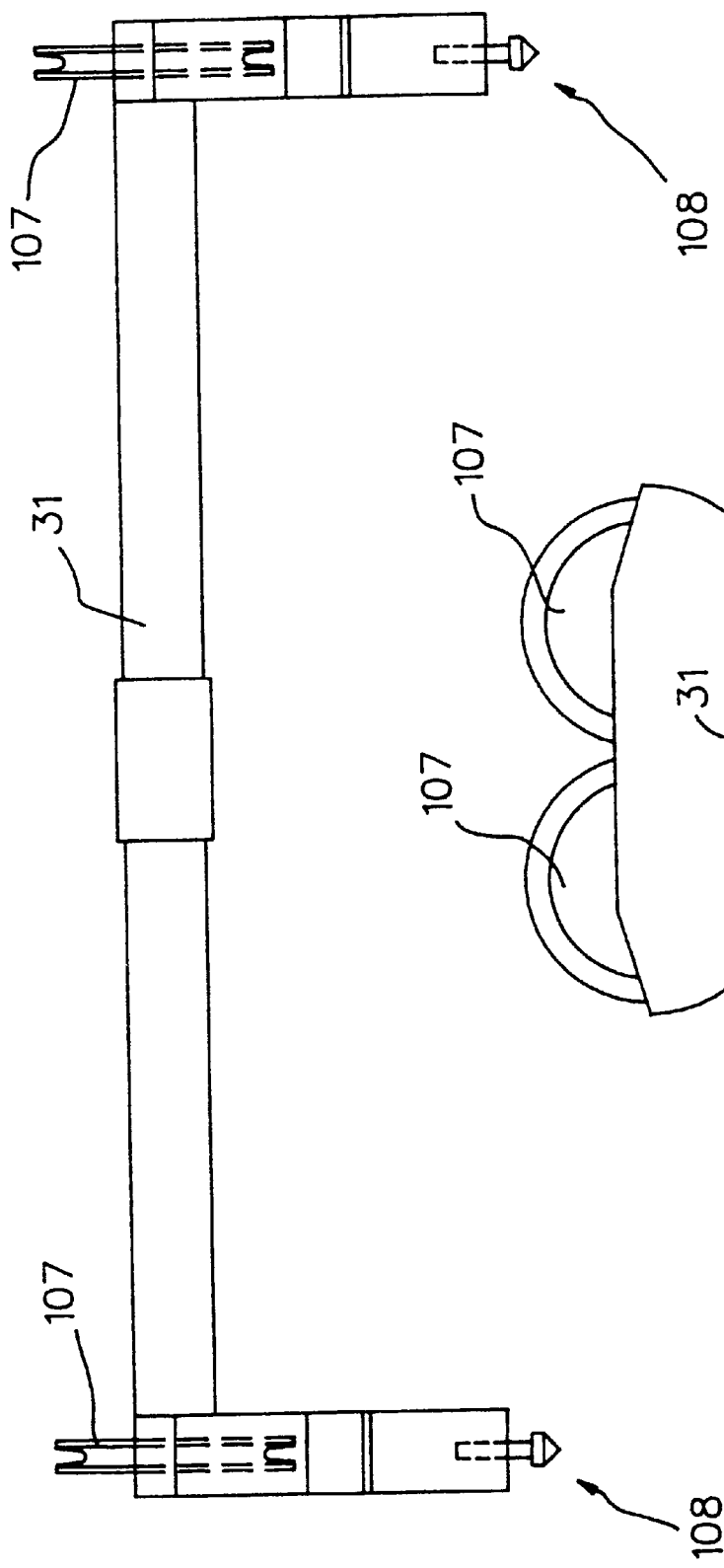
Figure 48:
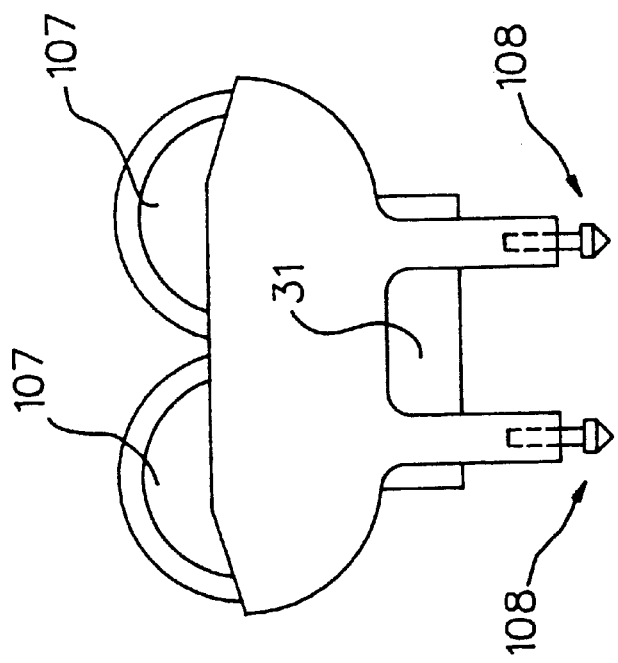
Figure 52:
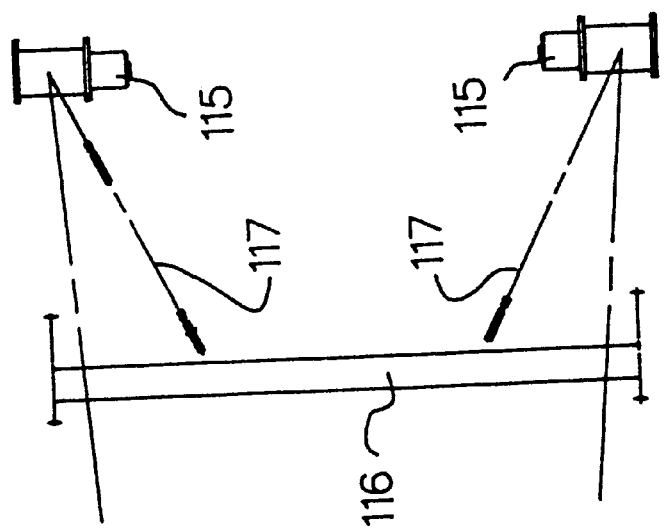
Figure 51:
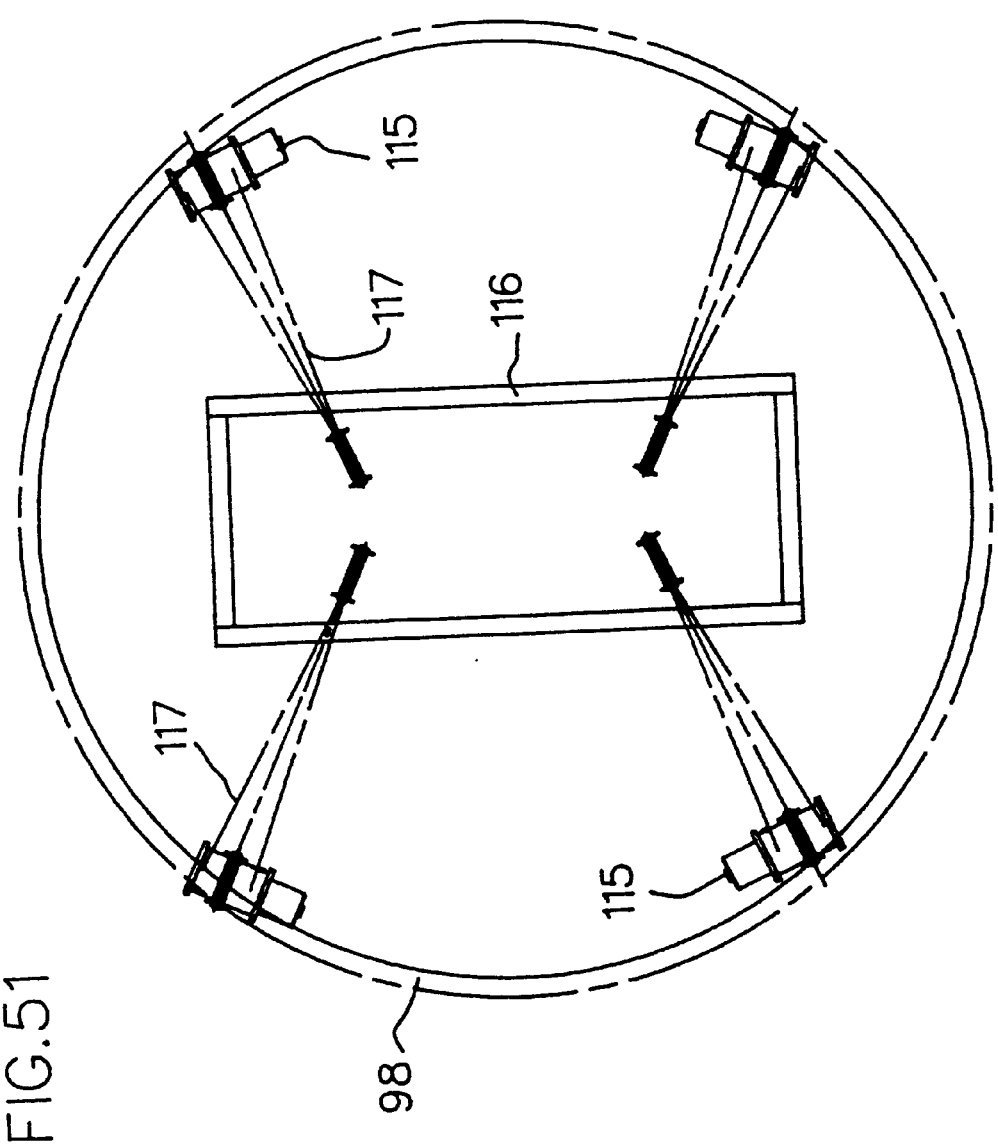
Figures 53, 53A:
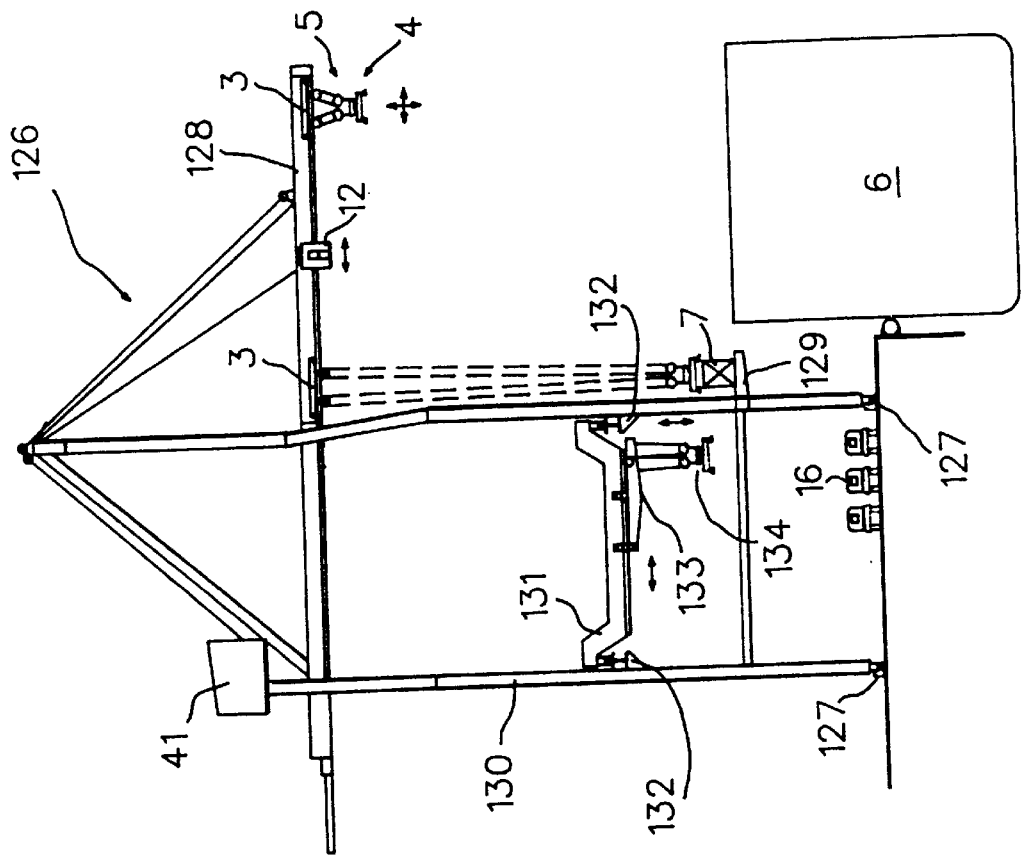
Figure 58:
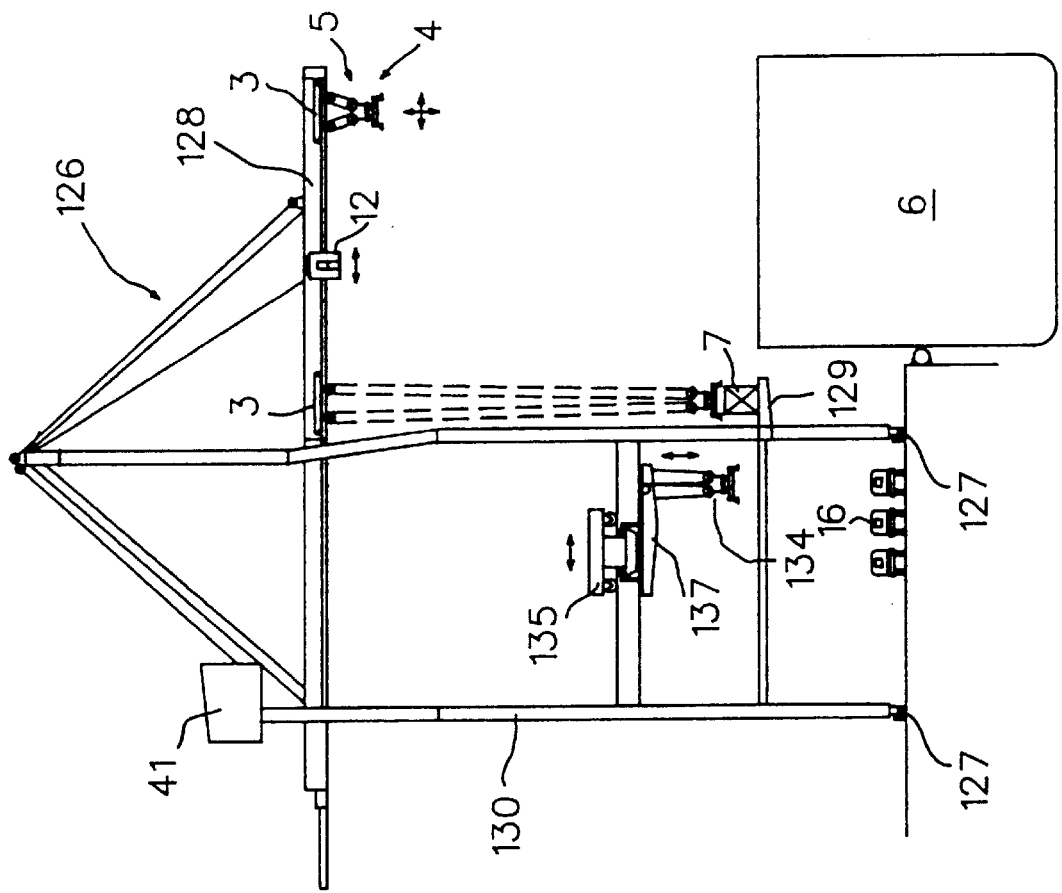
Figure 59:
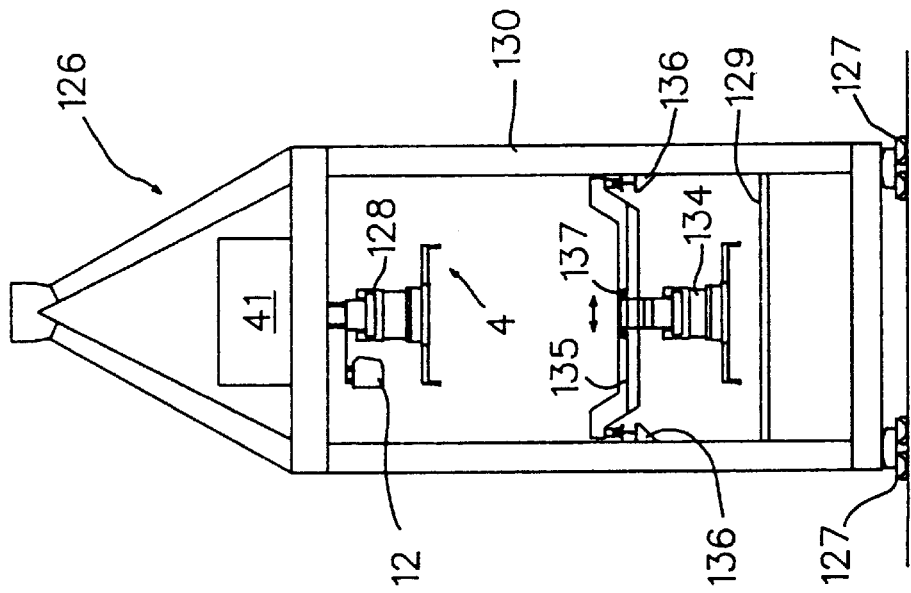
Figure 60:
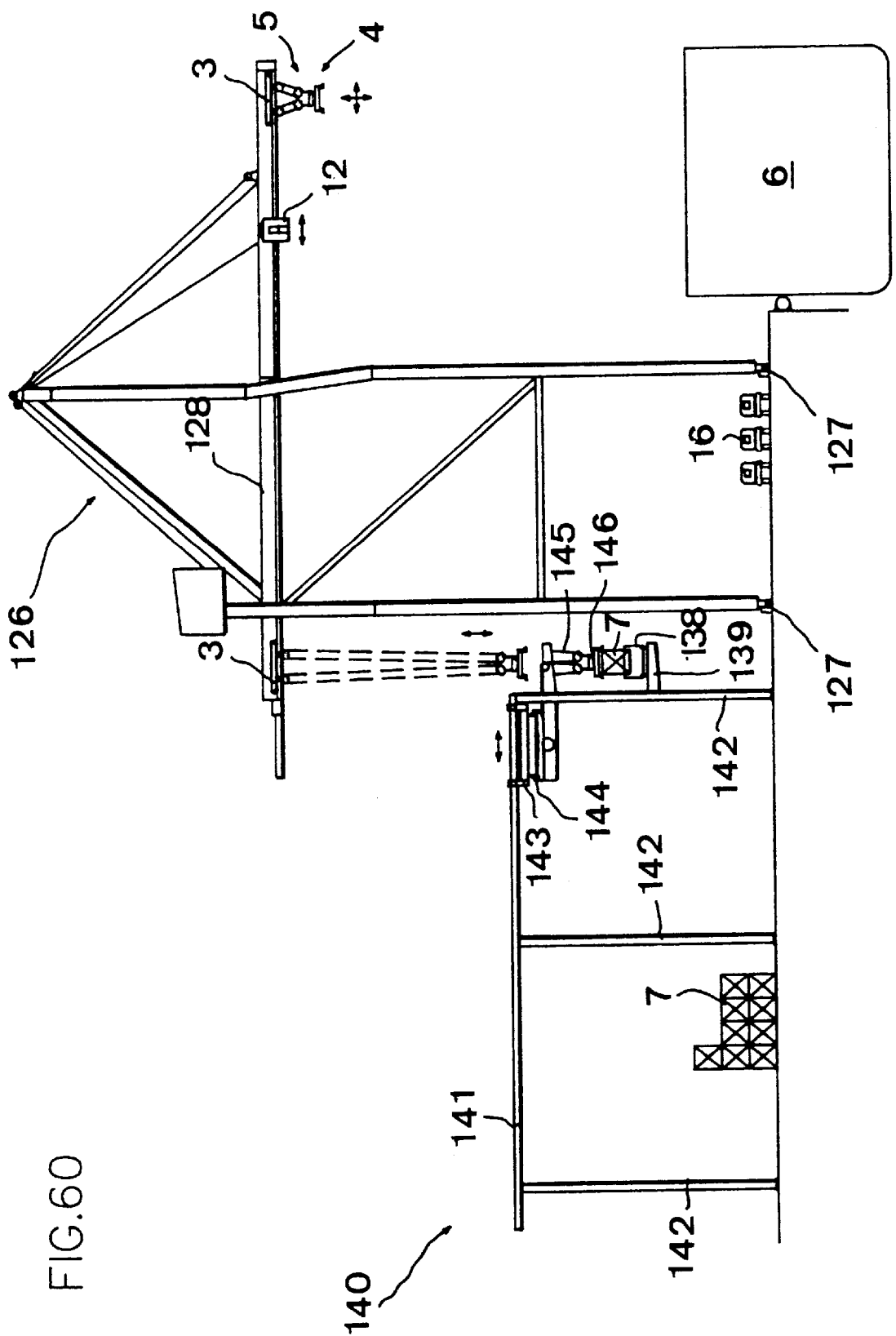
Figure 61:
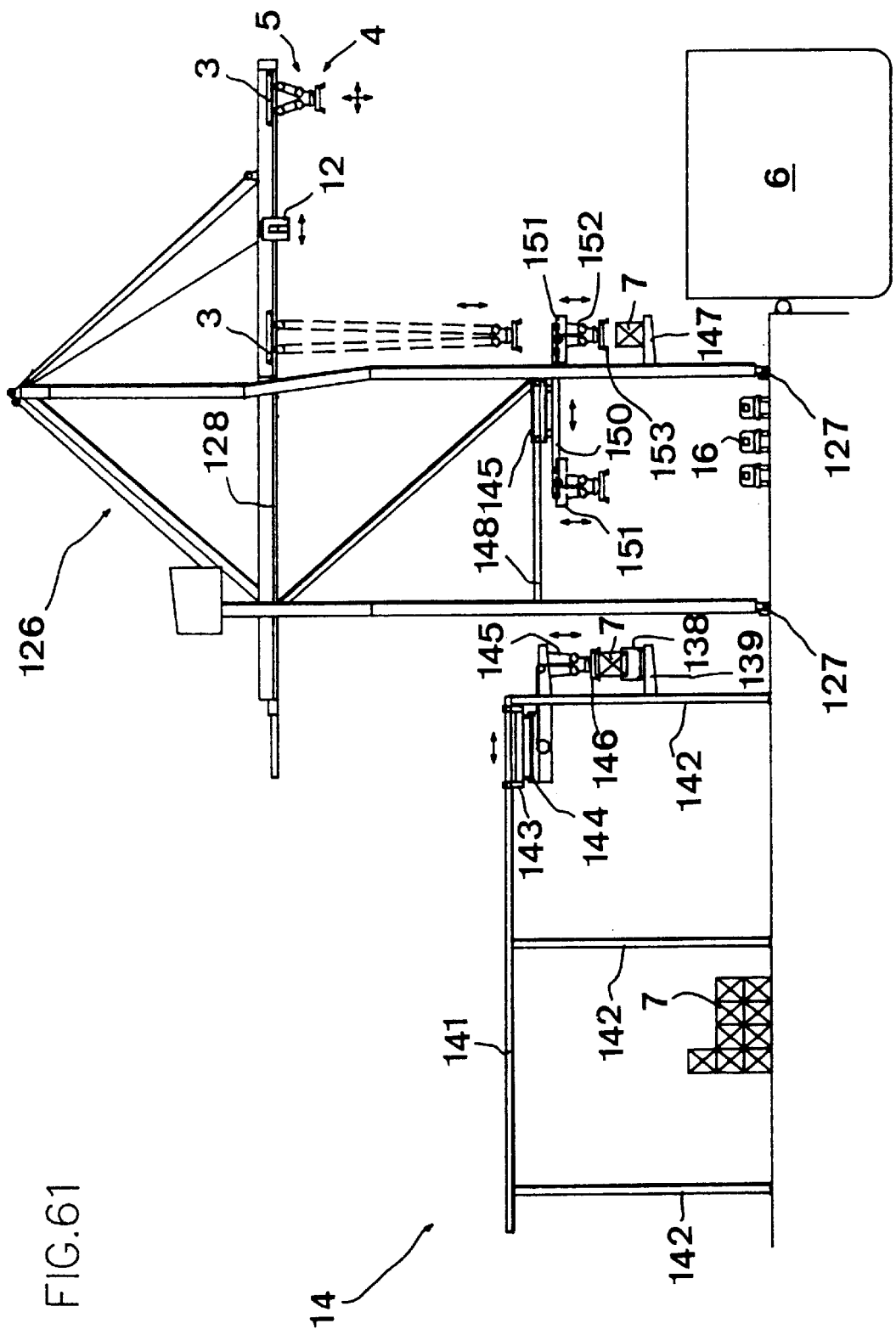
Figure 64:
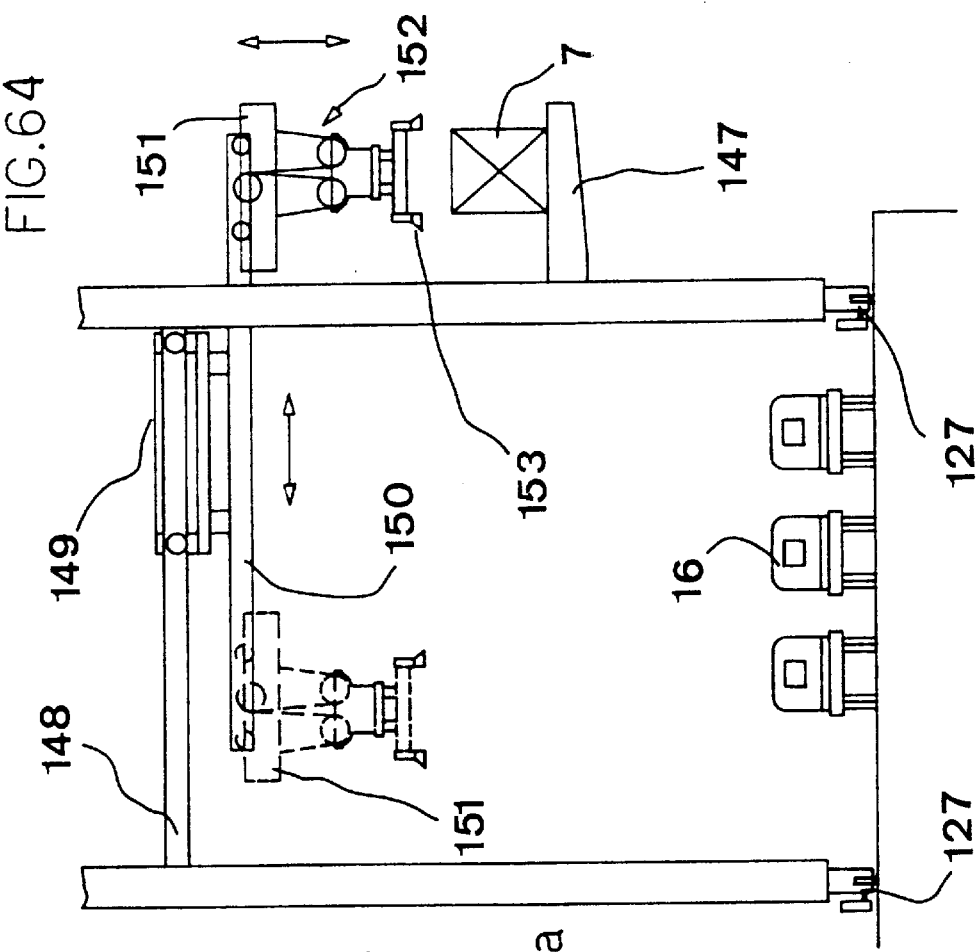
Figure 65:
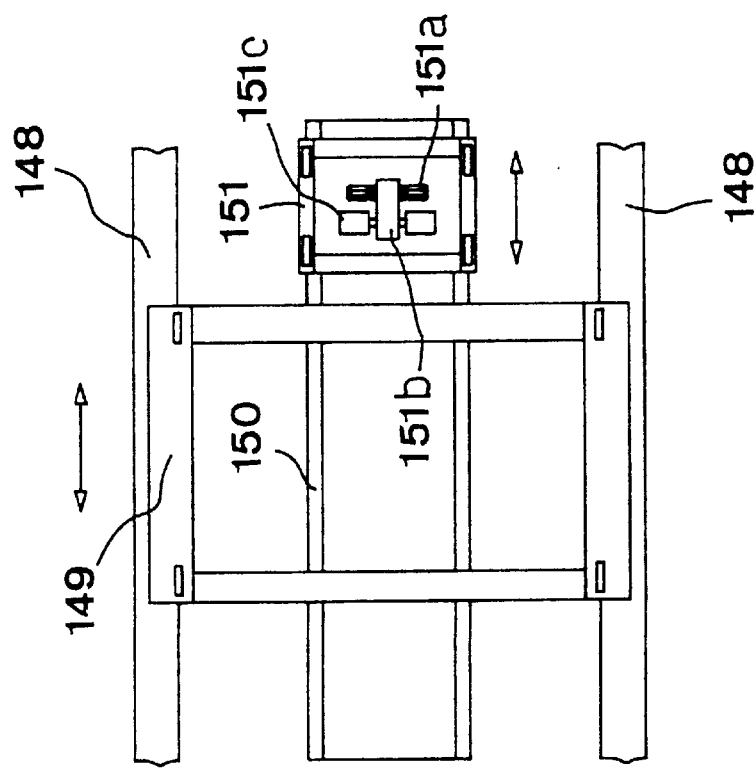
Figure 66:
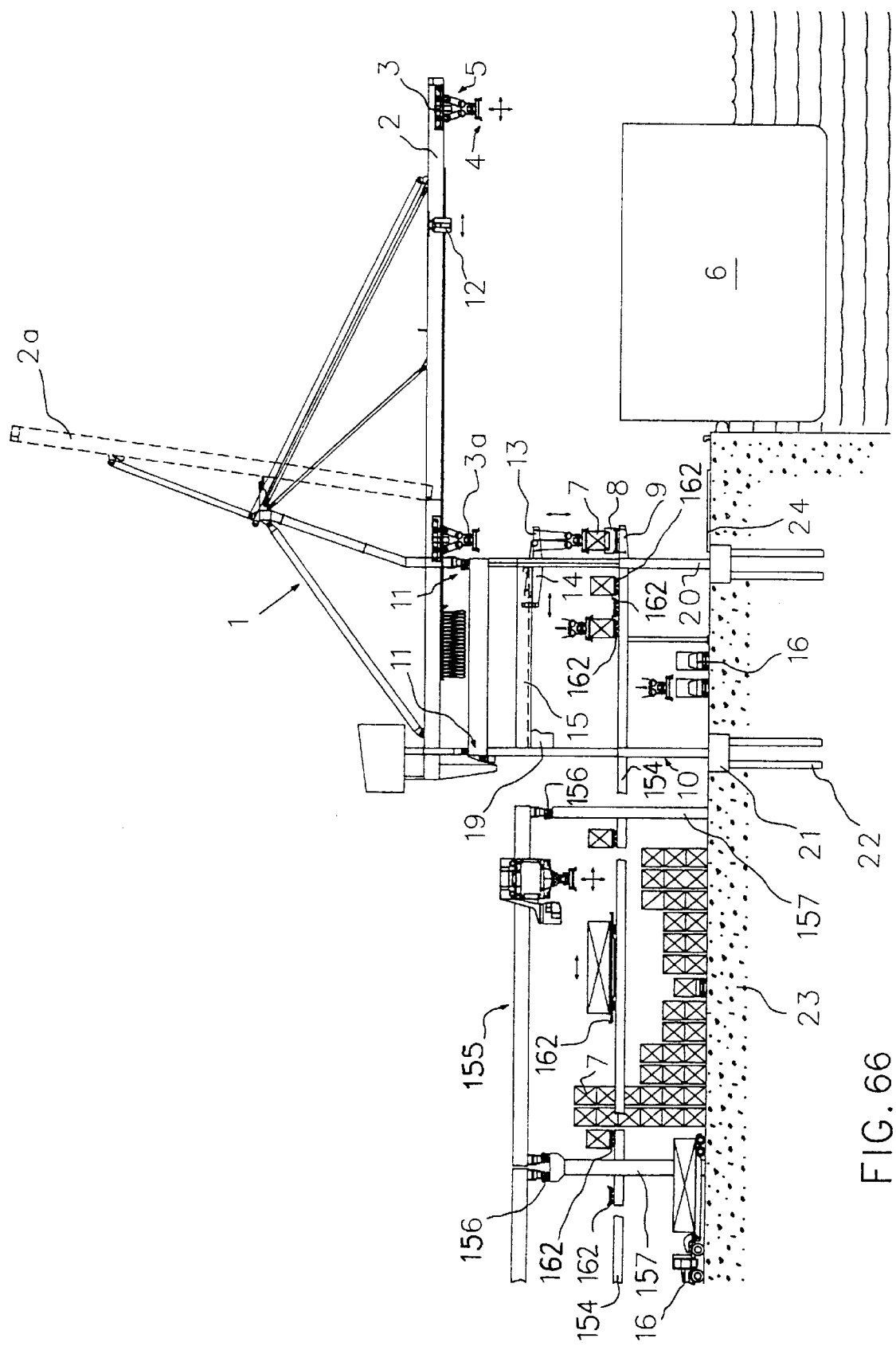
Figure 67:
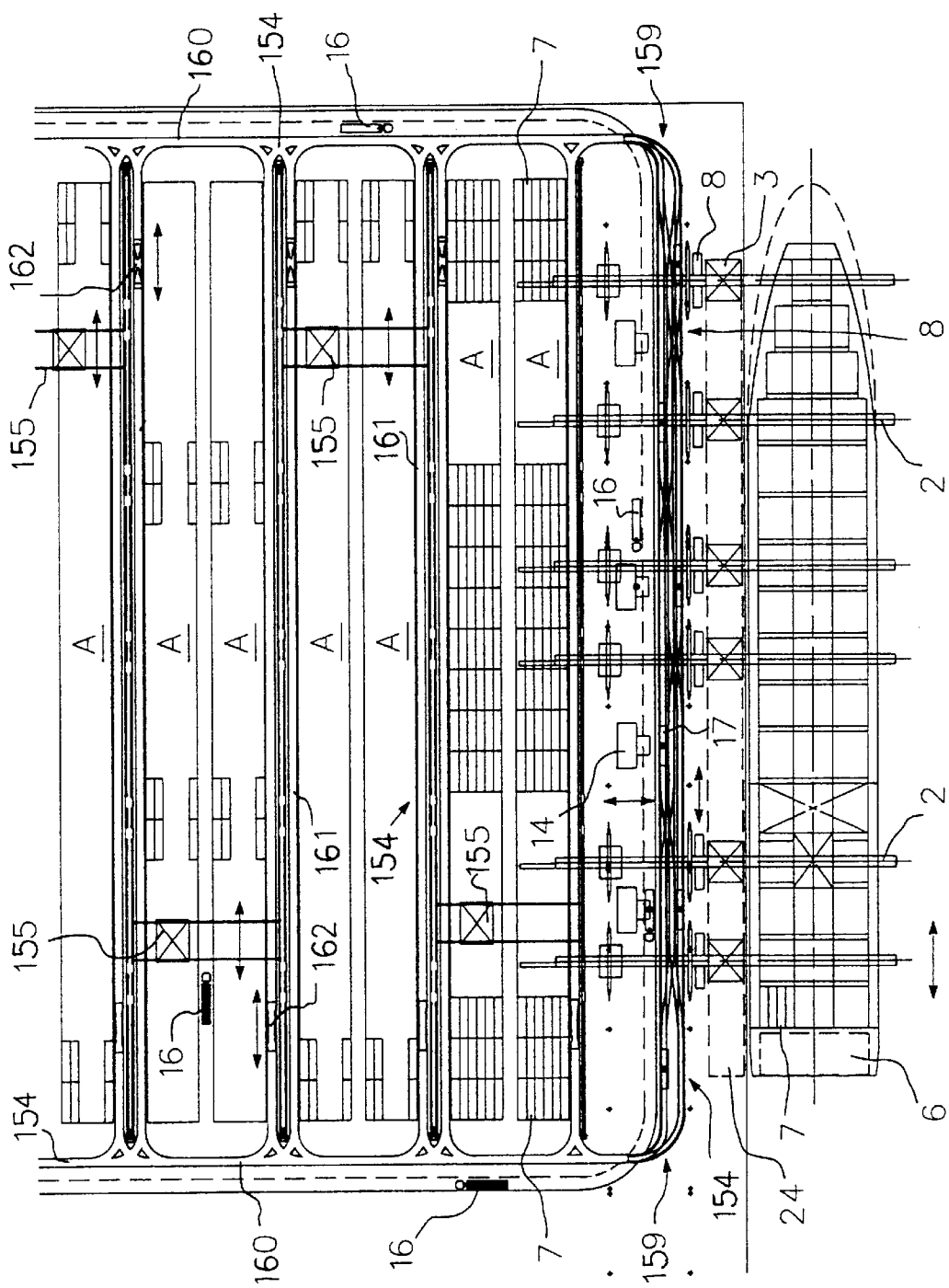
Figure 68:
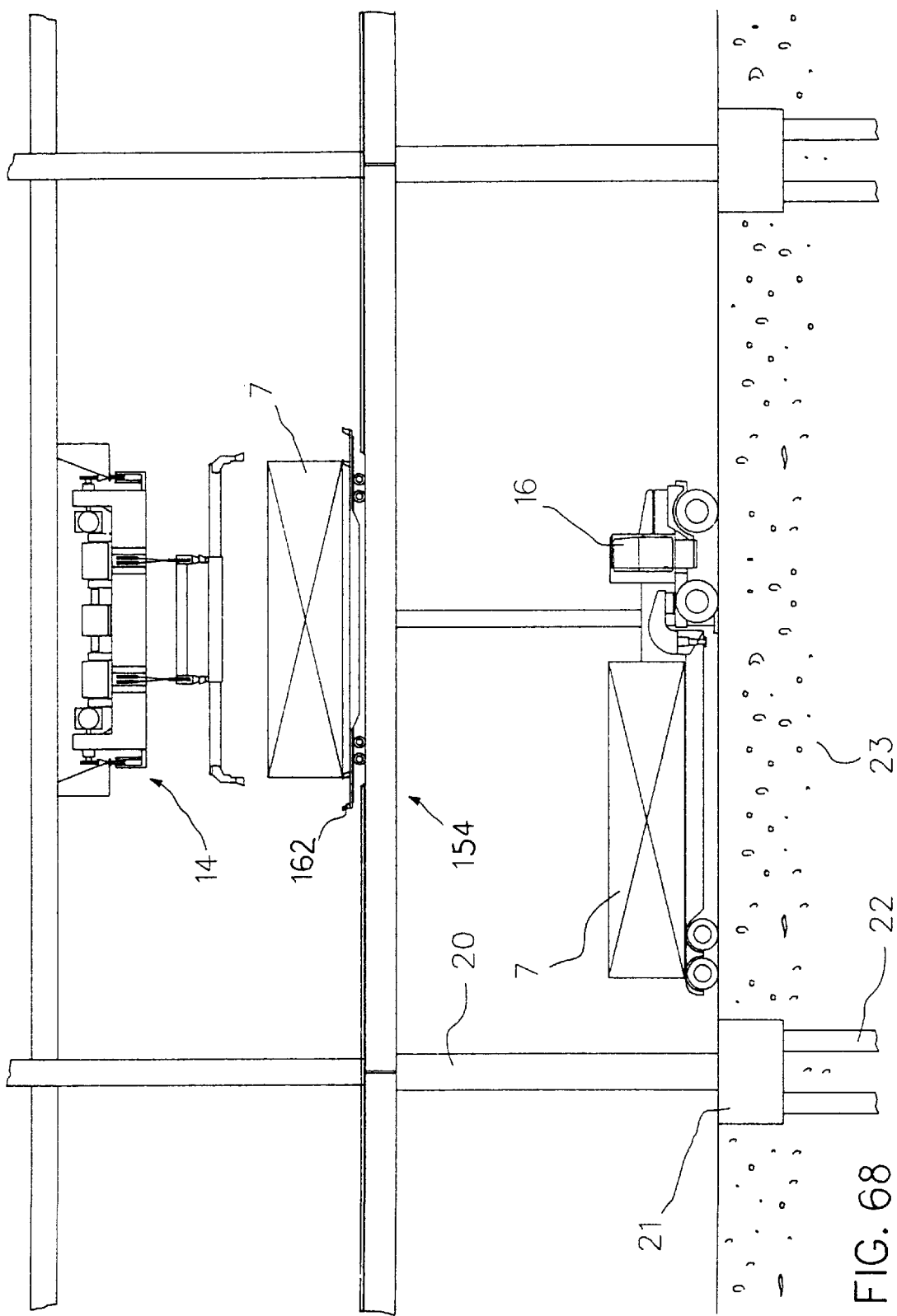
Figure 69:
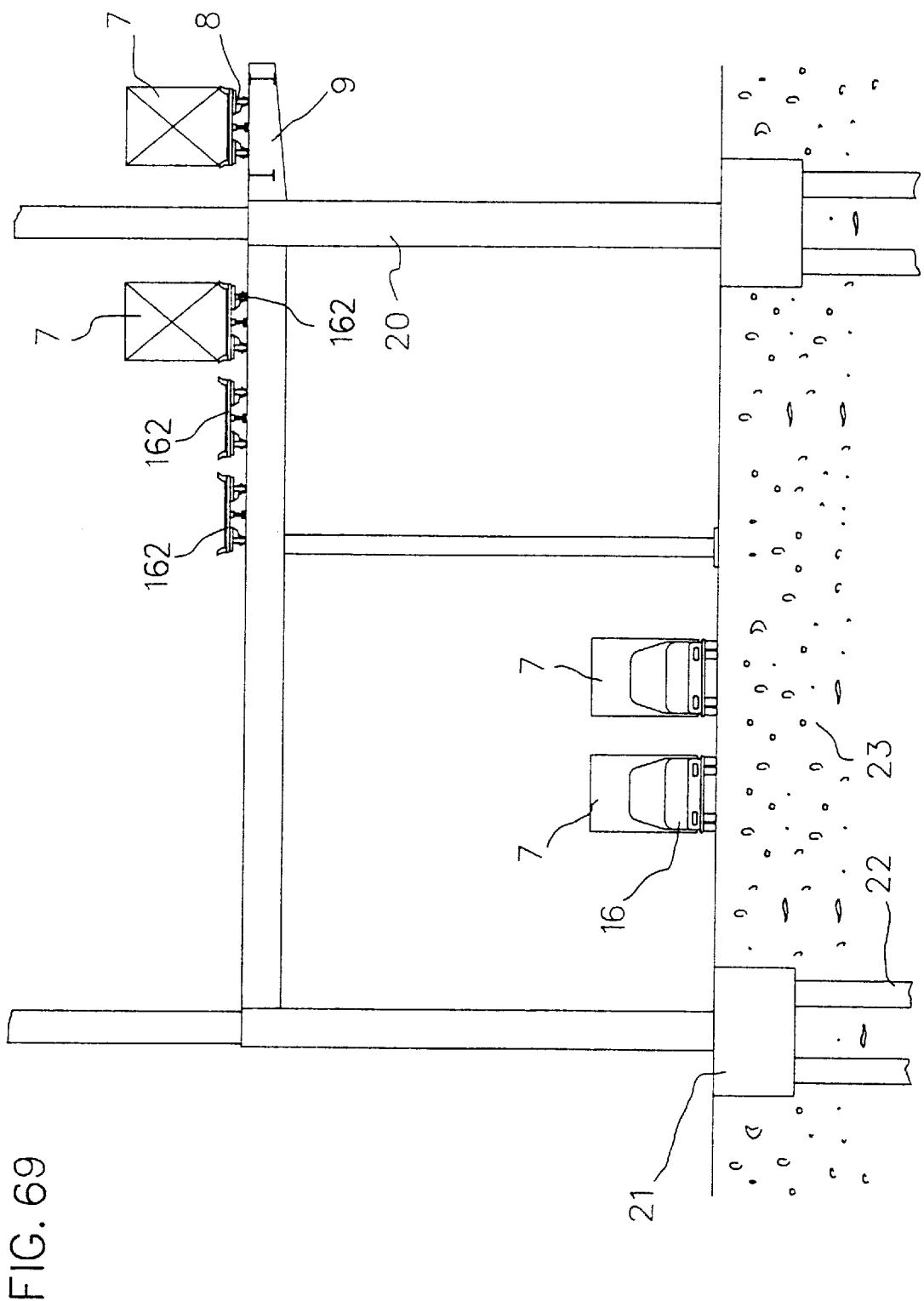
Figure 70:
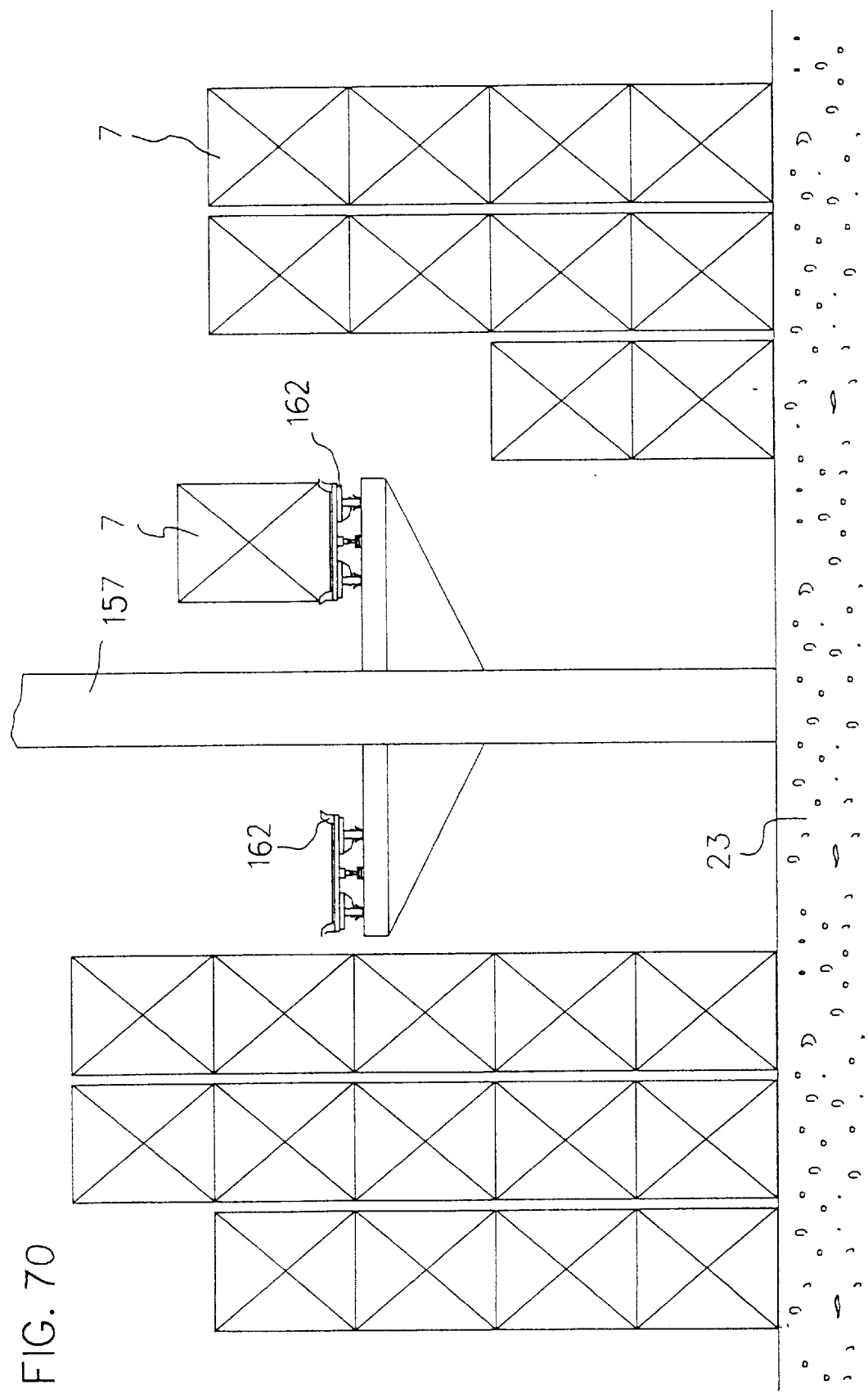
Figure 73:
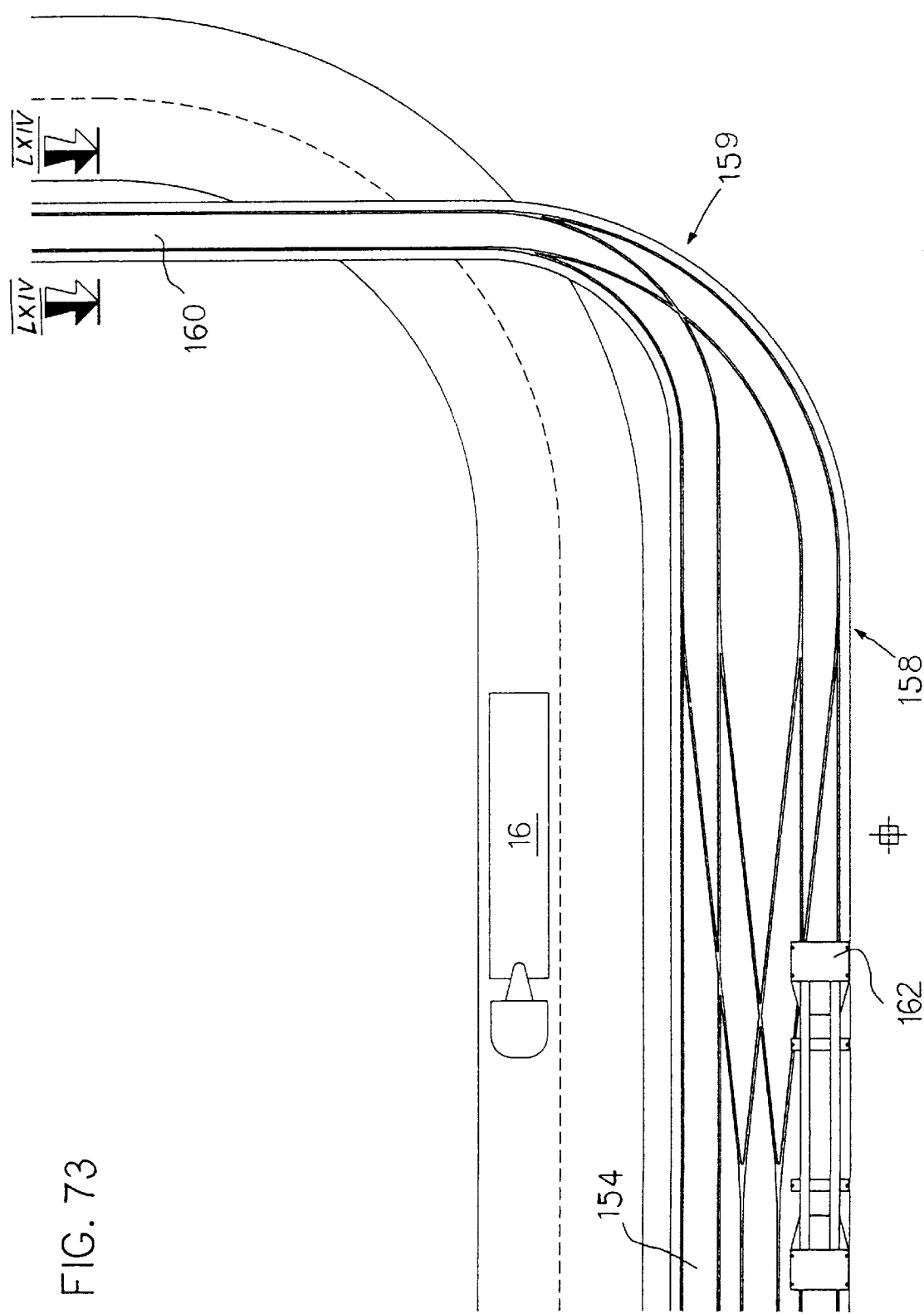
Figure 74:
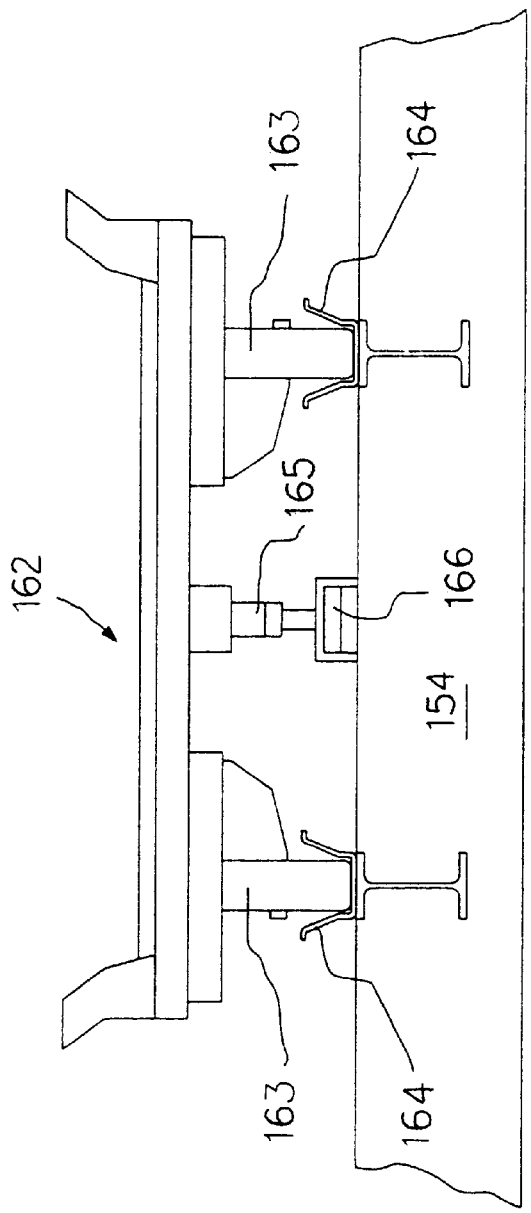
Figure 75:
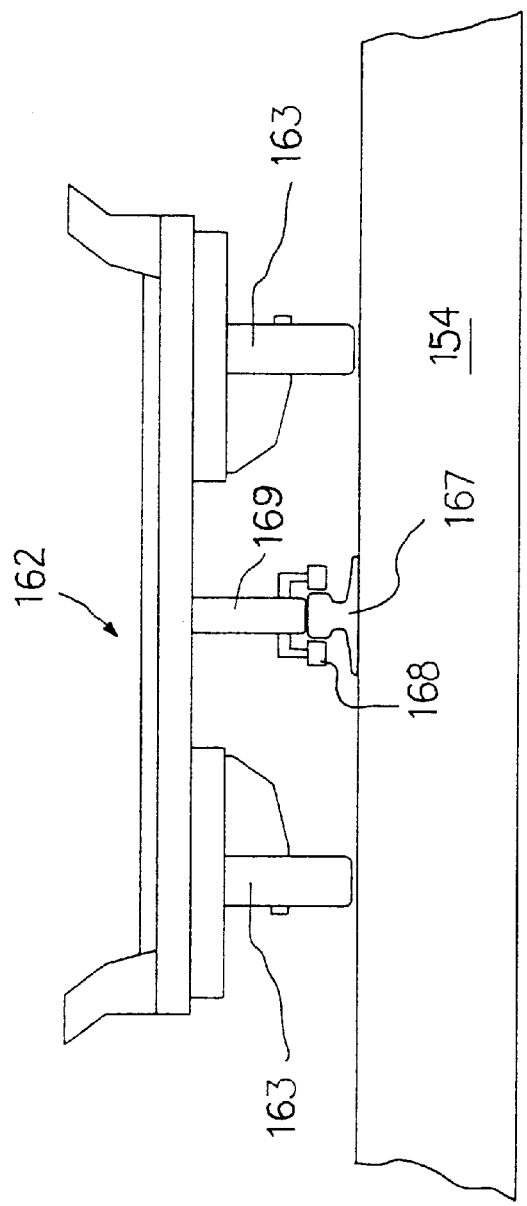
Figure 76:
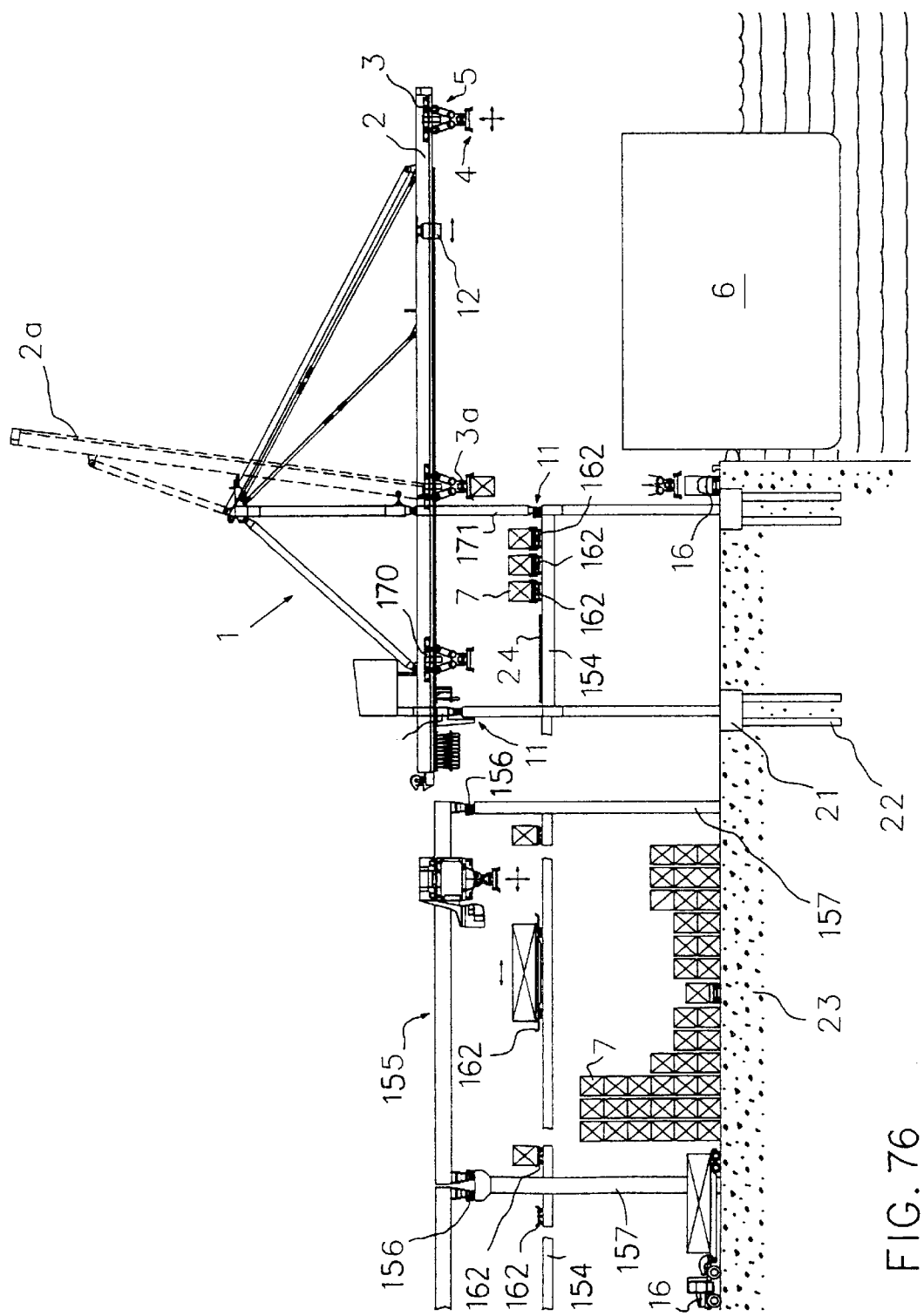
Figure 77:
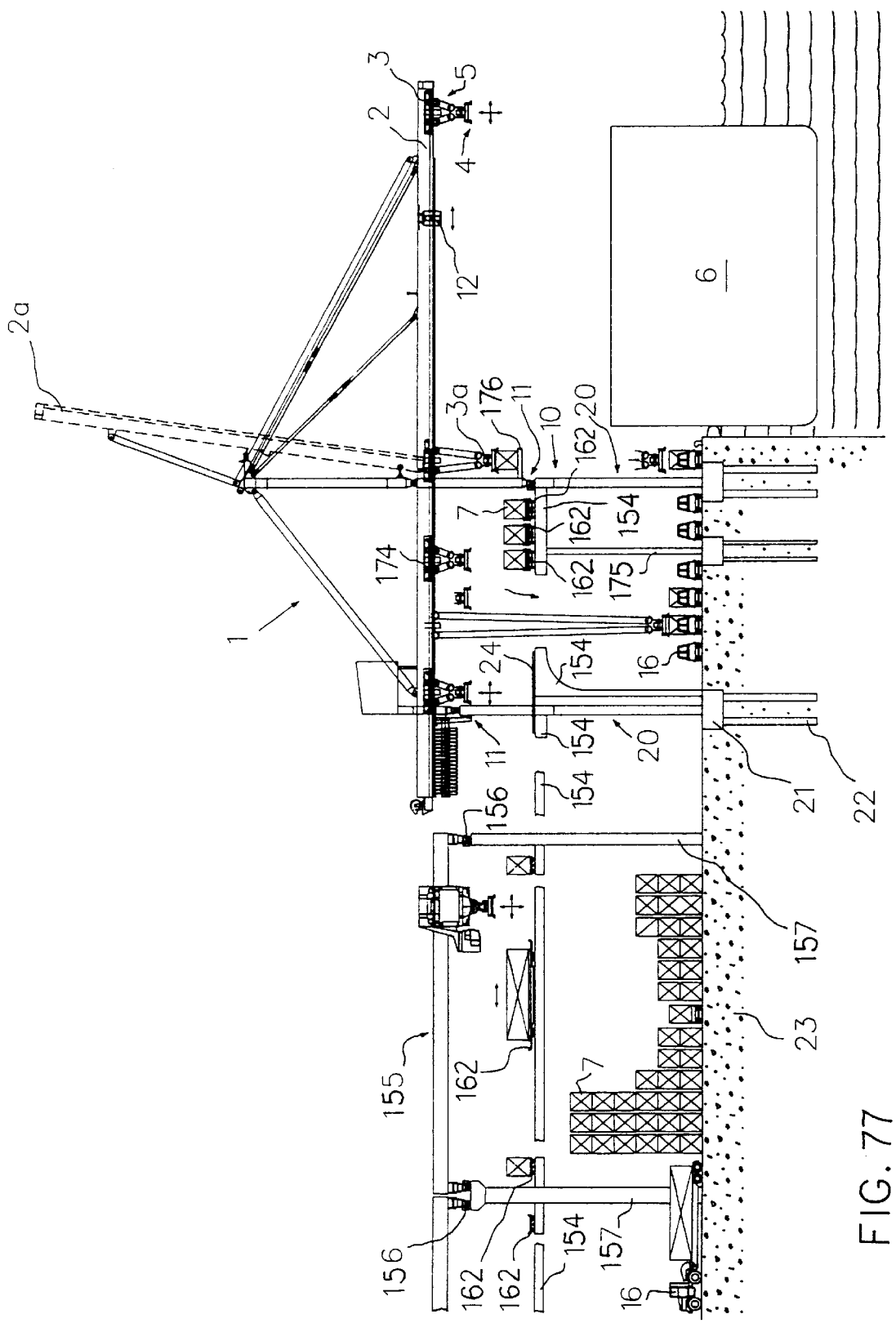

FIG. 20 is a schematic plan view of an automatic distribution ring for the container depot with bridge cranes and with transfer by railway: in the case of a port installation, in loading and unloading the so called "Panamax" ships, for example, up to 200 m in length, and the longer "Post Panamax" ships, for example, up to 300 or more metres in length, the number of mobile cranes for each ship cap be six or more with each crane having a range of movement of; for example, 50 m;

FIG. 21 is analogous to FIG. 20, but showing the possibility of loading the containers on the lower trolleys of the depot distribution rings and onto lorries or other vehicles;

FIG. 22 is the schematic plan view of the drive unit for the drive chain for the lower trolleys for handling the containers in the depot;

FIG. 23 is a vertical transverse section of the towing trench for the lower trolleys showing the device driving the chain;

FIG. 24 is a schematic side view of the lower trolleys towed by the said chain;

FIG. 25 is a view from the left of FIG. 24;

FIGS. 26 and 27 are respectively the side views of a high bridge crane and of a lower bridge crane for depositing and retrieving containers it the depot;

FIGS. 28 and 29 are the views from the left of the bridge cranes of respectively FIGS. 26 and 27;

FIGS. 30 and 31 are respectively the side views of the wheel carriages of the bridge cranes of FIGS. 28 and 29;

FIG. 32 is the schematic plan view of a revolving platform of the bridge crane installed on a trolley that is linearly mobile on the bridge;

FIG. 33 is the plan view of the lifting winch of the bridge crane;

FIG. 34 is the cable layout diagram of the winch in FIG. 33;

FIG. 35 is the plan view of another lifting winch for a bridge crane;

FIG. 36 is the cable layout diagram of the winch in FIG. 35;

FIG. 37 is an enlarged detail of the drive unit for the linearly mobile trolley of the bridge cranes of FIGS. 28 and 29;

FIG. 38 is the plan view of a three column foundation plinth in water;

FIG. 39 is as FIG. 38 but with five columns;

FIG. 40 is a vertical section of a part of the apron by a foundation plinth supporting a stanchion of the fixed longitudinal frame;

FIGS. 41, 42, 43 correspond to FIGS. 38, 39, 40, but in the case of a foundation on ground;

FIG. 44 is a view as in FIG. 1, but showing a lowered version of the mobile crane, for example, in the case where the covers of the hold do not need to be moved and in the case of a foundation on ground; FIG. 45 is a view as in FIG. 44, but in the version with pile foundations;

FIG. 46 is a view from the right of FIG. 44;

FIG. 47 is the enlarged front view of the detail of FIG. 46 concerning the transverse beam of the spreader at the trolley;

FIG. 48 is the view from the right of FIG. 47;

FIG. 49 is the plan view of a device for controlling the inclination of a load transferred by the trolley of a bridge crane;

FIG. 50 is the elevated view of FIG. 49;

FIG. 51 is the plan view of the device for limiting the oscillation of the spreader of a trolley of the bridge crane;

FIG. 52 is the elevated view of FIG. 51;

FIG. 53 is a schematic transverse section of a mobile crane with a ground level rail that has, as well as an independent cabin, an intermediate trolley that can move in a transverse direction and in a longitudinal direction; FIG. 53a is the view from the left of FIG. 53;

FIG. 54 is a schematic side view of self-propelled wire guided lower trolleys;

FIG. 55 is the view from the left of FIG. 54;

FIG. 56 is a view as in FIG. 1 of a loading and unloading plant as described with a mobile crane operating in conjunction with a bridge crane in the depot;

FIG. 57 is a block diagram of a sea port with a plant as described showing cargo flows;

FIG. 58 is a section as in FIG. 53 showing a second version of a mobile crane with ground level rail;

FIG. 59 is a view from the left of FIG. 58;

FIG. 60 is a schematic transverse section of a mobile crane with a ground level rail cooperating with a overhead travelling-crane;

FIG. 61 is a schematic transverse section of a mobile crane as in FIG. 60, said mobile crane being equipped with a load transfer device;

FIG. 62 is an enlarged view of a detail of FIGS. 60 and 61 showing the overhead travelling-crane;

FIG. 63 is a view from above of FIG. 62;

FIG. 64 is an enlarged view of a detail of the lower portion of the mobile crane, shoving the load transfer device;

FIG. 65; is a plan view of the load transfer device shown in FIG. 64;

FIG. 66 is a schematic transverse section of a dock installation for loading and unloading containers of up to 40 feet or more in length with foundations on the ground, showing the positions of the upper trolley vertically above the shuttle trolley, an overhead load store and distribution area and a load store and distribution area at ground level;

FIG. 67 is a schematic plan view of said overhead load store and distribution area equipped with a plurality of conveyor rings;

FIG. 68 is a schematic side view of a portion of the overhead conveyor ring;

FIG. 69 is a front view of a portion of the overhead conveyor ring;

FIG. 70 is a vertical section of the overhead conveyor ring taken in a position corresponding to an upright of two adjacent bridge cranes;

FIG. 71 is a schematic plan view of a lane with a transport means at ground level;

FIG. 72 is a schematic plan view of a portion of an overhead conveyor ring with a plurality of parallel lanes interconnected with each other by means of exchange portions of the conveyor ring;

FIG. 73 is a schematic plan view of a curved portion of the overhead conveyor ring;

FIG. 74 is a partial and enlarged section through line LXXIV—LXXIV in FIG. 73, showing the mechanical supporting and guiding element for the second carrier;

FIG. 75 is a section like that of FIG. 73, but showing a second embodiment of the mechanical supporting and guiding element;

FIG. 76 is a schematic transverse section like that of FIG. 66, but concerning an embodiment of the invention in which the mobile crane is not equipped with shuttle trolley and intermediate trolley; the loads being transferred to and from an overhead conveyor ring, or to and from ground level by means of the upper trolley of the mobile crane;

FIG. 77 is a schematic transverse section like that of FIG. 76, but concerning an embodiment of the invention showing a load supporting platform equipped with at least an opening allowing passage of loads.

The figures refer by way of example to the case of a sea port, for example, also for loading and unloading two aligned ships of the longer type "Post Panamax" at the same time, but the invention is applicable to installations, even smaller in size, situated in a different context.

Figure 2:
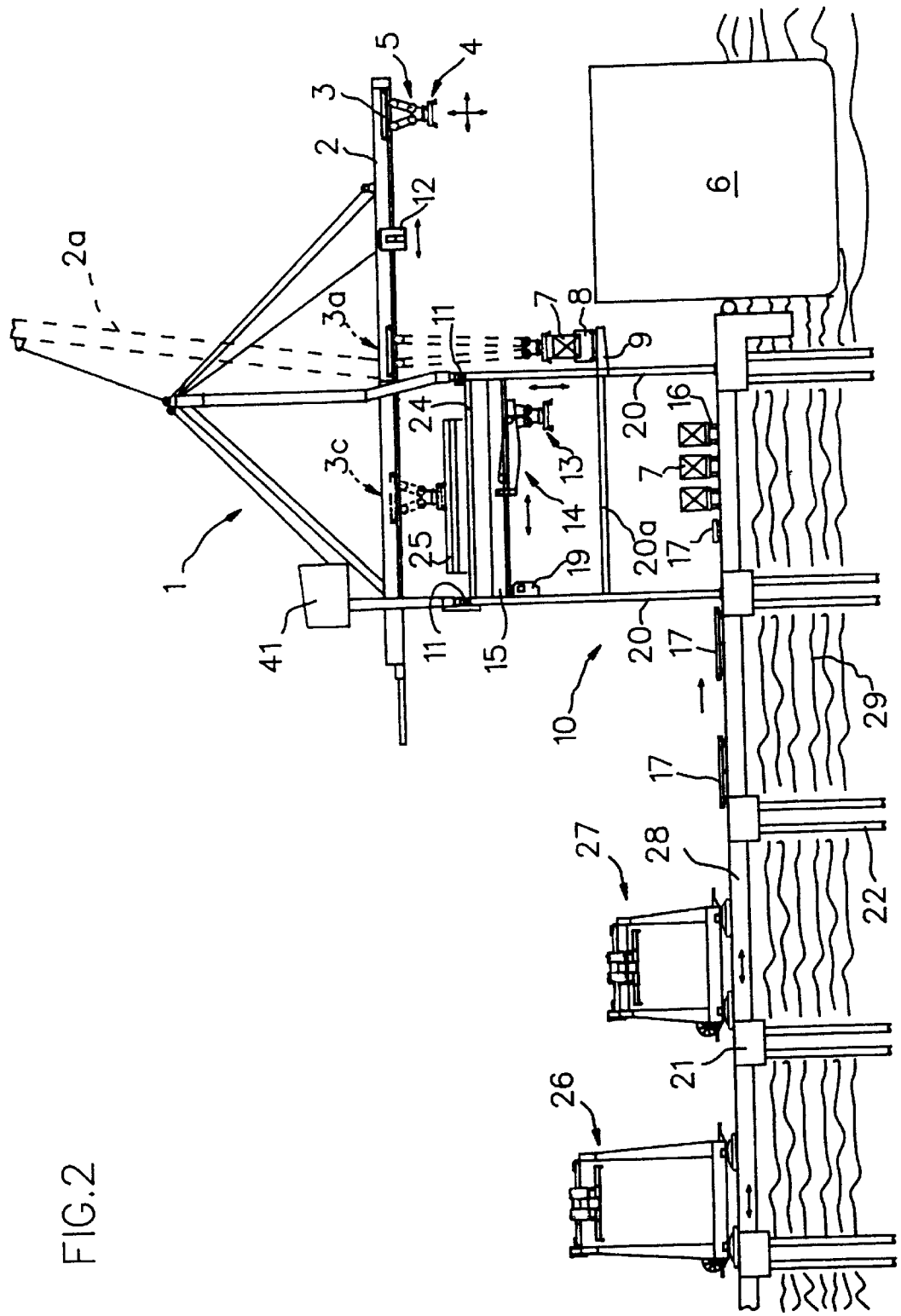
FIG. 2 is a schematic transverse section as in FIG. 1, but in the version with foundations on piles and with bridge cranes for stowing and retrieving containers, showing the positioning of the covers of the ship's holds on the structure of the fixed longitudinal frame, it also being possible to position them on the ground.

FIG. 1 shows a first embodiment of a freight handling plant according to the invention comprising at least one mobile crane 1 having a boom 2, that can be lifted up to a safety position 2a by rotating around a pair of hinges 35 (FIG. 5), said boom carrying a mobile upper trolley 3 with spreader 4 hung on a system 5 of cables of a winch, the said upper trolley being able to operate, in particular, over the holds of the ship 6 loaded with rows of containers 7, in positions 3a, 3b, 3c, (FIGS. 1, 2) said positions being respectively vertically above a shuttle trolley 8, vertically above a device for automatically transferring the containers to the depot and vertically above a stowing position for the covers of the holds, as well as vertically above traditional means of transport.

The boom 2 carries a cabin 12 for the operator of the upper trolley 3, that can move along the boom independently of the trolley itself and parallel to it.

The mobile crane 1 is movable on rail elements 11 situated at the top of a fixed longitudinal frame 10, advantageously modular, constituted by a plurality of stanchions 20 interconnected by transverse beams 20a and longitudinal beams 20b (FIG. 3), the bottom end of each stanchion being fixed in a foundation plinth 21 of piles 22 driven into the ground 23: in this way, the loads to which the frame is subjected are transmitted to the ground at predefined fixed points. In modular configuration, the fixed longitudinal frame 10 consists of a plurality of adjacent sections having substantially the same length and joined together by joints G (FIG. 21) placed, for example, at a distance of 100 m from each other.

A longitudinal shelf 9 protruding laterally from the fixed longitudinal frame 10, at a first intermediate elevation, carries the track of said shuttle trolley 8.

The longitudinal frame 10 is equipped with at least an intermediate trolley 14 carrying a winch 13, said intermediate trolley being able to move in a transverse direction on upper transverse beams 15 of the longitudinal frame 10, at an intermediate elevation, to transfer the containers 7 from the shuttle trolley 8 to traditional means of transport, for example, lorry 16 and/or to automatic container transfer devices, the movements of the intermediate trolley 14 being controlled by an operator in a cabin 19 fixed correspondingly to the longitudinal frame 10.

Said automatic transfer devices, for example, comprise lower trolleys 17, preferably with tyre wheels, mobile on a distribution and handling conveyor ring 18 of the depot, said ring constituting a lane or track with or without rails.

The longitudinal frame 10 is further equipped with a supporting element 24, for example a platform, supported at the top of the frame 10, to carry the hold covers 25, alternatively their being stored at ground level.

The plant according to the invention comprise one or more distributor and handling conveyor rings 18 associated to storage areas served by said lower trolleys 17. Bridge cranes 26 and 27, or gantry cranes, position and retrieve containers 7 in and from said storage areas: in FIG. 2 a tall bridge crane 26 and a low bridge crane 27 are shown.

In the case of dock installations, particularly if maritime, both the area supporting the fixed longitudinal frame and, possibly, that of the depot and all the other areas of the installation, are supported on a reinforced concrete slab 28 supported on beams connecting plinths 21 at the top of piles 22, constituting a pile foundation in water.

FIGS. 3 to 19 illustrate constructional details of the mobile crane 1 and the fixed longitudinal frame 10.

Figure 3:
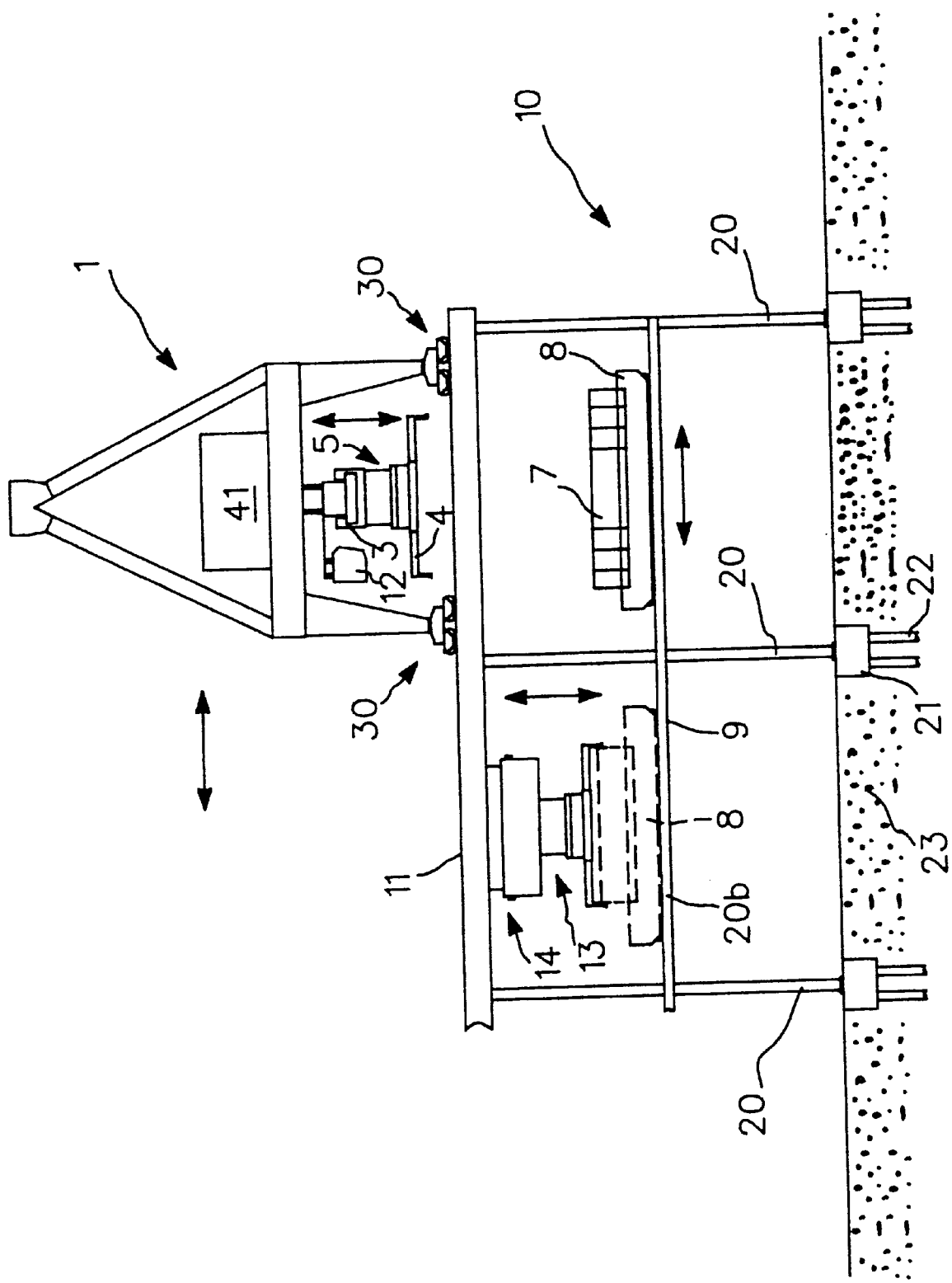
FIG. 3 is a schematic view from the right of FIG. 1 that shows the movements of the upper and intermediate trolleys with spreaders, of the crane and of the shuttle trolley.

FIGS. 3, 14, 15 illustrate the articulated wheel carriages 30 of the mobile crane 1 on the sea side, whilst FIGS. 16, 17 illustrate the articulated wheel carriages 59 on the land side of the mobile crane 1 equipped with anti-toppling devices 60, for example a roller running under an auxiliary rail 61 supported on stirrup 62.

Figure 4:
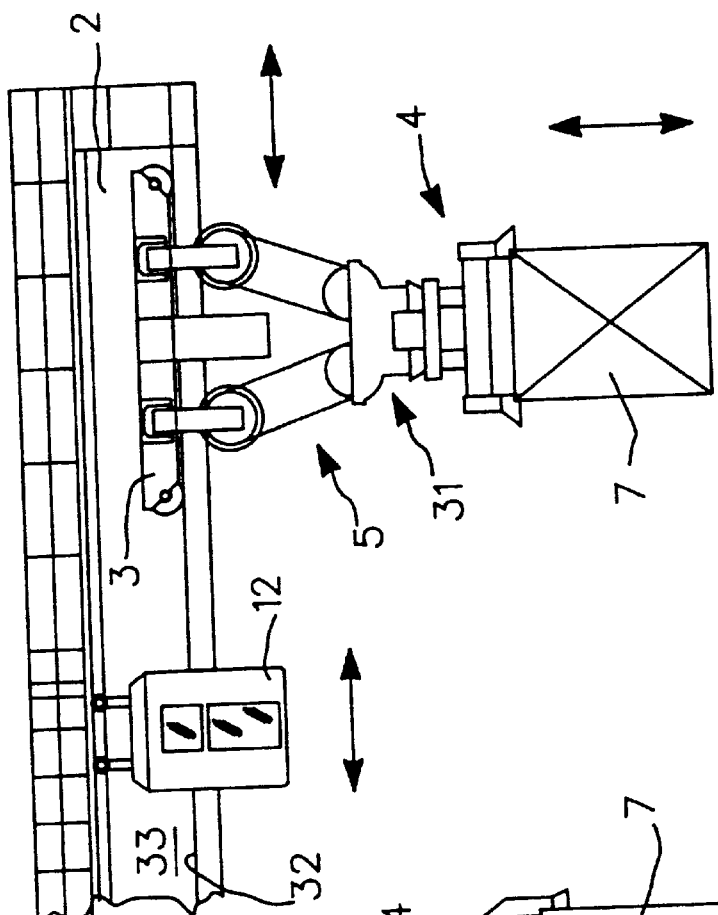
FIG. 4 is a front view of the extremity of the boom of the crane with the upper trolley and the independent operator's cabin.
Figure 5:
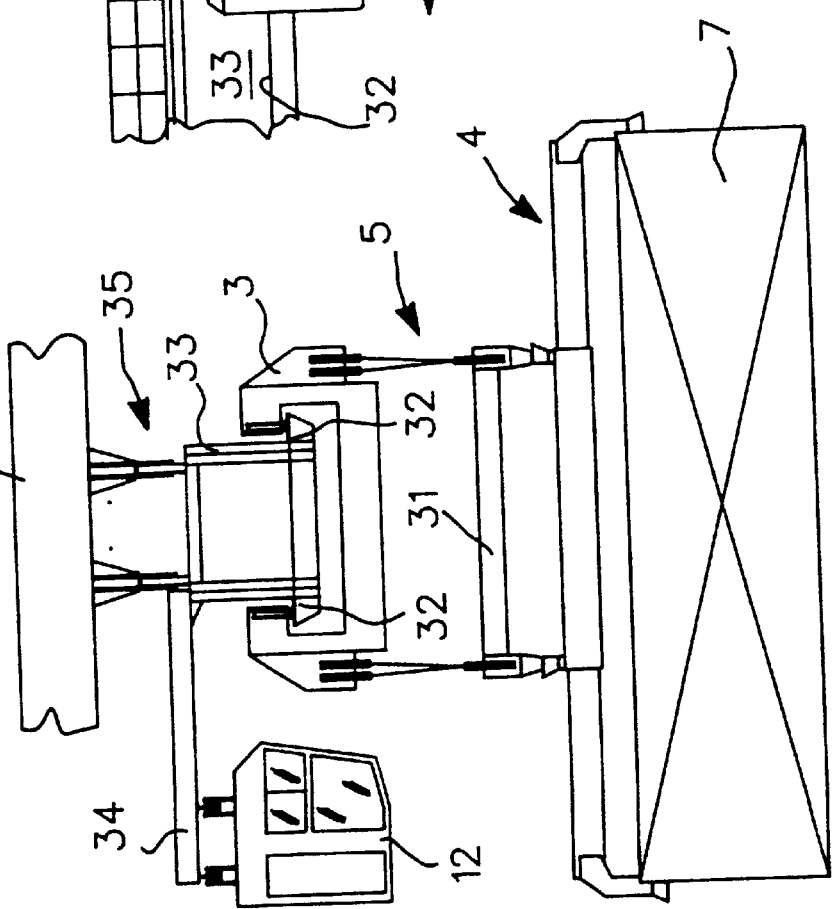
FIG. 5 is a view from the right of FIG. 4.

FIGS. 4, 5 illustrate a detail of the boom 2 of the mobile crane 1 on which the upper trolley 3 and the operator's cabin 12 are supported.

The upper trolley 3, which is equipped with a transverse beam 31 supporting the spreader 4, hung from a system 5 of cables, runs on a bilateral track 32 of the boom 2.

The boom 2 is further provided with a series of brackets 34 projecting laterally from the boom, that support, beneath them, a pair of rails 34a, having for example an inverted T-section, on which the cabin 12 slide by means of roll pairs, the cabin being made, for example, self-propelled by an in line motor reducer.

FIGS. 6, 7 illustrate how the spreader 4 is operated: a parallel axis speed reducer 36 operates, by means of motors 37, for example electric, with interposed joints and brake 38, a pair of opposed drums 39 located in an engine room 41 that activate cables 40 of the system 5 of cables to which the transverse beam 31 is hung; said cables 40 have fixed ends 40a and are wound on pulleys 40b, that can be positioned by devices 40c, for example hydraulic, to regulate the orientation of the transverse beam 31.

FIGS. 8, 9 illustrate how the which 13 carried by the intermediate trolley 14 is operated: a parallel axis speed reducer 42 driven by motors 43, for example electric, with interposed joints and brake 44 rotates a pair of opposed drums 45 that activate the cables 46 of the winch 13: to orientate the underlying transverse beam 31 there being orientating devices 46a, for example mechanical.

Figure 11:
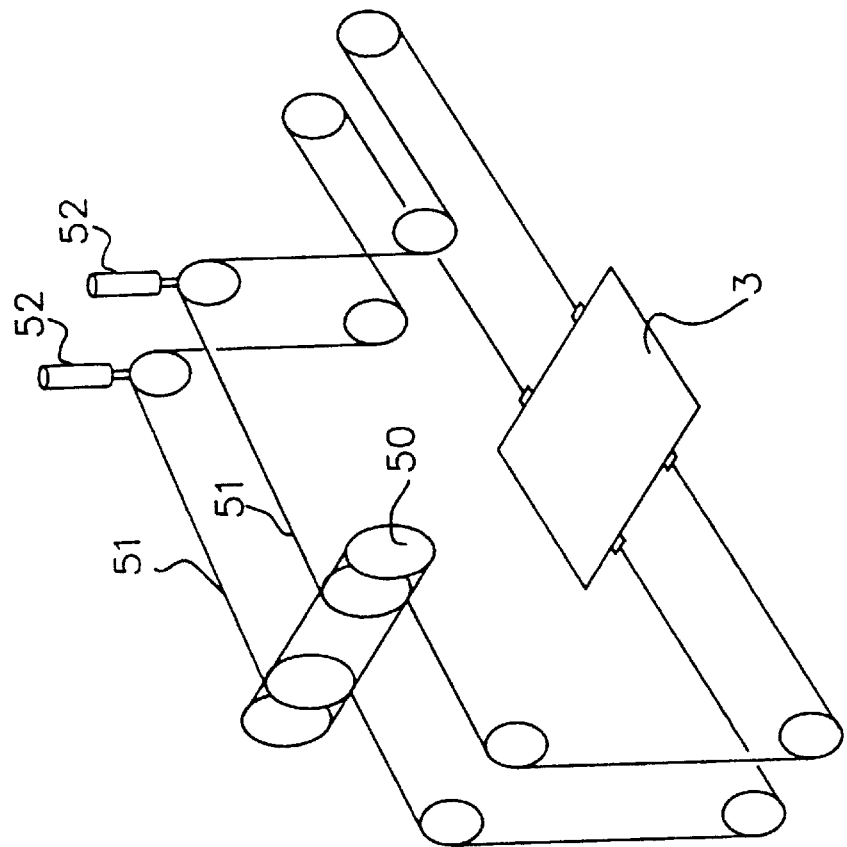
FIG. 11 is a cable layout diagram for the winch in FIG. 10.
Figure 10:
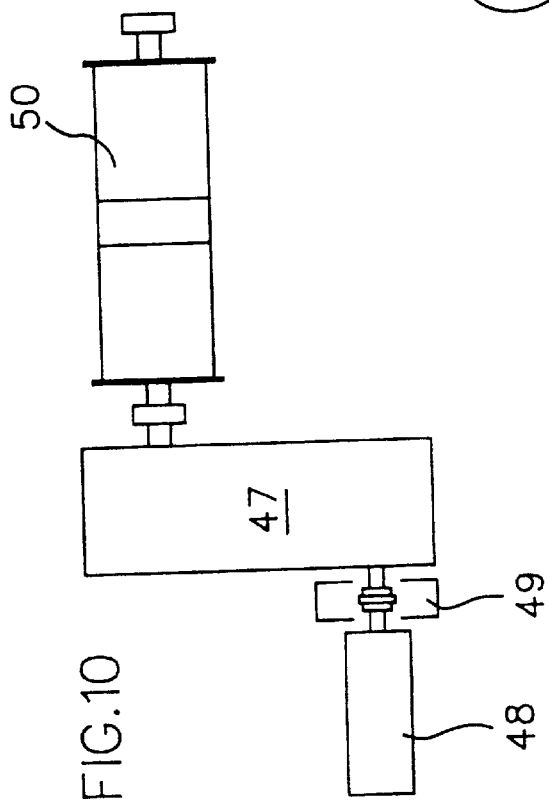
FIG. 10 is the plan view of the translation winch for the upper trolley.

FIGS. 10, 11 illustrate how the upper trolley 3 is driven: a speed reducer 47, driven by electric motor 48 with interposed joints and brake 49, rotate a drum 50 to drive the upper trolley 3 by means of cables 51, the tension of the cables 51 being regulated by hydraulic tensioning devices 52.

Figure 13:
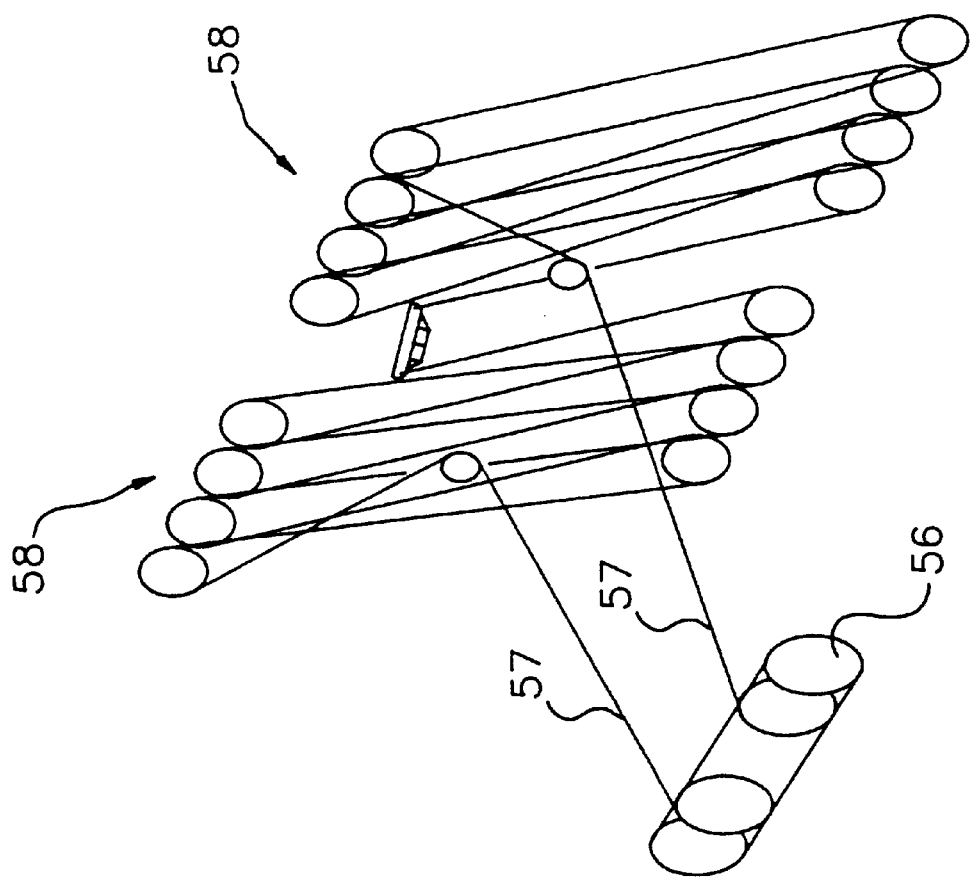
FIG. 13 is a cable layout diagram for the winch in FIG. 12.
Figure 12:
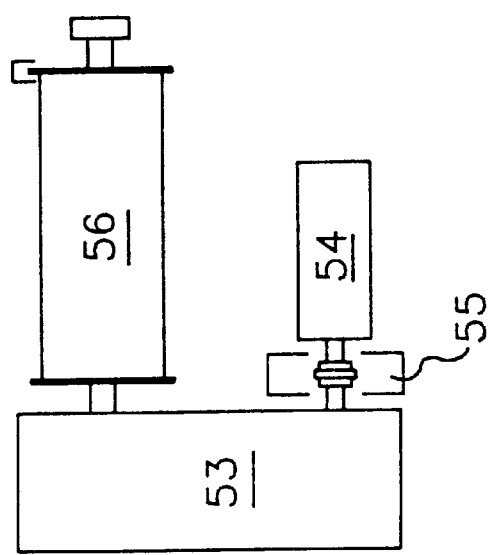
FIG. 12 is the plan view of the winch for lifting the boom of the mobile crane.

FIGS. 12, 13 illustrate how the boom 2 is lifted: a reducer 53 driven by a motor 54, for example electric, with joint and brake 55 rotates a drum 56 of a winch designed to lift the boom 2 to position 2a, a pair of cables 57 being wound on said drum 56 to activate a pair of tackles 58.

Figure 18:
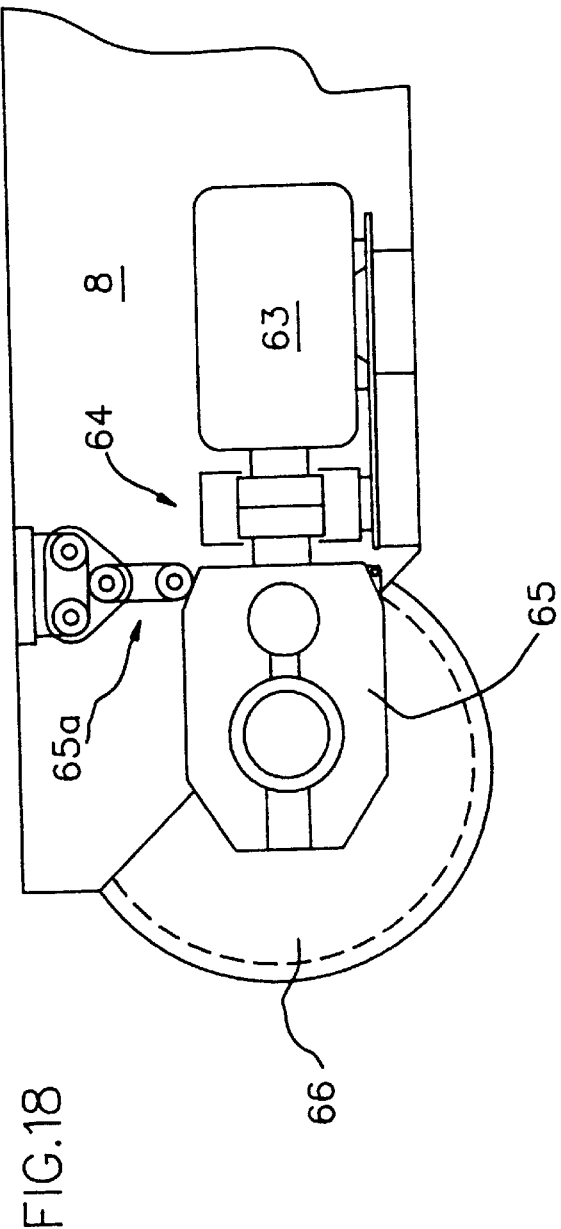
FIG. 18 is a partial side view of the shuttle trolley's drive unit.
Figure 19:
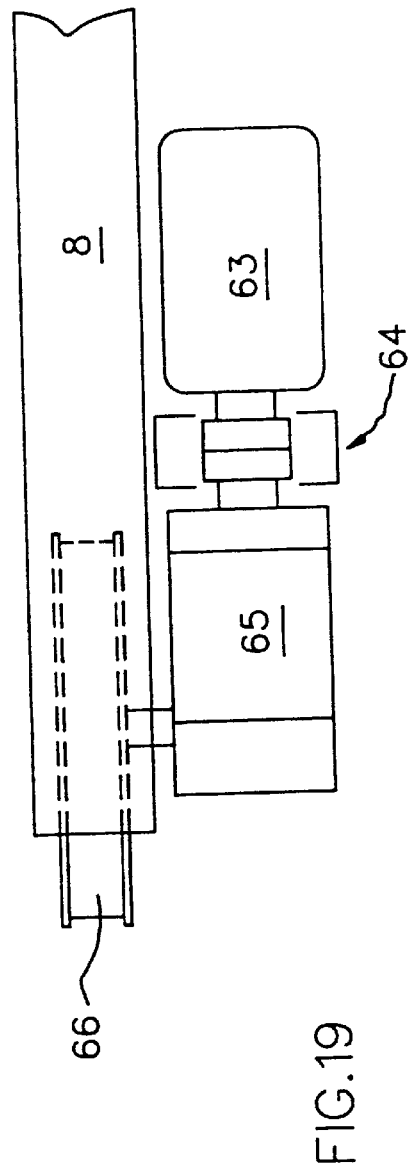
FIG. 19 is the view from the top of FIG. 18.

FIGS. 18, 19 illustrate how the shuttle trolley 8 is driven: each wheel 66 of the shuttle trolley 8 is driven by a reducer 65 operated by a motor 63, for example a direct current electric motor, through coupling and brake 64, the reducer 65 being fixed to the structure of the trolley by means of a torque arm 65a.

FIG. 20 illustrate an automatic distribution and handling conveyor ring 18 to distribute the containers 7 in a plurality of storage areas A inside the conveyor ring and in a storage area B located aside railway tracks 68 outside the conveyor ring 18. Storage areas A and B are served by bridge cranes 26, 27, running on tracks 67 located inside the conveyor ring 18 and parallel to the railway tracks 68.

The bridge cranes 26 or 27 transfer the containers 7 from the lower trolleys 17 of the conveyor ring 18 to the storage areas A and B and onto wagons 69 aligned on the railway tracks 68; furthermore, storage areas A and B may be served by lorries 16 or handling devices in general, running along respective lanes, tracks or carriageways 69a.

FIGS. 22, 23 illustrate the driving means of the lower trolleys 17, said driving means comprising: a horizontal towing chain 70, installed in a trench 71, which moves the lower trolleys 17 by pushing on their corresponding central lower appendages 77 connected to the chain by means of socket 70b and guided by a pair of opposing wheels 77b that run along longitudinal tracks 77c of the trench 71. The towing chain 70 is towed by an auxiliary chain 75 equipped with towing teeth 75a, said towing chain being driven by a motor 72, for example electric, through a reducer 73: the output shaft 74a of the reducer 73 rotates a driving gearwheel 74, on which the auxiliary chain 75 is wound, the auxiliary chain being further wound on a driven gearwheel rotating around a shaft 76a.

FIGS. 26, 27, 28, 29 show the trolleys 78 for the transfer of the containers 7 along the bridge of the bridge cranes 26, 27 of the deposit, said trolleys being equipped with a lifting device with a spreader 79 hung to a transverse beam by means of a system 82 of cables.

The trolleys 78 and the respective lifting devices are operated by an operator lodged in a cabin 80 of the bridge crane.

The trolleys 78 may be provided with a revolving platform 81 equipped with two pairs of wheels 87 revolving on a circular rail 86 (FIG. 32) provided on said trolley 78. One of said two pairs of wheel is driven by a pair of motor reducers 88 whose output shaft is splined to the axis of the corresponding wheel.

FIGS. 30, 31 illustrate the articulated wheel carriages 83, 84 respectively of a high bridge crane 26 and a low bridge crane 27 provided with a ground anchoring pin 83a.

Said bridge cranes 26, 27 are provided with a gathering device 85 (FIGS. 28, 29) for gathering in the power supply cable for the bridge crane.

FIGS. 33, 34 illustrate how the spreader 79 is operated: a drive unit 89, for example an electric drive unit, equipped with a reducer having parallel output shafts, drives a pair of drums 90, each drum activating a pair of cables 91 that go to the pulleys 92 of the quick-release transverse beam of spreader 79, not shown.

FIGS. 35, 36 illustrate how the lifting device of a trolley 78 is operated, when the trolley is not equipped with a revolving platform 81: two motors 93, for example electric motors, drive through flexible coupling and brake 94 a parallel axis reducer 95, which rotates two lifting drums 96 having opposing axes, said axes being coupled to said reducer by means of geared couplings 97 to make the coupling isostatic, said drums activating cables 98 to manoeuvre the transverse beam of the spreader 79, said cables being connected to devices 98a for the orientation of the underlying transverse beam.

FIG. 37 illustrate the driving means of a trolley 78: the shaft 102 of each wheel 103 of the trolley 78 is operated by a reducer 99 driven by a motor 100, for example electric, through a cardan joint 101.

FIGS. 38 to 43 illustrate in greater detail an element of the foundation system supporting the fixed longitudinal frame 10 and the other installations of the plant according to the invention.

FIGS. 38 to 40 refer to foundations in water whilst FIGS. 41 to 43 refer to foundations in the ground. Each element comprise a plinth 104 with three piles 22 or a plinth 105 with five piles 22, each plinth 104 or 105 supporting a stanchion 20 of the fixed longitudinal frame 10.

FIGS. 44, 45 illustrate a further embodiment of the plant according to the invention comprising at least one mobile crane 106 analogous to mobile crane 1, but in a lowered version, that may be used, for example, when it is not necessary to provide stowing space for hold covers 25 on the fixed longitudinal frame 10.

FIGS. 47, 48 illustrate in greater detail the transverse beam 31 of a spreader 4 carried by the upper trolley 3, or of a spreader 79 of bridge cranes 26 or 27: the transverse beam 31 is equipped with two pairs of pulleys 107, designed to receive the cables to which the transverse beam is hung, and with rapid-release locking pins 108 for connecting the transverse beam to the underlying spreader 4 or 79.

FIGS. 49, 50 illustrate in detail the transverse beam 108a for suspending the spreader of the winch 13 of the intermediate trolley 14: the tranverse beam 108a is suspended on cables 109 of said winch 13, wound on pulleys 110, said cables 109 having cable ends 111 provided with a load limiting cells connected to screw jacks 112, said screw jacks being driven by motors 113, for example electric, to rotate the spreader around its horizontal and vertical axes, for example, by five degrees each way to make connecting and disconnecting the containers 7 easier.

The motors 113 are supported to the transverse beam 108a by means of supports 114.

FIGS. 51, 52 illustrate a device for limiting the oscillation of the spreader 79 carried by the trolley 78 of a bridge crane 26 or 27. The device comprises motor reducer units and drums 115 operating four cables constituting a anti hunting system of the transverse beam 116 carrying the spreader 79.

FIGS. 54, 55 illustrate a further embodiment of the lower trolleys of a distribution and handling conveyor ring 18: each lower trolley 118 is of a self-propelled type and is guided by a wire 119 transmitting control and guiding signals, said wire being placed inside an underground protective tube 120, for example made of plastic, said trolley being provided with a computerized transceiver unit 121 having a suitable sensor co-operating with the wire 119.

FIG. 56 illustrate a further embodiment of the plant according to the invention wherein the mobile cranes 1 co-operate with overhead travelling cranes 123. In said further embodiment of the invention the fixed longitudinal frame 10 is provided with a further longitudinal shelf 122 positioned at an elevation substantially corresponding to that of the longitudinal shelf 9 and protruding laterally from the side of the fixed longitudinal frame 10 opposite to the side from which the longitudinal shelf 9 protrudes. Said further longitudinal shelf 122 is designed to receive containers 7 from the upper trolley 3 brought to position 3d, the containers being then collected by an overhead travelling crane 123, that run on aerial carriageways 124 supported on columns 125, and deposited on the ground by said overhead travelling crane and vice versa.

FIGS. 53, 53a illustrate a still further embodiment of the plant according to the invention particularly suitable to be used in existing depots. The plant comprises at least one mobile crane 126 running on ground level rails 127, the mobile crane being equipped with an upper trolley 3 and an operator's cabin 12 both running on a boom 128 independently of each other.

A longitudinal shelf 129, designed to receive containers 7 taken out of the ship 6 by the upper trolley 3, is provided on the supporting structure 130 of the said mobile crane 126, said shelf 129 being positioned at an intermediate elevation between the boom 128 and the ground.

The mobile crane 126 is further provided with a first intermediate trolley 131 and a second intermediate trolley 133: the first intermediate trolley runs longitudinally on intermediate runways 132, positioned at an elevation that is higher than that of the shelf 129, whilst the second intermediate trolley 133 runs transversely on the first intermediate trolley 131 and carries a winch 134 to pick up containers 7 from the shelf 129 and to place them on transfer vehicles 16.

FIGS. 58, 59 illustrate a further embodiment of the mobile crane 126, wherein the mobile crane is provided with a first intermediate trolley 135 that run transversely on carriageways 136 (FIG. 59) positioned at an elevation that is higher than that of shelf 129 and with a second intermediate trolley 137 that runs longitudinally on the first intermediate trolley 135 to position containers 7 on underlying ground level handling devices without having to move the entire crane 126.

FIG. 57 illustrate flows of loads, for instance containers, in a plant according to the invention wherein loads are transferred from a ship N or, in general, a first loading and unloading carrier to a second carrier C by means of a device CS that effects longitudinal displacements of the loads, i.e. displacements in a direction substantially perpendicular to the boom of the mobile crane: said second carrier C may be a lorry or other means for transferring loads at ground level to storage areas A enclosed in an automatic conveyor ring 18 or to storage areas B positioned between storage areas A and a railway F.

FIGS. 60, 62, 63 illustrate a further embodiment of the plant according to the invention wherein the mobile crane 126 cooperates with an overhead travelling crane running on overhead tracks 141 supported by the stanchions 142 of a supporting frame 140, said supporting frame 140 being equipped with a longitudinal shelf 139 protruding from the side of the supporting frame 140 facing towards the mobile crane 126;

The overhead travelling-crane cooperates with a load transfer device 138, for instance a shuttle trolley, running longitudinally on said longitudinal shelf 139.

Said overhead travelling-crane comprises an overhead trolley 143 running on said overhead tracks 141 in a direction perpendicular to said longitudinal shelf 139 and an auxiliary trolley 144 slidably supported to said overhead trolley 143, said auxiliary trolley 144 being slidable in a direction parallel to said longitudinal shelf 139 and being equipped with a load lifting device 145, 146.

The load lifting device may be, for instance, a winch 145 comprising a pair of drums 145c driven by electric motors 145a through a speed reducer 145b, each drum 145c activating a pair of cables 145d carrying a spreader 146.

FIGS. 61, 64, 65 illustrate another embodiment of the invention, according to which the mobile crane 126 is equipped with a longitudinal shelf 147 protruding from a side of the load bearing structure of the crane facing towards said first carrier 6, for instance a ship, said longitudinal shelf 147 cooperating with a load transfer device suitable for taking loads 7 from said longitudinal shelf 147 and transferring them to longitudinal shelf 139 or to ground level handling devices 16.

Said load transfer device comprises a first trolley 149 running on first tranversal tracks 148 supported to the load bearing structure of the crane 126 at an intermediate height between the boom 128 of the crane and said longitudinal shelf 147, said first trolley 149 supporting second transversal tracks 150, parallel to said first transversal tracks 148, on which a second trolley 151 runs, which is equipped with a load lifting device.

The load lifting device of the second trolley 151 comprises a pair of drums 151c driven by electric motors 151a through a speed reducer 151b, said drums 151c activating a system of cables 152 carrying a spreader 153.

FIG. 66 shows a further embodiment of the invention wherein the mobile crane 1 is associated with a system of overhead conveyor rings placed on an overhead plane 154. Said overhead plane being placed at such a distance from the ground 23 that said second carrier 16 is able to pass under the conveyor ring.

Transfer devices 162, such as self-propelled trolleys, are movable on said system of overhead conveyor rings to transfer the containers 7 from the mobile crane 1 to storage areas A.

Said overhead conveyor rings enclose and encircle a plurality of storage areas A that may be defined by a load supporting platform substantially coplanar with the conveyor rings.

The storage areas A are served by overhead travelling cranes 155 on overhead tracks 156 supported by uprights 157.

One conveyor ring of the system of overhead conveyor rings is provided with a side 158 parallel and adjacent to the wharf.

Said side 158 may be equipped with a pluraliry of parallel lanes 158a interconnected with each other by junctions 158b.

Said side 158 may pass through said fixed longitudinal frame 10 in a direction parallel to the rail elements 11 of the mobile crane 1.

The side 158 is interconnected by means of curved portions 159 of the conveyor ring, or rounded corners, to a pair of opposite sides 160 of the ring aligned with the corresponding sides 160 of the adjacent rings.

Each conveyor ring has at least one rectilinear side 161 parallel to the corresponding side of an adjacent conveyor ring, or in common with said adjacent conveyor ring.

The wheels 163 of the self-propelled trolleys 162 (FIG. 74), in the rectilinear portions 160, 161 of the conveyor rings are supported and guided by a mechanical supporting and leading element, such as a pair of longitudinal guides 164.

The motor of each self-propelled trolley 162 is powered through a socket, placed under the platform of the trolley, said socket being fed by an electric line 166, for instance by means of a sliding contact.

In a further embodiment of the invention (FIG. 75) said mechanical supporting and leading element is constituted by a central rail 167 matching with a pair of side rollers 168 supported by a bracket 169 fixed under the platform of the trolley 162.

In FIG. 76 the reference numeral 170 designates a position of the upper trolley 3 over the overhead plane 154 for transferring from and to said overhead plane the hold covers 25.

The mobile crane 1 may be equipped with stanchions of different length, comprising a pair of long stanchions 171 and a pair of short stanchions 172. The pair of short stanchions 172 allows the electric means feeding the mobile crane 1 to be placed at an height with respect to the ground greater than the height of the overhead plane 154.

In FIG. 77 at least one longitudinal opening 173 is shown, said at least one opening being provided in said load supporting platform, for instance in an area between the stanchions 20 of the fixed longitudinal frame 10.

Said longitudinal opening allowing loads 7 to be transferred quickly from the ship 6 to ground level on transport means 16 or in storage areas A and viceversa.

The fixed longitunal frame 10 is equipped with supplementary stanchions 175 supporting the portion of the supporting platform adjacent to the longitudinal opening 173.

The mobile crane 1 may be equipped with an auxiliary upper trolley 174 designed to load containers 7 on transport means 16 at ground level and viceversa. The auxiliary upper trolley 174 runs on the same track 32 as the upper trolley 3.

In addition, said auxiliary upper trolley 174 may be used to unload containers 7 from a ship 6 and vice-versa and to transfer the self propelled trolleys 162 from one lane 158*a* of a conveyor ring to another lane 158*a*.

The fixed frame 10 may be equipped with a shelf 176 on the side facing the first carrier, said shelf 176 constituting a supporting plane for the containers 7 which are put on the shelf by the upper trolley 3 and are subsequently taken from the shelf by the auxiliary upper trolley 174, or viceversa.

The main operating cycle of the complete plant, with reference to the embodiment comprising mobile cranes 1, 106 running on a carriageway 11 located on an intermediate structure 10 fixed to the ground, may be summarized as follows:

removing a load from a first carrier, transferring the load along the transverse boom of the mobile crane and placing the load on a shuttle trolley mobile in a longitudinal direction;

translating the said shuttle trolley along said longitudinal direction over a distance required to bring it to the spreader of an intermediate trolley, having a fixed position in said longitudinal direction, without requiring any longitudinal displacement of the mobile crane;

removing the load from said shuttle trolley and placing it, by means of the spreader of the intermediate trolley, on a lower trolley of a second carrier such as a depot conveyor ring, or on a lorry, or other means suitable to transport the load outside the depot;

transferring automatically the load by means of said conveyor ring, to an assigned lot in a storage island enclosed in the area circumscribed by the conveyor ring itself;

transferring loads, if required, by means of lifting devices, from a storage island in an area enclosed in a conveyor ring to another storage island in the same area, or from a storage island in an area enclosed in a conveyor ring to another storage island in another area enclosed in another conveyor ring, or from a storage island in an area enclosed in a conveyor ring to another area outside the conveyor ring and from said area to means of rail or wheel transport;

in particular, in the case of maritime docks, it is possible to transfer loads from a ship to a railway or other means and vice-versa.

With reference now to FIGS. 66 to 77, it is to be noticed that the loads 7, after being removed from the shuttle trolley 8, are placed on the self-propelled trolleys 162 running on the overhead conveyor ring, or on trucks 16 running at ground level and transferred to storage areas A or B on the load supporting platform or at ground level.

The loads may be made pass through the openings 173 of the load supporting platform when they are to be placed on trucks or deposited in storage areas at ground level.

If the mobile crane 1 is not equipped with a shuttle trolley 8 but with a shelf 176 as in FIG. 77, the loads 7 are transferred on the trolleys 162 or the trucks 16 by means of the upper trolley 3 and/or the auxiliary upper trolley 174.

It is to be noted that the direction of load transfer may be reversed.

Furthermore the prearrangement for the most complete cycle can also be used only in part.

Finally, the stockyard with conveyor rings can be substituted with a stockyard served by vehicles not under automatic control.

In practice, the materials, dimensions and details of execution may be different from but technically equivalent to those described without departing from the juridical domain of the present invention.

As such the devices described and illustrated can be of different form and composition.

I claim:

1. A plant for handling freight in depots, comprising:

at least one crane for transferring freight from a first carrier to a second carrier and vice versa, the at least one crane being mobile along a crane movement direction and including a boom, at least one mobile upper trolley supported at and movable substantially along a center line of said boom, and a first lifting device for freight lifting provided at said at least one upper trolley, with said boom extending sideways in a direction substantially perpendicular to the crane movement direction for such a distance as to enable the at least one mobile upper trolley to operate over both said carriers;

a carriageway extending along said crane movement direction and on which said crane is movable;

a plurality of pile shaped foundation elements driven into the ground at predefined fixed positions; and an intermediate structure for supporting at an elevated level said carriageway, said intermediate structure being supported on said foundation elements so that loads exerted by said at least one crane, in use, onto said carriageway are transmitted through said plurality of foundation elements only at said predefined fixed positions, independently of an instant position of said at least one crane.

2. The plant of claim 1, wherein said intermediate structure consists of a fixed frame including a number of stanchions interconnected by first transverse beams and longitudinal beams.

3. The plant of claim 2, wherein said stanchions are anchored at their lower ends to said foundation elements.

4. The plant of claim 2, comprising at a top part of said frame, supporting elements provided for supporting hold covers.

5. The plant of claim 2, further comprising a transfer means for freight transferring, said intermediate structure having, at a first intermediate elevation, an intermediate carriageway parallel to said crane movement direction, said transfer means being coupled onto said intermediate carriageway for operating in co-operation with said at least one upper trolley.

6. The plant, of claim 5, wherein said transfer means is selected from a group including: a motorized shuttle trolley, a motorized roller conveyor, and a conveyor belt.

7. The plant of claim 5, further comprising an overhead travelling crane running on aerial carriageways located so as to co-operate with said at least one mobile crane, and wherein said fixed frame has a longitudinal shelf positioned at an elevation substantially corresponding to that of said intermediate carriageway.

8. The plant, of claim 5, comprising at said intermediate frame at least one intermediate trolley, said transfer means being operable to cover variable operating distances, between a first position essentially vertically in line with the crane boom and a second position accessible for said at least one intermediate trolley.

9. The plant of claim 8, comprising: upper transverse beams located at a second intermediate elevation higher than said first intermediate elevation, said upper transverse beams interconnecting said longitudinal beams and slidably supporting said intermediate trolley; and a second lifting device provided at said intermediate trolley for lifting and lowering freight.

10. The plant of claim 9, further comprising: at least one conveyor ring having one stretch thereof positioned inside said intermediate structure; at least one storage area included within said at least one conveyor ring; and transferring devices for transferring freight and co-operating with at least one of said first and second lifting devices for lifting and lowering the freight being provided at said at least one conveyor ring.

11. The plant of claim 10, wherein said at least one conveyor ring has a rectangular shape with rounded corners.

12. The plant of claim 11, comprising: a plurality of conveyor rings arranged in an adjacent configuration in which at least one side of a conveyor ring of said plurality of conveyors is arranged in any of a position parallel to a corresponding side of an adjacent conveyor ring, and a position in which said at least one side is common with the corresponding side of said adjacent conveyor ring; each said conveyor ring having a pair of further opposite sides aligned with further corresponding sides of the adjacent conveyor ring or rings.

13. The plant of claim 12, comprising, provided between at least one pair of said corresponding parallel sides, at least one pathway for lorries and other ground-level load handling devices being any of the group consisting of lanes, tracks and carriageways.

14. The plant of claim 13, wherein at least one said conveyor ring is adapted to co-operate with at least one bridge crane.

15. The plant of claim 14, wherein a remote controlling system is provided for automatically locking on and releasing the freight on said first and second carriers.

16. The plant of claim 15, wherein said remote controlling system is a remote controlling optical system.

17. The plant of claim 12, wherein at least one of said plurality of conveyor rings is an overhead conveyor ring placed at such an elevation from ground that said second carrier is able to pass underneath.

18. The plant of claim 17, comprising a freight supporting platform which is substantially coplanar with said at least one overhead conveyor ring.

19. The plant of claim 18, wherein said freight supporting platform is equipped with at least one opening for allowing passage of freight transferred by said at least one mobile crane and by the lifting devices to and from ground level.

20. The plant of claim 19, wherein said upper trolley is running on tracks supported on said boom, and wherein said at least one mobile crane is equipped with an auxiliary upper trolley running on said same tracks as the upper trolley.

21. The plant of claim 20, wherein said fixed frame is equipped with a shelf located on a side thereof facing said first carrier.

22. The plant of claim 21, wherein said stretch positioned inside said intermediate structure is provided with a plurality of parallel lanes for said second carrier and with junctions, said lanes being interconnected with each other by said junctions.

23. The plant of claim 22, comprising, at rectilinear portions of said at least one conveyor ring, a mechanical supporting and leading element, said second carrier being movable along said mechanical supporting and leading element.

24. The plant of claim 22, comprising, at rectilinear portions of said at least one conveyor ring, guiding paths of a type selectable in a group including magnetic, inductive, and optical paths and tracks.

25. The plant of claim 24, wherein said second carrier, at said rounded corners of at least one of said conveyor rings and at said junctions is guided by way of said guiding path selected from the magnetic, inductive, and optical guiding paths and tracks.

26. The plant of claim 10, wherein said transferring devices include at least one lower trolley selected from a group including: wheeled trolleys, trolleys on rails, and wire guided trolleys.

27. The plant of claim 26, wherein said transferring devices include driving devices, and a horizontal towing chain positioned in a trench along at least one of said conveyor rings and coupled to said driving devices, said towing chain being further joined to a plurality of lower trolleys.

28. The plant according to claim 27, wherein said driving devices include a pair of cogwheels, one of which is motorized, and at least one auxiliary horizontal chain forming a closed loop around said pair of cogwheels.

29. The plant of claim 27, comprising lateral tracks provided in said trench, and a pair of opposing guiding wheels, each of said lower trolleys having a lower appendage engaged in a hub connected below a connecting element of a link of said horizontal chain, and guided by said pair of opposing wheels running on said lateral tracks in said trench.

30. The plant of claim 26, wherein said transferring devices comprise a plurality of self-propelled lower trolleys with a wire which transmits control and guidance signals for guiding said self-propelled lower trolleys, said wire being placed inside a protective element buried underground, and each one of said self-propelled trolleys having a computerized transceiver device with a sensor co-operating with said wire.

31. The plant of claim 1, comprising a cabin for an operator which is slidably supported on said boom, said cabin moving along said boom independently of said at least one upper trolley.

32. The plant of claim 31, comprising a pair of rails on which said operator's cabin runs, and a series of brackets projecting laterally from the boom of said at least one mobile crane, said brackets supporting said rails.

33. The plant claim 32, wherein said cabin is of self-propelled.

34. A plant for handling freight in depots, comprising:
at least one crane for transferring freight from a first carrier to a second carrier and vice versa, the at least one crane being mobile along a crane movement direction and including a supporting structure, a boom, at least one mobile upper trolley supported at and movable substantially along a center line of said boom, and a first lifting device for freight lifting provided at said at least one upper trolley, with said boom extending sideways in a direction substantially perpendicular to the crane movement direction for such a distance as to enable the at least one mobile upper trolley to operate over both said carriers;
a carriageway extending along said crane movement direction and on which said crane is movable;
a cabin for an operator which is slidably supported on said boom, said cabin moving along said boom independently of said at least one upper trolley;
intermediate carriageways provided at an intermediate elevation between ground level and the boom;
an auxiliary freight transfer device for transferring freight from a first vertical plane passing through said center line to a second vertical plane essentially parallel to said first vertical plane, said auxiliary freight transfer device including a first intermediate trolley running on said intermediate carriageways parallel to said crane movement direction, and a second intermediate trolley that runs on said first intermediate trolley in a direction that is perpendicular to said intermediate carriageways; and an intermediate longitudinal shelf being provided at said crane supporting structure at an intermediate elevation between said boom and the ground level which is lower than the elevation of the said intermediate carriageways, said first and second intermediate trolleys being adapted to co-operate with said intermediate longitudinal shelf.

35. The plant of claim 31, further including at least one overhead travelling-crane cooperating with said mobile crane, said overhead travelling-crane comprising a supporting frame, overhead tracks supported by said supporting frame on which the travelling crane runs, and a longitudinal shelf protruding from a side of the supporting frame facing the mobile crane.

36. The plant of claim 35, comprising a load transfer device movable longitudinally on said longitudinal shelf, said overhead travelling crane being adapted to co-operate with said load transfer device.

37. The plant of claim 36, wherein said overhead travelling-crane comprises an overhead trolley running on said overhead tracks in a direction perpendicular to said longitudinal shelf, and an auxiliary trolley slidably supported at said overhead trolley, said auxiliary trolley being slidable in a direction parallel to said longitudinal shelf and being equipped with a load lifting device.

38. The plant of claim 37, wherein said longitudinal shelf protrudes from a side of the crane facing said first carrier.

39. In a plant for handling freight in depots,
    at least one crane for transferring freight from a first carrier to a second carrier and vice versa, the at least one crane being mobile along a crane movement direction and comprising a boom, at least one mobile upper trolley supported at and movable substantially along a center line of said boom, and a first lifting device for freight lifting provided at said at least one upper trolley, with said boom extending sideways in a direction substantially perpendicular to the crane movement direction for such a distance as to enable the at least one mobile upper trolley to operate over both said carriers,
    a carriageway extending along said crane movement direction and on which said crane is movable;
    an improvement consisting of:
        a plurality of independent foundation elements driven into the ground at predefined fixed positions; and
        an intermediate structure for supporting at an elevated level said carriageway, said intermediate structure being supported on said independent foundation elements so that loads exerted by said at least one crane, in use, onto said carriageway are transmitted through said plurality of foundation elements only at said predefined fixed positions, independently of an instant position of said at least one crane.

40. The plant of claim 39, wherein the foundation elements are driven in dry land.

41. The plant of claim 39, wherein the foundation elements are driven into a water bed.

42. A plant for handling freight in depots, comprising:
    at least one crane for transferring freight from a first carrier to a second carrier and vice versa, the at least one crane being mobile along a crane movement direction and including a boom, at least one mobile upper trolley supported at and movable substantially along a center line of said boom, and a first lifting device for freight lifting provided at said at least one upper trolley, with said boom extending sideways in a direction substantially perpendicular to the crane movement direction for such a distance as to enable the at least one mobile upper trolley to operate over both said carriers;
    a carriageway extending along said crane movement direction and on which said crane is movable;
    an intermediate structure for supporting said carriageway at an elevated level;
    at least one conveyor ring having one stretch thereof positioned inside said intermediate structure, said at least one conveyor ring being an overhead conveyor ring placed at such an elevation from ground that said second carrier is able to pass underneath; and
    a freight supporting platform which is substantially coplanar with said at least one overhead conveyor ring, said freight supporting platform being provided with at least one opening for allowing passage of freight transferred to and from ground level.

43. A plant for handling freight in depots, comprising:
    at least one crane for transferring freight from a first carrier to a second carrier and vice versa, the at least one crane being mobile along a crane movement direction and including a supporting structure, a boom, at least one mobile upper trolley supported at and movable substantially along a center line of said boom, and a first lifting device for freight lifting provided at said at least one upper trolley, with said boom extending sideways in a direction substantially perpendicular to the crane movement direction for such a distance as to enable the at least one mobile upper trolley to operate over both said carriers;
    a carriageway extending along said crane movement direction and on which said crane is movable;
    a cabin for an operator which is slidably supported on said boom, said cabin moving along said boom independently of said at least one upper trolley;
    an intermediate longitudinal shelf protruding from a side of said crane facing said first carrier; and
    a freight transfer device including a first trolley movable on first transversal tracks supported at the supporting structure of the mobile crane at an intermediate height between said boom and said longitudinal shelf, with said first trolley supporting second transversal tracks, parallel to said first transversal tracks, and a second trolley running on said second transversal tracks which is equipped with a freight lifting device.

* * * * *